United States Patent
Almqvist et al.

(10) Patent No.: US 12,503,476 B2
(45) Date of Patent: Dec. 23, 2025

(54) RING-FUSED 2-PYRIDONE COMPOUNDS, METHODS FOR PREPARATION THEREOF AND THEIR USE IN THE TREATMENT AND/OR PREVENTION OF A DISEASE INVOLVING GRAM-POSITIVE BACTERIA

(71) Applicant: QURETECH BIO AB, Umeå (SE)

(72) Inventors: Fredrik Almqvist, Umeå (SE); Pardeep Singh, Umeå (SE)

(73) Assignee: QURETECH BIO AB, Umeå (SE)

( * ) Notice: Subject to any disclaimer, the term of this patent is extended or adjusted under 35 U.S.C. 154(b) by 624 days.

(21) Appl. No.: 17/997,838

(22) PCT Filed: May 7, 2021

(86) PCT No.: PCT/EP2021/062237
§ 371 (c)(1),
(2) Date: Nov. 3, 2022

(87) PCT Pub. No.: WO2021/224501
PCT Pub. Date: Nov. 11, 2021

(65) Prior Publication Data
US 2023/0339973 A1     Oct. 26, 2023

(30) Foreign Application Priority Data
May 8, 2020   (SE) .................................. 2050543-4

(51) Int. Cl.
| C07D 513/04 | (2006.01) |
| A61K 31/429 | (2006.01) |
| A61P 31/04 | (2006.01) |

(52) U.S. Cl.
CPC .......... C07D 513/04 (2013.01); A61K 31/429 (2013.01); A61P 31/04 (2018.01)

(58) Field of Classification Search
CPC ...... C07D 513/04; A61P 31/04; A61K 31/429
See application file for complete search history.

(56) References Cited

U.S. PATENT DOCUMENTS
10,294,244 B2 * 5/2019 Good .................. C07D 513/04

FOREIGN PATENT DOCUMENTS
| WO | WO 2014/185853 | 11/2014 |
| WO | WO 2016/075296 | 5/2016 |
| WO | WO 2017/175182 | 10/2017 |
| WO | WO 2018/229141 | 12/2018 |

OTHER PUBLICATIONS

International Search Report and Written Opinion were mailed on Sep. 21, 2021 by the International Searching Authority for International Application No. PCT/EP2021/062237 filed on May 7, 2021 and published as WO 2021/224501A1 (Applicant—Quretech Bio AB) (14 pages).

Bengtsson C. et al, "Design, synthesis and evaluation of triazole functionalized ring-fused 2-pyridones as antibacterial agents", European Journal Of Medicinal Chemistry, vol. 54, 2012, pp. 637-646.

* cited by examiner

*Primary Examiner* — Kamal A Saeed
(74) *Attorney, Agent, or Firm* — Ballard Spahr LLP

(57) ABSTRACT

Described is a compound of Formula I, or a pharmaceutically acceptable salt thereof, for use in the treatment and/or prevention of a disease involving gram-positive bacteria.

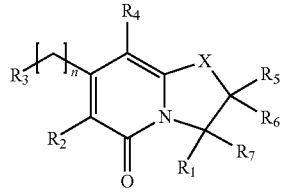

Formula I

12 Claims, 21 Drawing Sheets

RING-FUSED 2-PYRIDONE COMPOUNDS, METHODS FOR PREPARATION THEREOF AND THEIR USE IN THE TREATMENT AND/OR PREVENTION OF A DISEASE INVOLVING GRAM-POSITIVE BACTERIA

CROSS-REFERENCE TO RELATED APPLICATIONS

This application is a U.S. National Phase Application of International Application No. PCT/EP2021/062237, filed May 7, 2021, which claims priority to Swedish Application No. 2050543-4, filed May 8, 2020, each of which are hereby incorporated by reference in their entirety.

TECHNICAL FIELD

The present disclosure concerns novel ring-fused 2-pyridone compounds, methods for preparation thereof as well as their use in the treatment and/or prevention of a disease involving gram-positive bacteria. Further, the disclosure concerns a combination of a ring-fused 2-pyridone compound and a drug against a disease involving gram-positive bacteria.

BACKGROUND

Infections and/or diseases that resist treatment with currently available drugs is an increasing problem and a serious threat to public health. Many of these infections and/or diseases involve gram-positive bacteria such as *Staphylococcus aureus*, Methicillin-resistant *Staphylococcus aureus* (MRSA), Vancomycin-Resistant Enterococci (VRE), *Enterococcus faecalis* (*E. faecalis*), *Enterococcus faecium*, Vancomycin-Intermediate *Staphylococcus aureus* (VISA), Vancomycin-Resistant *Staphylococcus aureus* (VRSA), *Clostridium difficile* (*C. difficile*), *Clostridium tetani*, *Streptococcus pyogenes* and *Staphylococcus saphyticus* and *Bacillus subtilis*.

The term gram-positive originates from a laboratory staining technique named after the Danish scientist Hans Christian Gram. In this staining technique, bacteria are divided into groups of gram-positive bacteria and gram-negative bacteria depending on their ability to take up crystal violet stain. The Gram staining differentiates bacteria by the chemical and physical properties of their cell walls by detecting peptidoglycan, which is present in the cell wall of Gram-positive bacteria. Gram-positive bacteria retain the crystal violet dye, and thus are stained violet, while the Gram-negative bacteria do not. The Gram stain is almost always the first step in the preliminary identification of a bacterial organism. While Gram staining is a valuable diagnostic tool in both clinical and research settings, not all bacteria can be definitively classified by this technique. For instance, tuberculosis bacteria are neither gram-positive nor gram-negative.

In addition to being classified by their staining in the Gram staining technique, bacteria may be further classified by their shape. For instance, the shapes include Cocci and Bacilli. Cocci have a spherical shape and can be either *Staphylococcus* (appearing like a bunch of grapes) or *Streptococcus* (forming a chain). Bacilli have a rod shape and can be either spore forming or non spore forming.

Examples of infection and/or disease involving gram-positive bacteria include urinary tract infection (UTI), catheter associated urinary tract infection, central line associated bloodstream infection (CLABSI), pneumonia, wound associated infection, surgical site infection, bacterial endocarditis, and tetanus. An important reason for the increase of these infections and/or diseases appears to be the increasing number of healthcare-associated infections (HCAI), i.e. infections acquired in or in connection with a health-care setting such as a hospital. For instance, the use of catheters and other intravascular devices frequently lead to diseases and/or infections involving gram-positive bacteria such as *Staphylococcus aureus*. The World Health Organization has reported that hundreds of millions of patients are affected by healthcare-associated infections worldwide each year, leading to significant mortality and financial losses for health systems. Thus, healthcare-associated infections are a widespread and significant problem that needs to be addressed.

WO 2014/185853 discloses substituted ring-fused 2-pyridones which are shown to reduce the infectivity of Chlamydia. However, the bacteria involved in Chlamydia are gram-negative.

WO 2016/075296 discloses ring-fused thiazolino 2-pyridones and use thereof in the treatment of a Chlamydia infection. However, the bacteria involved in Chlamydia are gram-negative.

WO 2017/175182 discloses ring-fused thiazolino 2-pyridones and use thereof in the treatment of tuberculosis. However, the bacteria involved in are neither gram-positive nor gram-negative.

WO 2018/229141 discloses ring-fused thiazolino 2-pyridones, methods for preparation thereof and their use in the treatment and/or prevention of a disease involving gram-positive bacteria. The compounds may be used in combination with a drug against a disease involving gram-positive bacteria.

Many of the diseases and/or infections involving gram-positive bacteria are severe and/or drug-resistant making them a serious threat to public health. Therefore, there is a need for alternative and/or improved treatments of infections and/or diseases involving gram-positive bacteria.

It is an object of the present disclosure to provide compounds useful in the treatment and/or prevention of infections and/or diseases involving gram-positive bacteria. Further, it is an object of the present disclosure to provide compounds that may be used in combination with current therapeutic agents such as vancomycin, gentamicin or ampicillin to improve treatment and/or prevention of infections and/or diseases involving gram-positive bacteria.

SUMMARY

There is provided a compound of Formula I:

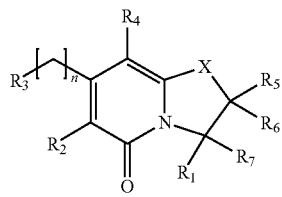

Formula I or a pharmaceutically acceptable salt thereof,
wherein
$R_1$ is selected from the group consisting of:
a) C(O)OH,
b) tetrazolyl,
c) $(CH_2)_m B(OH)_2$, d) C(O)NHSO$_2$R$_8$,
e) NH$_2$, and
f) H, R$_2$ is selected from the group consisting of:
a) H,
b) Cl, F, Br or I,
c) CH$_2$OH,
d) C$_1$-C$_4$alkyl,
e) NZ$_1$Z$_2$, and
f) NO$_2$, R$_3$ is selected from the group consisting of:
a) 1-naphtyl, 2-naphtyl, isoquinolin-4-yl, 1-naphtyloxy, 9-anthryl and 9-anthryloxy each independently substituted with 0, 1, 2 or 3 substituents selected from the group consisting of methyl, fluoro, chloro, bromo, cyano and methoxy,
b) C$_1$-C$_4$alkyl substituted with 0, 1, 2, 3 or 4 fluoro,
c) phenyl substituted with 0, 1, 2 or 3 substituents independently selected from the group consisting of methyl, fluoro, chloro, cyano, trifluoromethyl and C$_1$-C$_6$alkoxy,
d) aminophenyl substituted with 0, 1, 2 or 3 substituents independently selected from the group consisting of methyl, fluoro, chloro and trifluoromethyl
e) 2-(3-methyl)phenylmethylene,
f) benzothiophen-2-yl,
g) H,
h) 2-methyl-1-aza-2-bora-1H-naphth-5-yloxy, and
i) 2-methyl-1-aza-2-bora-1H-naphth-5-yl, R$_4$ is selected from the group consisting of:
a) C$_1$-C$_4$alkyl substituted with 0, 1, 2, 3 or 4 fluoro,
b) C$_3$-C$_6$cycloalkyl,
c) C$_1$-C$_4$alkoxy substituted with 0, 1, 2, 3 or 4 fluoro,
d) C$_3$-C$_6$cycloalkoxy,
e) a 3-, 4-, 5-, or 6-membered heterocycle,
f) NZ$_1$Z$_2$,
g) CH$_2$NZ$_1$Z$_2$,
h) C(O)OH,
i) C(O)H, and
j) phenyl substituted with 0, 1, 2 or 3 substituents independently selected from the group consisting of methyl, fluoro, chloro, cyano and trifluoromethyl, R$_5$ is selected from the group consisting of:
a) H,
b) C$_1$-C$_6$alkyl,
c) C$_1$-C$_6$alkenyl, and
d) aryl, R$_6$ is:

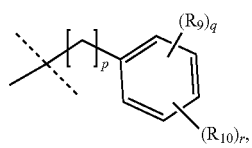

H,
R$_7$ is H, or
R$_7$ together with Rs form a double bond, or
R$_7$ together with R$_6$ form —Q—CH(R$_{11}$)—, or
and in the above definitions:
R$_8$ is C$_1$-C$_4$alkyl or phenyl,
R$_9$ is selected from the group consisting of F, Cl, Br, and C$_1$-C$_4$alkyl, R$_{10}$ is selected from the group consisting of OH, C$_1$-C$_{10}$alkoxy, C$_1$-C$_{10}$alkenoxy, C$_1$-C$_{10}$alkynoxy and O(CH$_2$)$_2$OCH$_3$, R$_{11}$ is (Y)sphenyl wherein the phenyl moiety is substituted with 0, 1, 2, 3 or 4 substituents independently selected from the group consisting of:
a) C$_1$-C$_4$alkyl substituted with 0, 1, 2, 3 or 4 substituents independently selected from the group consisting of Cl, Br, F, I, and C$_1$-C$_{10}$alkoxy,
b) Cl, F, Br or I,
c) a five-membered saturated or unsaturated heterocycle,
d) NH$_2$ or NHC$_1$-C$_6$alkyl, and
e) C$_1$-C$_6$alkoxy substituted with 0, 1, 2, 3 or 4 F, or
R$_{11}$ is a five-membered saturated or unsaturated heterocycle, optionally substituted with 0, 1, 2 or 3 substituents independently selected from the group consisting of methyl, fluoro, chloro, cyano and trifluoromethyl, Q is selected from the group consisting of:
CH$_2$,
CHC$_1$-C$_6$alkyl, optionally substituted with cyano or 1, 2 or 3 F,
CHNO$_2$,
CHNH$_2$,
NH,
NC$_1$-C$_6$alkyl,
NOH,
NC(O)C$_1$-C$_6$alkyl,
NSO$_2$C$_1$-C$_6$alkyl,
S,
O, X is S, SO or SO$_2$,
Y is S or CH$_2$,
Z$_1$ and Z$_2$ each independently represents hydrogen, methyl, CH$_3$S(O)$_2$, C(O)OR$_{10A}$, C(O)NR$_{10A}$R$_{10B}$ or C(O)R$_{10B}$, or
Z$_1$ and Z$_2$ together form —(CH$_2$)$_3$, —(CH$_2$)$_4$, or —(CH$_2$)$_5$,
R$_{10A}$ and R$_{10B}$ each independently represent H or C$_{1-6}$alkyl, and
n, m, p, q, r, and s each independently represents 0, 1 or 2,
with the proviso that when R$_7$ is H or forms a double bond with R$_5$ then R$_1$ is (CH$_2$)$_m$B(OH)$_2$.

There is also provided a pharmaceutical composition comprising:
(i) a compound as described herein such as a compound of Formula I, or a pharmaceutically acceptable salt thereof, and
(ii) optionally a drug against a disease involving gram-positive bacteria, or a pharmaceutically acceptable salt of said drug wherein (i) and optionally (ii) is/are in admixture with a pharmaceutically acceptable adjuvant, carrier or excipient.

Further, the present disclosure provides:
a compound as described herein such as a compound of Formula I; or
a pharmaceutical composition as described herein
for use as a medicament.

There is also provided:
a compound as described herein such as a compound of Formula I; or
a pharmaceutical composition as described herein,
for use in the treatment and/or prevention of a disease involving gram-positive bacteria.

There is also provided:
a compound as described herein such as a compound of Formula I; or
a pharmaceutical composition as described herein,
for the manufacture of a medicament for the treatment and/or prevention of a disease involving gram-positive bacteria.

There is also provided a method for treatment and/or prevention of a disease involving gram-positive bacteria comprising administering to a mammal, such as a human or an animal, an effective amount of a compound as described herein, such as a compound of Formula I, or a pharmaceutical composition as described herein.

Figure 1A:
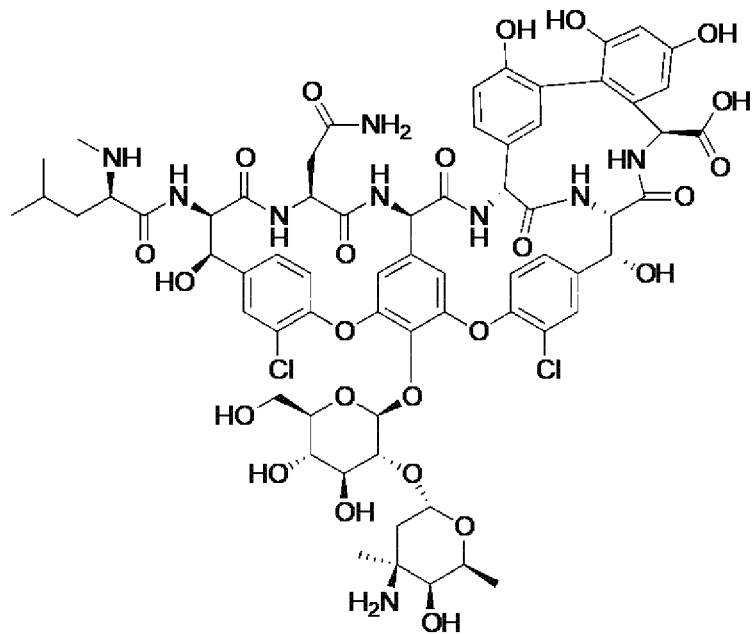
FIG. 1a shows the chemical structure of vancomycin.
Figure 1B:
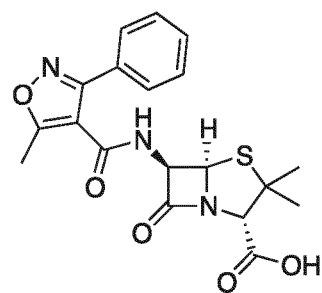
FIG. 1b shows the chemical structure of oxacillin.
Figure 2A:
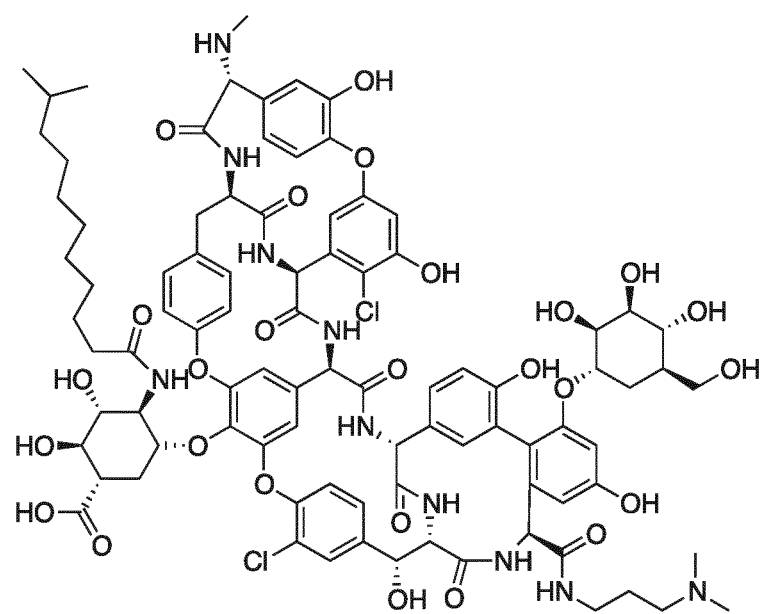
FIG. 2a shows the chemical structure of dalbavancin.
Figure 2B:
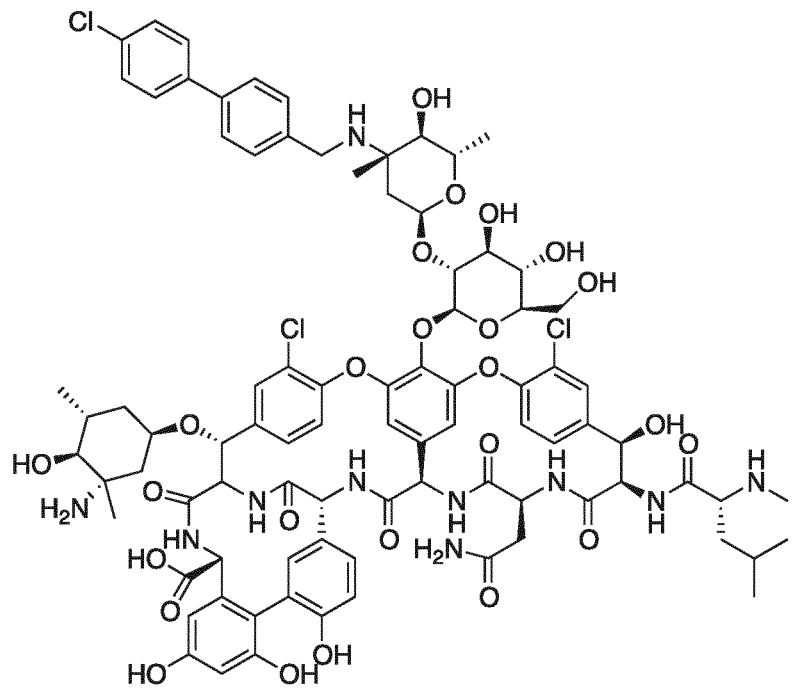
FIG. 2b shows the chemical structure of oritavancin.
Figure 3A:
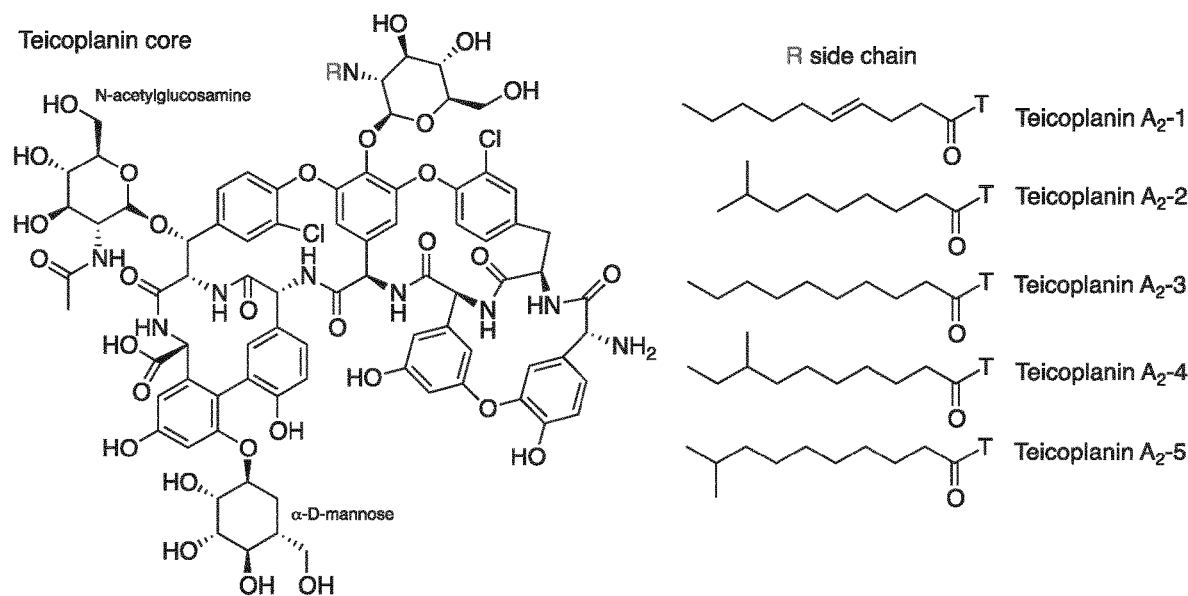
FIG. 3a shows the chemical structure of teicoplanin.
Figure 3B:
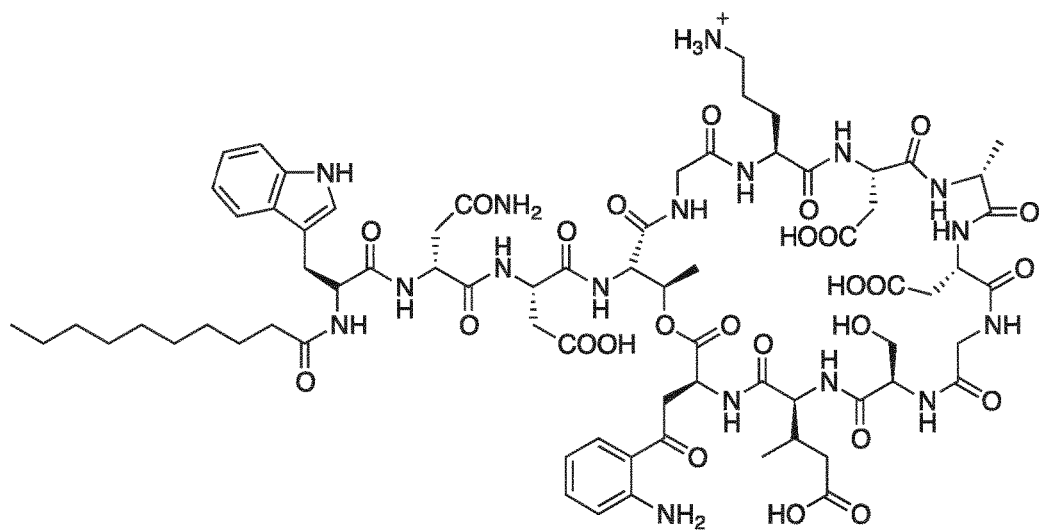
FIG. 3b shows the chemical structure of daptomycin.
Figure 4A:
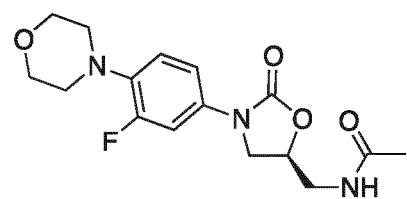
FIG. 4a shows the chemical structure of linezolid.
Figure 4B:
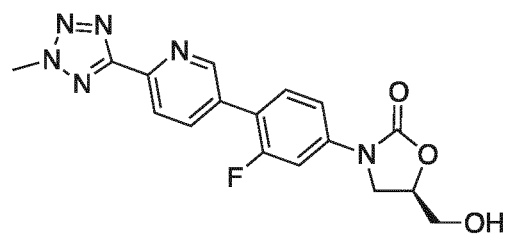
FIG. 4b shows the chemical structure of tedizolid.
Figure 5:
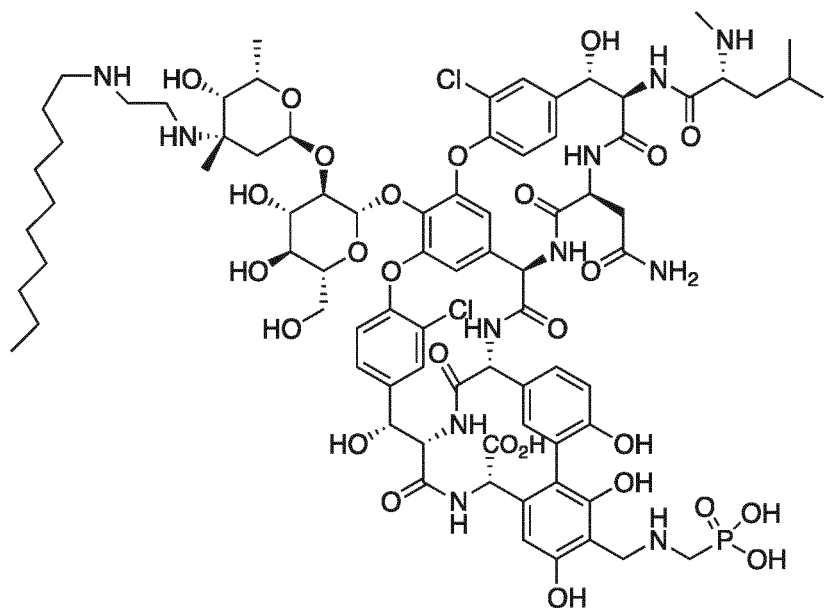
FIG. 5 shows the chemical structure of telavancin.
Figure 6:
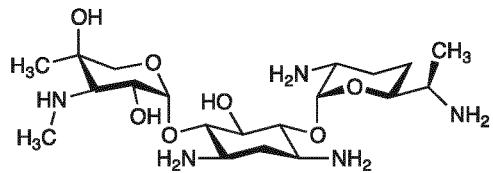
FIG. 6 shows the chemical structure of gentamicin.

The chemical structures depicted in FIGS. 1-6 have not been drawn with the program Chem Doodle.

DESCRIPTION

There is provided a compound of Formula I:

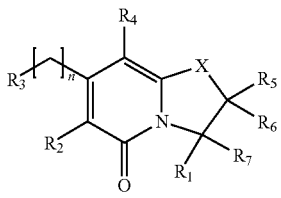

Formula I or a pharmaceutically acceptable salt thereof,
wherein
$R_1$ is selected from the group consisting of:
a) C(O)OH,
b) tetrazolyl,
c) $(CH_2)_mB(OH)_2$,
d) $C(O)NHSO_2R_8$,
e) $NH_2$, and
f) H,
$R_2$ is selected from the group consisting of:
a) H,
b) Cl, F, Br or I,
c) $CH_2OH$,
d) $C_1$-$C_4$alkyl,
e) $NZ_1Z_2$, and
f) $NO_2$,
$R_3$ is selected from the group consisting of:
a) 1-naphtyl, 2-naphtyl, isoquinolin-4-yl, 1-naphtyloxy, 9-anthryl and 9-anthryloxy each independently substituted with 0, 1, 2 or 3 substituents selected from the group consisting of methyl, fluoro, chloro, bromo, cyano and methoxy,
b) $C_1$-$C_4$alkyl substituted with 0, 1, 2, 3 or 4 fluoro,
c) phenyl substituted with 0, 1, 2 or 3 substituents independently selected from the group consisting of methyl, fluoro, chloro, cyano, trifluoromethyl and $C_1$-$C_6$alkoxy (e.g. $C_1$-$C_4$alkoxy),
d) aminophenyl substituted with 0, 1, 2 or 3 substituents independently selected from the group consisting of methyl, fluoro, chloro and trifluoromethyl
e) 2-(3-methyl)phenylmethylene,
f) benzothiophen-2-yl,
g) H,
h) 2-methyl-1-aza-2-bora-1H-naphth-5-yloxy, and
i) 2-methyl-1-aza-2-bora-1H-naphth-5-yl,
$R_4$ is selected from the group consisting of:
a) $C_1$-$C_4$alkyl substituted with 0, 1, 2, 3 or 4 fluoro,
b) $C_3$-$C_6$cycloalkyl,
c) $C_1$-$C_4$alkoxy substituted with 0, 1, 2, 3 or 4 fluoro,
d) $C_3$-$C_6$cycloalkoxy,
e) a 3-, 4-, 5-, or 6-membered heterocycle,
f) $NZ_1Z_2$,
g) $CH_2NZ_1Z_2$,
h) C(O)OH,
i) C(O)H, and
j) phenyl substituted with 0, 1, 2 or 3 substituents independently selected from the group consisting of methyl, fluoro, chloro, cyano and trifluoromethyl,
$R_5$ is selected from the group consisting of:
a) H,
b)
c) $C_1$-$C_6$alkenyl, and
d) aryl,
$R_6$ is:

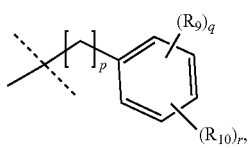

or
H,
$R_7$ is H, or
$R_7$ together with $R_5$ form a double bond, or
$R_7$ together with $R_6$ form —Q—CH($R_{11}$)—, or and in the above definitions:
$R_8$ is $C_1$-$C_4$alkyl or phenyl,
$R_9$ is selected from the group consisting of F, Cl, Br, and $C_1$-$C_4$alkyl,
$R_{10}$ is selected from the group consisting of OH, $C_1$-$C_{10}$alkoxy, $C_1$-$C_{10}$alkenoxy, $C_1$-$C_{10}$alkynoxy and $O(CH_2)_{20}CH_3$,
$R_{11}$ is $(Y)_s$phenyl wherein the phenyl moiety is substituted with 0, 1, 2, 3 or 4 substituents independently selected from the group consisting of:
a) $C_1$-$C_4$alkyl substituted with 0, 1, 2, 3 or 4 substituents independently selected from the group consisting of Cl, Br, F, I, and $C_1$-$C_{10}$alkoxy,
b) Cl, F, Br or I,
c) a five-membered saturated or unsaturated heterocycle,
d) $NH_2$ or $NHC_1$-$C_6$alkyl, and
e) $C_1$-$C_6$alkoxy (e.g. $C_1$-$C_4$alkoxy) substituted with 0, 1, 2, 3 or 4 F,
or
$R_{11}$ is a five-membered saturated or unsaturated heterocycle, optionally substituted (e.g. unsubstituted) with 0, 1, 2 or 3 substituents independently selected from the group consisting of methyl, fluoro, chloro, cyano and trifluoromethyl,
Q is selected from the group consisting of:
$CH_2$,
$CHC_1$-$C_6$alkyl, optionally substituted with cyano or 1, 2 or 3 F,
$CHNO_2$,
$CHNH_2$,
NH,
$NC_1$-$C_6$alkyl,
NOH,
$NOC_1$-$C_6$alkyl,
$NC(O)C_1$-$C_6$alkyl,
$NSO_2C_1$-$C_6$alkyl,
S,
O,
X is S, SO or $SO_2$,
Y is S or $CH_2$,
$Z_1$ and $Z_2$ each independently represents hydrogen, methyl, $CH_3S(O)_2$, $C(O)OR_{10A}$, $C(O)NR_{10A}R_{10B}$ or $C(O)R_{10B}$, or $Z_1$ and $Z_2$ together form —$(CH_2)_3$, —$(CH_2)_4$, or —$(CH_2)_5$, $R_{10A}$ and $R_{10B}$ each independently represent H or $C_{1-6}$alkyl (e.g. $C_1$-$C_4$alkyl), and
n, m, p, q, r, and s each independently represents 0, 1 or 2,
with the proviso that when $R_7$ is H or forms a double bond with $R_5$ then $R_1$ is $(CH_2)_mB(OH)_2$.

For the avoidance of doubt, the skilled person will understand that references herein to compounds of particular aspects of the invention (such as any aspect of the invention referring to compounds of Formula I as defined hereinbefore) will include references to all embodiments and particular features thereof, which embodiments and particular features may be taken in combination to form further embodiments and features of the invention.

Surprisingly, the compounds of the present disclosure have been found to inhibit the biological activity of bacteria such as *E. faecalis* and MRSA. Moreover, the compounds of the present disclosure have found to have a synergistic bactericidal effect whe combined with a drug against disease involving gram positive bacteria such as an antibiotic.

The following definitions shall apply throughout this document unless otherwise stated. The term "$C_1$-$C_4$alkyl" denotes a straight or branched, saturated or unsaturated alkyl group of one to four carbon atoms. Examples of "$C_1$-$C_4$alkyl" include, but are not limited to, methyl, ethyl, vinyl, allyl, n-propyl, isopropyl, n-butyl, sec-butyl, iso-butyl and tert-butyl.

The term "$C_1$-$C_6$alkyl" denotes a straight or branched, saturated or unsaturated alkyl group of one to six carbon atoms. Examples of "$C_1$-$C_6$alkyl" include, but are not limited to, methyl, ethyl, vinyl, allyl, n-propyl, isopropyl, n-butyl, sec-butyl, iso-butyl, tert-butyl, n-pentyl, isopentyl, neopentyl, n-hexyl, isohexyl, 3-methylpentyl, 2,3-dimethylbutyl and neohexyl.

The term "$C_3$-$C_6$cycloalkyl" denotes a saturated or unsaturated non-aromatic monocyclic ring composed of three, four, five or six carbon atoms. Examples of "$C_3$-$C_6$cycloalkyl" include, but are not limited to, cyclopropyl, cyclobutyl, cyclopentyl and cyclohexyl.

The term "$C_1$-$C_6$alkenyl" denotes a straight or branched, saturated or unsaturated alkene containing one or more double bonds group of one to six carbon atoms. Examples of "$C_1$-$C_6$alkenyl" include vinyl, allyl, butenyl, pentenyl and hexenyl.

The term "$C_1$-$C_{10}$alkenyl" denotes a straight or branched, saturated or unsaturated alkene containing one or more double bonds group of one to ten carbon atoms. Examples of "$C_1$-$C_{10}$alkenyl" include vinyl, allyl, butenyl, pentenyl, hexenyl, octenyl, nonenyl and decenyl.

The term aryl denotes an aromatic hydrocarbon. Examples of "aryl" include phenyl and naphtyl.

The term "$C_1$-$C_4$alkoxy" denotes a $C_1$-$C_4$alkyl group as described herein which is linked to an oxygen atom. Examples of "$C_1$-$C_4$alkoxy" include, but are not limited to, methoxy, ethoxy, n-propoxy, iso-propoxy and butoxy.

The term "$C_1$-$C_6$alkoxy" denotes a $C_1$-$C_6$alkyl group as described herein which is linked to an oxygen atom. Examples of "$C_1$-$C_6$alkoxy" include, but are not limited to, methoxy, ethoxy, n-propoxy, iso-propoxy, n-butoxy, iso-butoxy, n-pentoxy and n-hexoxy.

The term "$C_1$-$C_{10}$alkoxy" denotes a $C_1$-$C_{10}$alkyl group which is linked to an oxygen atom. The $C_1$-$C_{10}$alkyl group may be straight, branched and/or include a cycloalkyl group. The examples of "$C_1$-$C_{10}$alkoxy" include, but are not limited to, methoxy, ethoxy, n-propoxy, cyclopropylmethoxy, iso-propoxy, butoxy, pentoxy, hexoxy, pentoxy, octoxy, nonony, and decoxy.

The term "$C_3$-$C_6$cycloalkoxy" denotes a saturated or unsaturated non-aromatic monocyclic ring composed of three, four, five or six carbon atoms which is linked to an oxygen atom. Examples of "$C_3$-$C_6$cycloalkoxy" include, but are not limited to, cyclopropyloxy, cyclopropoxymethylene, cyclobutyloxy, cyclobutyloxymethylene, cyclopentyloxy, cyclopentyloxymethylene, cyclohexyloxy and cyclohexyloxymethylene.

The term "$C_1$-$C_{10}$alkenoxy" denotes a $C_1$-$C_{10}$alkenyl group which is linked to an oxygen atom. The $C_1$-$C_{10}$alkenyl group may be straight or branched. The examples of $C_1$-$C_{10}$alkenoxy include, but are not limited to, allyloxy, 5-hexenyloxy or 4-methyl-3-pentenyloxy, (E)-2-heptenyloxy, (E)-2-hexenyloxy, (E)-2-pentenyloxy, (E)-2-butenyloxy, (Z)-2-heptenyloxy, (Z)-2-hexenyloxy and (Z)-2-pentenyloxy.

The term "$C_1$-$C_{10}$alkynoxy" denotes a $C_1$-$C_{10}$alkynyl group which is linked to an oxygen atom. The $C_1$-$C_{10}$alkynyl group may be straight or branched. The examples of $C_1$-$C_{10}$alkynoxy include, but are not limited to, 5-hexynyloxy, (Z)-2-Butenyloxy 2-heptynyloxy, 2-hexynyloxy, 2-pentynyloxy, 2-butynyloxy, 3-heptynyloxy, 3-hexynyloxy, 3-pentynyloxy, 3-butynyloxy, 4-heptynyloxy, 4-hexynyloxy and 4-pentynyloxy.

The term "3-membered heterocycle" denotes a 3-membered saturated or unsaturated heterocycle. Examples of a 3-membered saturated heterocycle include, but are not limited to, aziridine, oxirane and thiirane. Examples of 3-membered unsaturated heterocycles include, but are not limited to, azirine, oxirene and thiirene.

The term "4-membered heterocycle" denotes a 4-membered saturated or unsaturated heterocycle. Examples of a 4-membered heterocycle include, but are not limited to, azetidine, oxetane and thietane.

The term "5-membered heterocycle" denotes a 5-membered saturated or unsaturated heterocycle. Examples of a 5-membered heterocycles include, but are not limited to pyrrolidine, tetrahydrofuran, thiolane, pyrrole, furane, thiophene, imidazolidine, pyrazolidine, oxazolidine, isoxazolidine, thiazolidine, isothiazolidine, dioxolane, dithiolane, imidazole, pyrazole, oxazole, isoxazole, thiazole, and isothiazole.

The term "6-membered heterocycle" denotes a 6-membered saturated or unsaturated heterocycle. Examples of a 6-membered heterocycles include, but are not limited to piperidine, pyridine, piperazine, morpholine, and thiomorpholine.

The drug against a disease involving gram-positive bacteria is to be understood as a drug that counteracts gram-positive bacteria. The drug against a disease involving gram-positive bacteria may reduce, substantially eliminate or eradicate gram-positive bacteria. The drug against a disease involving gram-positive bacteria may also be denominated a drug to treat a disease involving gram-positive bacteria.

The term disease is understood to be an abnormal condition of a part, organ, or system of a mammal such as a human resulting from various causes, such as infection, inflammation, environmental factors, or genetic defect, and characterized by an identifiable group of signs, symptoms, or both. The skilled person understands that there is an overlap of the terms. In this document, the term disease is understood to encompass both disease and infection. Thus, when the term disease is used it may intend disease and/or infection. The term infection intends a condition wherein gram-positive bacteria have entered into a mammal such as a human.

The substituents $R_7$ and $R_6$ of the compound of Formula I may together form —Q—CH($R_{11}$)— thereby providing a compound of Formula II:

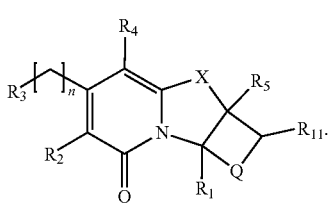

Formula II

The $R_1$ and $R_5$ substituents of the compound of the compound of Formula II may be oriented syn to each other. Further, the $R_{11}$ substituent of the compound of Formula II may be oriented syn or anti with respect to the $R_{11}$ and $R_5$ substituents.

For example, when the substituents $R_{11}$, $R_5$ and $R_{11}$ (marked with *) are all oriented syn with respect to each other there is provided a compound of Formula II syn:

Formula II syn

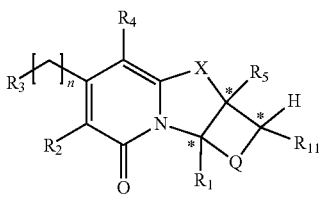

For instance, the compound of Formula II syn may comprise a compound of Formula IIa and/or Formula IIb:

Formula IIa

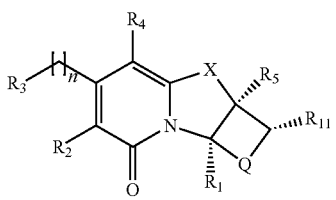

Formula IIb

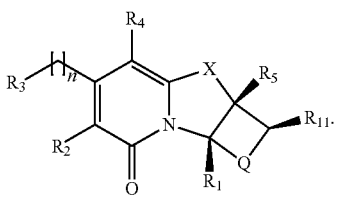

It will be appreciated that the compound of Formula IIa and the compound of Formula IIb are enantiomers of one another.

In a further example, when the substituents $R_{11}$ and $R_5$ (marked with *) are oriented syn with respect to each other and anti with respect to $R_{11}$ (marked with there is provided a compound of Formula II anti:

Formula II anti

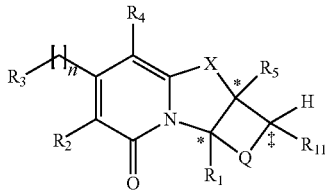

For instance, the compound of Formula II anti may comprise a compound of Formula IIc and/or Formula IId:

Formula IIc

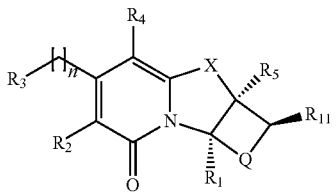

Formula IId

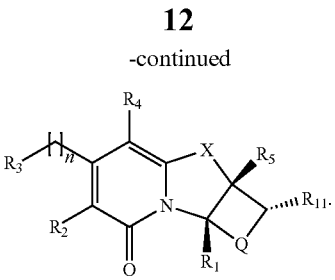

It will be appreciated that the compound of Formula IIc and the compound of Formula IId are enantiomers of one another.

Moreover, it is understood that the compound of Formula II syn and the compound of Formula II anti are diastereoisomers. Thus, the compound of Formula II syn and the compound of Formula II anti constitute a diastereoisomeric pair.

The present disclosure also provides a compound of Formula I in which $R_7$ is H, i.e. a compound of Formula III:

Formula III

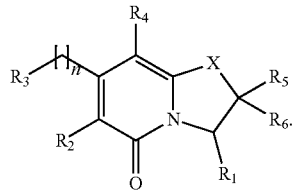

Moreover, the present disclosure provides a compound of Formula I in which $R_7$ together with $R_5$ form a double bond, i.e. a compound of Formula IV:

Formula IV

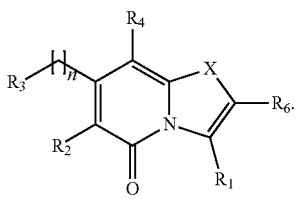

Further, it will be understood that the substituents of the compound of Formula I such as the compound of Formula II, Formula III or Formula IV may be as described herein. However, one or more of the substituents may vary as described below.

For instance, the value for Q may be $CH_2$, NH or $NC_1$-$C_6$alkyl.

$R_1$ may be C(O)OH, tetrazolyl or $(CH_2)_m B(OH)_2$.

$R_2$ may be H or $NZ_1Z_2$. For example, $R_2$ may be $NHCH_3$, $N(CH_3)_2$ or azetidine.

$R_3$ may be 1-naphtyl, 2-naphtyl, 1-naphtyloxy, isoquinolin-4-yl, 9-anthryl and 9-anthryloxy each independently substituted with 0, 1, 2 or 3 substituents selected from the group consisting of methyl, fluoro, chloro, bromo, cyano and methoxy. For example, $R_3$ may be 1-naphtyl, 2-naphtyl, isoquinolin-4-yl each independently substituted with 0, 1, 2 or 3 substituents selected from the group consisting of methyl, fluoro, chloro, bromo, cyano and methoxy.

The value for n of the compounds described herein may be 1.

X may be S.

R$_4$ may be selected from the group consisting of:
a) C$_1$-C$_4$alkyl substituted with 0, 1, 2, 3 or 4 fluoro;
b) C$_3$-C$_6$cycloalkyl,
c) C$_1$-C$_4$alkoxy substituted with 0, 1, 2, 3 or 4 fluoro, and
d) C$_3$-C$_6$cycloalkoxy.

For instance, R$_4$ may be cyclopropyl or methoxy.

For instance, particular compounds of Formula I include those having one or more (e.g. one or all) of the following features:
- R$_1$ may be C(O)OH or (CH$_2$)$_m$B(OH)$_2$
- R$_2$ may be H or NZ$_1$Z$_2$, such as wherein Z$_1$ and Z$_2$ each independently represents hydrogen, methyl, or Z$_1$ and Z$_2$ together form —(CH$_2$)$_3$
- R$_3$ may be selected from the group consisting of 1-naphtyl, isoquinolin-4-yl, benzothiophene-2-yl, or phenyl substituted with 0, 1, 2 or 3 substituents independently selected from the group consisting of methyl, fluoro, chloro, cyano, trifluoromethyl and C$_1$-C$_4$alkoxy (e.g. methoxy, propoxy or butoxy)
- R$_4$ may be selected from the group consisting of C$_1$-C$_4$alkyl substituted with 0, 1, 2, 3 or 4 fluoro, C$_3$-C$_6$cycloalkyl (e.g. cyclopropyl), C$_1$-C$_4$alkoxy (e.g. methoxy) substituted with 0, 1, 2, 3 or 4 fluoro, or phenyl substituted with 0, 1, 2 or 3 substituents independently selected from the group consisting of methyl, fluoro, chloro, cyano and trifluoromethyl
- R$_5$ may be H, methyl or vinyl
- R$_6$ may be H; or
- R$_7$ together with R$_6$ form —Q—CH(R$_{11}$)—
- Q may be CH$_2$, CHC$_1$-C$_6$alkyl optionally substituted with cyano or 1, 2 or 3 F (e.g. CHCH$_2$CN), NH or NMe (e.g. Q may be CH$_2$)
- R$_{11}$ may be (Y)sphenyl wherein the phenyl moiety is substituted with 0, 1, 2, 3 or 4 substituents independently selected from the group consisting of methyl, fluoro, chloro, bromo, trifluoromethyl, or C$_1$-C$_4$alkoxy (e.g. methoxy, propoxy or butoxy); or R$_{11}$ may be an unsaturated heterocycle (e.g. thiophene)
- Y is S or CH$_2$
- m is 1 or 2
- n is 1
- s is 0 or 1

More particular compounds of Formula I include those in which:
- R$_3$ may be selected from the group consisting of 1-naphtyl, isoquinolin-4-yl, benzothiophene-2-yl, 3-trifluoromethylphenyl, 2,3-dichlorophenyl, or 3-methyl-4-butoxyphenyl;
- R$_4$ may be selected from the group consisting of cyclopropyl, methoxy, or 3-trifluoromethylphenyl; and/or
- R$_5$ may be selected from the group consisting of H, methyl or vinyl.

For example, particular compounds of Formula II include those in which:
- Q may be CH$_2$, CHCH$_2$CN, NH or NMe$_2$; and/or
- R$_{11}$ may be 3-trifluoromethylphenyl, 4-trifluoromethylphenyl, 3-chlorophenyl, 3,5-dichlorophenyl, 2,6-dichlorophenyl, 3-bromophenyl, 2,6-difluorophenyl, 3-methylphenyl, 3,5-methylphenyl, 3-methyl-4-propoxyphenyl, 3-methyl-4-butoxyphenyl, 4-methyoxyphenyl, 3-aminophenyl, thiophen-3-yl, and phenylthiol.

For example, compounds of Formula II include those in which: Q may be CH$_2$; and/or
- R$_{11}$ may be 3-trifluoromethylphenyl, 4-trifluoromethylphenyl, 3-chlorophenyl, 3,5-dichlorophenyl, 2,6-dichlorophenyl, 3-bromophenyl, 2,6-difluorophenyl, 3-methylphenyl, 3,5-methylphenyl, 3-methyl-4-propoxyphenyl, 3-methyl-4-butoxyphenyl, 4-methyoxyphenyl, 3-aminophenyl, thiophen-3-yl, and phenylthiol.

In particular, compounds of Formula II include those in which:
- R$_{11}$ is C(O)OH;
- R$_2$ is H;
- R$_3$ is 1-naphtyl, benzothiophene-2-yl, or phenyl substituted with 0, 1, 2 or 3 (e.g. 2) substituents independently selected from the group consisting of methyl, fluoro, chloro, cyano, trifluoromethyl and Cu-C$_4$alkoxy (e.g. C$_4$alkoxy, such as butoxy);
- R$_4$ is C$_3$cycloalkyl (e.g. cyclopropyl);
- R$_5$ is H;
- Q is CH$_2$;
- R$_{11}$ is (Y)sphenyl wherein the phenyl moiety is substituted with 0, 1, 2, 3 or 4 (e.g. 1 or 2) substituents independently selected from the group consisting of methyl, fluoro, chloro, bromo, trifluoromethyl (e.g. 3-chlorophenyl or 2,6-dichlorophenyl); and/or
- s is 0.

For example, compounds of Formula II include those in which:
- R$_1$ is C(O)OH;
- R$_2$ is H;
- R$_3$ is 1-naphtyl, benzothiophene-2-yl, or phenyl substituted with 0, 1, 2 or 3 (e.g. 2) substituents independently selected from the group consisting of methyl, fluoro, chloro, cyano, trifluoromethyl and C$_1$-C$_4$alkoxy (e.g. C$_4$alkoxy, such as butoxy);
- R$_4$ is C$_3$cycloalkyl (e.g. cyclopropyl);
- R$_5$ is H;
- Q is CH$_2$; and/or
- R$_{11}$ is 3-chlorophenyl or 2,6-dichlorophenyl.

For example, compounds of Formula II also include those in which:
- R$_1$ is C(O)OH;
- R$_2$ is H;
- R$_3$ is 1-naphtyl, benzothiophene-2-yl, or 3-methyl-4-butoxyphenyl;
- R$_4$ is C$_3$cycloalkyl (e.g. cyclopropyl);
- R$_5$ is H;
- Q is CH$_2$; and/or
- R$_{11}$ is 3-chlorophenyl or 2,6-dichlorophenyl.

Compounds of Formula II also include those in which:
- R$_1$ is C(O)OH;
- R$_2$ is H;
- R$_3$ is 1-naphtyl;
- R$_4$ is cyclopropyl;
- R$_5$ is H;
- Q may be CHCH$_2$CN; and/or
- R$_{11}$ may be phenyl.

Particular compounds of Formula III include those in which R$_1$ is (CH$_2$)$_m$B(OH)$_2$, more particularly wherein m is 2.

For example, compounds of Formula III include those in which:
- R$_1$ is (CH$_2$)$_m$B(OH)$_2$;
- m is 2;
- R$_2$ is H; and/or
- R$_5$ is H.

Compounds of Formula III also include those in which:
- R$_1$ is (CH$_2$)$_m$B(OH)$_2$;
- m is 2;
- R$_2$ is H;

R$_5$ is H;
R$_6$ is H; and/or
R$_2$ is H.
Compounds of Formula III also include those in which:
R$_3$ may be selected from the group consisting of 1-naphtyl and 3-trifluoromethylphenyl; and/or
R$_4$ may be selected from the group consisting of cyclopropyl, methoxy, or 3-trifluoromethylphenyl.
For example, compounds of Formula III also include those in which:
R$_1$ is (CH$_2$)$_m$B(OH)$_2$;
m is 2;
R$_2$ is H;
R$_3$ may be selected from the group consisting of 1-naphtyl and 3-trifluoromethylphenyl;
R$_4$ may be selected from the group consisting of cyclopropyl, methoxy, or 3-trifluoromethylphenyl;
R$_5$ is H;
R$_6$ is H; and/or
R$_2$ is H.
Compounds of Formula III also include those in which:
R$_1$ is (CH$_2$)$_m$B(OH)$_2$;
m is 2;
R$_2$ is H;
R$_3$ is 1-naphtyl;
n is 1;
R$_4$ is C$_3$cycloalkyl (e.g. cyclopropyl) or phenyl substituted with 0, 1, 2 or 3 (e.g. 1) substituents independently selected from the group consisting of methyl, fluoro, chloro, cyano and trifluoromethyl (e.g. 3-trifluoromethylphenyl);
R$_5$ is H;
R$_6$ is H; and/or
R$_7$ is H.
Compounds of Formula IV also include those in which:
R$_1$ is COOH or (CH$_2$)$_m$B(OH)$_2$;
R$_2$ is H;
R$_3$ may be selected from the group consisting of 1-naphtyl and 3-trifluoromethylphenyl;
R$_4$ may be selected from the group consisting of cyclopropyl, methoxy, or 3-trifluoromethylphenyl;
R$_6$ is

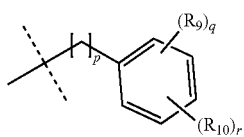

R$_9$ is selected from the group consisting of F, Cl, Br, and C$_1$-C$_4$alkyl (e.g. methyl);
R$_{10}$ is selected from the group consisting of OH, C$_1$-C$_{10}$alkoxy (e.g. hexoxy), C$_1$-C$_{10}$alkenoxy, C$_1$-C$_{10}$alkynoxy and O(CH$_2$)$_2$OCH$_3$; and/or q and r each independently represents 0, 1 or 2.
For example, compounds of Formula IV include those in which:
R$_1$ is COOH;
R$_2$ is H;
R$_3$ is 1-naphtyl;
R$_4$ is methoxy;
R$_6$ is

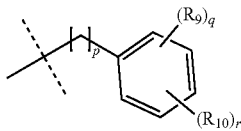

R$_9$ is methyl;
R$_{10}$ is hexoxy;
p is 0;
q is 1; and/or
r is 1.
The present disclosure also provides one or more of the following compounds:
(2S)-4-cyclopropyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid,
(2R)-4-cyclopropyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid,
(2S)-4-cyclopropyl-6-(dimethylamino)-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid,
(2S)-4-cyclopropyl-5-(isoquinolin-4-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid,
(2R)-4-cyclopropyl-5-(naphthalen-1-ylmethyl)-7-oxo-2-(4-(trifluoromethyl)phenyl)-2,2a,7,8a-tetrahydro-1H-cyclobuta[4,5]thiazolo[3,2-a]pyridine-8a-carboxylic acid,
(2S)-4-cyclopropyl-5-(naphthalen-1-ylmethyl)-7-oxo-2-(4-(trifluoromethyl)phenyl)-2,2a,7,8a-tetrahydro-1H-cyclobuta[4,5]thiazolo[3,2-a]pyridine-8a-carboxylic acid,
(2S)-2-(3-chlorophenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid,
(2S)-2-(3-chlorophenyl)-4-cyclopropyl-5-(isoquinolin-4-ylmethyl)-7-oxo-2,2a,7,8a-tetrahydro-1H-cyclobuta[4,5]thiazolo[3,2-a]pyridine-8a-carboxylic acid,
(2R)-2-(3-chlorophenyl)-4-cyclopropyl-6-(dimethylamino)-5-(naphthalen-1-ylmethyl)-7-oxo-2,2a,7,8a-tetrahydro-1H-cyclobuta[4,5]thiazolo[3,2-a]pyridine-8a-carboxylic acid,
(2R)-2-(3-chlorophenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid,
(2S)-4-cyclopropyl-2-(3,5-dichlorophenyl)-5-(naphthalen-1-ylmethyl)-7-oxo-2,2a,7,8a-tetrahydro-1H-cyclobuta[4,5]thiazolo[3,2-a]pyridine-8a-carboxylic acid,
(2R)-4-cyclopropyl-2-(3,5-dichlorophenyl)-5-(naphthalen-1-ylmethyl)-7-oxo-2,2a,7,8a-tetrahydro-1H-cyclobuta[4,5]thiazolo[3,2-a]pyridine-8a-carboxylic acid,
(2S)-2-(3-bromophenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid,
(2S)-4-cyclopropyl-2-(2,6-difluorophenyl)-5-(naphthalen-1-ylmethyl)-7-oxo-2,2a,7,8a-tetrahydro-1H-cyclobuta[4,5]thiazolo[3,2-a]pyridine-8a-carboxylic acid,
(2S)-4-cyclopropyl-5-(naphthalen-1-ylmethyl)-7-oxo-2-(m-tolyl)-2,2a-dihydro-7H-cyclobuta[4,5]thiazolo[3,2-a]pyridine-8a(1H)-carboxylic acid,
(2R)-4-cyclopropyl-5-(naphthalen-1-ylmethyl)-7-oxo-2-(m-tolyl)-2,2a-dihydro-7H-cyclobuta[4,5]thiazolo[3,2-a]pyridine-8a(1H)-carboxylic acid, (2S)-4-cyclopropyl-2-(3,5-dimethylphenyl)-5-(naphthalen-1-ylmethyl)-7-oxo-2,2a,7,8a-tetrahydro-1H-cyclobuta[4,5]thiazolo[3,2-a]pyridine-8a-carboxylic acid, (2S)-4-cyclopropyl-2-(3-methyl-4-propoxyphenyl)-5-(naphthalen-1-ylmethyl)-7-oxo-2,2a,7,8a-tetrahydro-1H-cyclobuta[4,5]thiazolo[3,2-a]pyridine-8a-carboxylic acid, (2S)-2-(4-butoxy-3-methylphenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid, (2S)-4-cyclopropyl-2-(4-methoxyphenyl)-5-(naphthalen-1-ylmethyl)-7-oxo-2,2a,7,8a-tetrahydro-1H-cyclobuta[4,5]thiazolo[3,2-a]pyridine-8a-carboxylic acid, (2S)-2-(3-aminophenyl)-4-cyclopropyl-5-(naphthalen-1-ylmethyl)-7-oxo-2,2a-dihydro-7H-cyclobuta[4,5]thiazolo[3,2-a]pyridine-8a(1H)-carboxylic acid, (2R)-4-cyclopropyl-5-(naphthalen-1-ylmethyl)-7-oxo-2-(thiophen-3-yl)-2,2a,7,8a-tetrahydro-1H-cyclobuta[4,5]thiazolo[3,2-a]pyridine-8a-carboxylic acid, (2R)-4-cyclopropyl-5-(naphthalen-1-ylmethyl)-7-oxo-2-(phenylthio)-2,2a,7,8a-tetrahydro-1H-cyclobuta[4,5]thiazolo[3,2-a]pyridine-8a-carboxylic acid, (2S)-4-cyclopropyl-5-(naphthalen-1-ylmethyl)-7-oxo-2-(phenylthio)-2,2a,7,8a-tetrahydro-1H-cyclobuta[4,5]thiazolo[3,2-a]pyridine-8a-carboxylic acid, (2S)-6-(dimethylamino)-4-methoxy-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid, (2S)-5-(benzo[b]thiophen-2-ylmethyl)-2-(3-chlorophenyl)-4-cyclopropyl-7-oxo-2,2a,7,8a-tetrahydro-1H-cyclobuta[4,5]thiazolo[3,2-a]pyridine-8a-carboxylic acid, (2S)-4-cyclopropyl-5-(2,3-dichlorobenzyl)-2-(3,5-dimethylphenyl)-7-oxo-2,2a,7,8a-tetrahydro-1H-cyclobuta[4,5]thiazolo[3,2-a]pyridine-8a-carboxylic acid, (2S)-5-(4-butoxy-3-methylbenzyl)-2-(3-chlorophenyl)-4-cyclopropyl-7-oxo-2,2a,7,8a-tetrahydro-1H-cyclobuta[4,5]thiazolo[3,2-a]pyridine-8a-carboxylic acid, (2S)-4-cyclopropyl-2-(2,6-dichlorophenyl)-5-(naphthalen-2-ylmethyl)-7-oxo-2,2a,7,8a-tetrahydro-1H-cyclobuta[4,5]thiazolo[3,2-a]pyridine-8a-carboxylic acid, (2S)-5-(benzo[b]thiophen-2-ylmethyl)-4-cyclopropyl-2-(2,6-dichlorophenyl)-7-oxo-2,2a,7,8a-tetrahydro-1H-cyclobuta[4,5]thiazolo[3,2-a]pyridine-8a-carboxylic acid, (2-(8-cyclopropyl-7-(naphthalen-2-ylmethyl)-5-oxo-3,5-dihydro-2H-thiazolo[3,2-a]pyridin-3-ypethyl)boronic acid, (2-(8-cyclopropyl-5-oxo-7-(3-(trifluoromethyObenzyl)-3,5-dihydro-2H-thiazolo[3,2-a]pyridin-3-ypethyl)boronic acid, (2-(7-(naphthalen-2-ylmethyl)-5-oxo-8-(3-(trifluoromethyl)phenyl)-3,5-dihydro-2H-thiazolo[3,2-a]pyridin-3-ypethyl)boronic acid, (2-(8-methoxy-7-(naphthalen-2-ylmethyl)-5-oxo-3,5-dihydro-2H-thiazolo[3,2-a]pyridin-3-yl)ethyl)boronic acid, 2-(4-(hexyloxy)-3-methylphenyl)-7-(naphthalen-2-ylmethyl)-5-oxo-5H-thiazolo[3,2-a]pyridine-3-carboxylic acid, (2S)-4-cyclopropyl-2a-methyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid, (2R)-4-cyclopropyl-2a-methyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid, (2S)-4-cyclopropyl-5-(naphthalen-1-ylmethyl)-7-oxo-2-(3-(trifluoromethyl)phenyl)-2a-vinyl-2,2a,7,8a-tetrahydro-1H-cyclobuta[4,5]thiazolo[3,2-a]pyridine-8a-carboxylic acid, (2R)-4-cyclopropyl-5-(naphthalen-1-ylmethyl)-7-oxo-2-(3-(trifluoromethyl)phenyl)-2a-vinyl-2,2a,7,8a-tetrahydro-1H-cyclobuta[4,5]thiazolo[3,2-a]pyridine-8a-carboxylic acid, (2S)-6-(azetidin-1-yl)-4-cyclopropyl-2-(3,5-dichlorophenyl)-5-(naphthalen-1-ylmethyl-7-oxo-2,2a,7,8a-tetrahydro-1H-cyclobuta[4,5]thiazolo[3,2-a]pyridine-8a-carboxylic acid, (2S)-4-cyclopropyl-2-(3,5-dichlorophenyl)-5-(naphthalen-1-ylmethyl)-7-oxo-2,2a,7,8a-tetrahydro-1H-azeto[2',3':4,5]thiazolo[3,2-a]pyridine-8a-carboxylic acid, (2S)-4-cyclopropyl-2-(3,5-dichlorophenyl)-1-methyl-5-(naphthalen-1-ylmethyl)-7-oxo-2,2a,7,8a-tetrahydro-1H-azeto[2',3':4,5]thiazolo[3,2-a]pyridine-8a-carboxylic acid, (2-((2S)-4-cyclopropyl-2-(3,5-dichlorophenyl)-5-(naphthalen-1-ylmethyl)-7-oxo-2,2a,7,8a-tetrahydro-1H-cyclobuta[4,5]thiazolo[3,2-a]pyridin-8a-ypethypboronic acid, 1-(cyanomethyl)-4-cyclopropyl-5-(naphthalen-1-ylmethyl)-7-oxo-2-phenyl-2,2a,7,8a-tetrahydro-1H-cyclobuta[4,5]thiazolo[3,2-a]pyridine-8a-carboxylic acid, or a pharmaceutically acceptable salt of any one of the foregoing compounds.

In certain embodiments that may be mentioned, there is provided a compound of formula I or a pharmaceutically acceptable salt thereof, wherein:

$R_1$ is selected from the group consisting of:
a) C(O)OH,
b) tetrazolyl,
c) $(CH_2)_m B(OH)_2$,
d) $C(O)NHSO_2R_8$,
e) $NH_2$, and
f) H, $R_2$ is selected from the group consisting of:
a) H,
b) Cl, F, Br or I,
c) $CH_2OH$,
d) $C_1$-$C_4$alkyl,
e) $NZ_1Z_2$, and
f) $NO_2$, $R_3$ is selected from the group consisting of:
a) 1-naphtyl, 2-naphtyl, isoquinolin-4-yl, 1-naphtyloxy, 9-anthryl and 9-anthryloxy each independently substituted with 0, 1, 2 or 3 substituents selected from the group consisting of methyl, fluoro, chloro, bromo, cyano and methoxy,
b) $C_1$-$C_4$alkyl substituted with 0, 1, 2, 3 or 4 fluoro,
c) phenyl substituted with 0, 1, 2 or 3 substituents independently selected from the group consisting of methyl, fluoro, chloro, cyano and trifluoromethyl,
d) aminophenyl substituted with 0, 1, 2 or 3 substituents independently selected from the group consisting of methyl, fluoro, chloro and trifluoromethyl
e) 2-(3-methyl)phenylmethylene,
f) benzothiophen-2-yl,
g) H,
h) 2-methyl-1-aza-2-bora-1H-naphth-5-yloxy, and
i) 2-methyl-1-aza-2-bora-1H-napth-5-yl, $R_4$ is selected from the group consisting of:
a) $C_1$-$C_4$alkyl substituted with 0, 1, 2, 3 or 4 fluoro;
b) $C_3$-$C_6$cycloalkyl,
c) $C_1$-$C_4$alkoxy substituted with 0, 1, 2, 3 or 4 fluoro, d) $C_3$-$C_6$cycloalkoxy,
e) a 3-, 4-, 5-, or 6-membered heterocycle,
f) $NZ_1Z_2$,
g) $CH_2NZ_1Z_2$,
h) $C(O)OH$, and
i) $C(O)H$,
$R_5$ is selected from the group consisting of.
a) H,
b) $C_1$-$C_6$alkyl,
c) $C_1$-$C_6$alkenyl, and
d) aryl,
$R_6$ is:

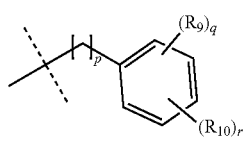

$R_7$ is H, or
$R_7$ together with $R_5$ form a double bond, or
$R_7$ together with $R_6$ form —Q—CH—$R_{11}$—, or and in the above definitions:
$R_8$ is $C_1$-$C_4$alkyl or phenyl,
$R_9$ is selected from the group consisting of F, Cl, Br, and $C_1$-$C_4$alkyl,
$R_{10}$ is selected from the group consisting of OH, $C_1$-$C_{10}$alkoxy, $C_1$-$C_{10}$alkenoxy, $C_1$-$C_{10}$alkynoxy and $O(CH_2)_{20}CH_3$,
$R_{11}$ is (Y)sphenyl wherein the phenyl moiety is substituted with 0, 1, 2, 3 or 4 substituents independently selected from the group consisting of
  a) $C_1$-$C_4$alkyl substituted with 0, 1, 2, 3 or 4 substituents independently selected from the group consisting of Cl, Br, F, I, and $C_1$-$C_{10}$alkoxy,
  b) Cl, F, Br or I,
  c) a five-membered saturated or unsaturated heterocycle, and
  d) $NH_2$ or $NHC_1$-$C_6$alkyl,
Q is selected from the group consisting of:
$CH_2$,
$CHC_1$-$C_6$alkyl,
$CHNO_2$,
$CHNH_2$,
N H,
$NC_1$-$C_6$alkyl,
NOH,
$NOC_1$-$C_6$alkyl,
$NC(O)C_1$-$C_6$alkyl,
$NSO_2C_1$-$C_6$alkyl,
S,
O,
X is S, SO or $SO_2$,
Y is S or $CH_2$,
$Z_1$ and $Z_2$ each independently represents hydrogen, methyl, $CH_3S(O)_2$, $C(O)OR_{10}$, $C(O)NR_{10}R_{11}$ or $C(O)R_{10}$, or $Z_1$ and $Z_2$ together form —$(CH_2)_3$, —$(CH_2)_4$, or —$(CH_2)_5$,
n, m, p, q, r, and s each independently represents 0, 1 or 2,
with the proviso that when $R_7$ is H or forms a double bond with $R_5$ then $R_1$ is $(CH_2)_mB(OH)_2$.

The compounds described herein may be provided in the form of a pharmaceutical composition. Thus, there is provided a pharmaceutical composition comprising or consisting of:

(i) a compound of Formula I as described herein, or a pharmaceutically acceptable salt thereof, and
(ii) optionally a drug against a disease involving gram-positive bacteria, or a pharmaceutically acceptable salt of said drug wherein (i) and optionally (ii) is/are in admixture with a pharmaceutically acceptable adjuvant, carrier or excipient.

For instance, there is provided a pharmaceutical composition comprising or consisting of:
(i) a compound of Formula I as described herein, or a pharmaceutically acceptable salt thereof, and
(ii) a drug against a disease involving gram-positive bacteria, or a pharmaceutically acceptable salt of said drug wherein (i) and/or (ii) is/are in admixture with a pharmaceutically acceptable adjuvant, carrier or excipient.

Further, there is provided a process for the preparation of a pharmaceutical composition as hereinbefore defined, which process comprises bringing into association a compound of Formula I, a drug against a disease involving gram-positive bacteria, and at least one (e.g. pharmaceutically-acceptable) excipient.

It will be appreciated that the pharmaceutical composition may be provided as a single composition. Alternatively, the pharmaceutical composition may be provided as a kit of parts such as a kit of parts comprising or consisting of:
(i) a compound of Formula I as described herein, or a pharmaceutically acceptable salt thereof, and optionally a pharmaceutically acceptable adjuvant, carrier or excipient,
(ii) optionally a drug against a disease involving gram-positive bacteria, or a pharmaceutically acceptable salt of said drug, and optionally a pharmaceutically acceptable adjuvant, carrier or excipient, and
(iii) optionally instructions for use such as instructions for separate, sequential or simultaneous use of (i) and (ii).

For instance, the pharmaceutical composition may be provided as a kit of parts such as a kit of parts comprising or consisting of:
(i) a compound of Formula I as described herein, or a pharmaceutically acceptable salt thereof, and optionally a pharmaceutically acceptable adjuvant, carrier or excipient,
(ii) a drug against a disease involving gram-positive bacteria, or a pharmaceutically acceptable salt of said drug, and optionally a pharmaceutically acceptable adjuvant, carrier or excipient,
which component (i) and (ii) are each provided in a form that is suitable for administration in conjunction with the other.

Further, the pharmaceutical composition may be provided as a kit of parts such as a kit of parts comprising or consisting of:
(i) a compound of Formula I as described herein, or a pharmaceutically acceptable salt thereof, and optionally a pharmaceutically acceptable adjuvant, carrier or excipient,
(ii) a drug against a disease involving gram-positive bacteria, or a pharmaceutically acceptable salt of said drug, and optionally a pharmaceutically acceptable adjuvant, carrier or excipient, and
(iii) instructions for use such as instructions for separate, sequential or simultaneous use of (i) and (ii).

There is also provided a process for the preparation of a kit-of-parts as hereinbefore defined, which process comprises bringing into association components (i) and (ii). As used herein, references to bringing into association will mean that the two components are rendered suitable for administration in conjunction with each other.

Thus, in relation to the process for the preparation of a kit-of-parts as hereinbefore defined, by bringing the two components "into association with" each other, we include that components (i) and (ii) of the kit-of-parts may be:
 (a) provided as separate formulations (i.e. independently of one another), which are subsequently brought together for use in conjunction with each other in combination therapy; or
 (b) packaged and presented together as separate components of a "combination pack" for use in conjunction with each other in combination therapy.

Further, there is provided a compound of Formula I as described herein (i.e. including all embodiments, combinations of embodiments and particular features thereof, such as compounds of formulae II, III and IV) and/or a pharmaceutical composition as described herein for use as a medicament.

There is also provided a compound of Formula I as described herein and/or a pharmaceutical composition as described herein for use in the treatment and/or prevention of a disease involving gram-positive bacteria.

There is also provided a compound of Formula I as described herein and/or a pharmaceutical composition as described herein for the manufacture of a medicament for the treatment and/or prevention of a disease involving gram-positive bacteria.

There is also provided a method for treatment and/or prevention of a disease involving gram-positive bacteria comprising administering to a mammal, such as a human or an animal, an effective amount of a compound of Formula I as described herein, such as a compound of Formula I, or a pharmaceutical composition as described herein.

As described herein, the gram-positive bacteria of the disease described herein may be selected from the group consisting of *Staphylococcus aureus*, Methicillin-resistant *Staphylococcus aureus* (MRSA), Vancomycin-Resistant Enterococci (VRE), *Enterococcus faecalis* (*E. faecalis*), *Enterococcus faecium*, Vancomycin-Intermediate *Staphylococcus aureus* (VISA), Vancomycin-Resistant *Staphylococcus aureus* (VRSA), *Clostridium difficile* (*C. difficile*), *Clostridium tetani, Streptococcus pyogenes, Staphylococcus saphyticus, Bacillus subtilis* and any combination thereof. The disease involving gram-positive bacteria may be a healthcare-associated infection. Examples of the disease involving gram-positive bacteria, which may or may not be healthcare-associated, include diseases selected from the group consisting of urinary tract infection (UTI), catheter associated urinary tract infection, central line associated bloodstream infection (CLABSI), pneumonia, wound associated infection, surgical site infection, bacterial endocarditis, tetanus and any combination thereof. The central line associated bloodstream infection may be bacteremia or sepsis. Further, the disease involving gram-positive bacteria may be drug-resistant such as resistant to drugs frequently used to treat diseases involving gram-positive bacteria.

Compounds of Formula I are indicated both in the therapeutic, palliative, and/or diagnostic treatment, as well as the prophylactic treatment (by which we include preventing and/or abrogating deterioration and/or worsening of a condition) of any of the above conditions.

Compounds of Formula I will normally be administered orally, intravenously, subcutaneously, buccally, rectally, dermally, nasally, tracheally, bronchially, by any other parenteral route, or via inhalation or pulmonary route, or any combination thereof, in a pharmaceutically acceptable dosage form, in solution, in suspension, in emulsion, including nanosuspensions, or in liposome formulation. Additional methods of administration include, but are not limited to, intraarterial, intramuscular, intraperitoneal, intraportal, intradermal, epidural, intrathecal administration, or any combination thereof.

In some embodiments, compounds of Formula I may be administered alone (e.g. separately), and/or sequentially, and/or in parallel at the same time (e.g. concurrently), using different administrative routes, but are preferably administered by way of known pharmaceutical formulations, including tablets, capsules or elixirs for oral administration, suppositories for rectal administration, sterile solutions, suspensions or emulsions for parenteral or intramuscular administration, or via inhalation, and the like.

Further, administration of a therapeutically effective amount of a compound of Formula I is performed by a combination of administrative routes, either separately (e.g. about 2 or more hours apart from one another), sequentially (e.g. within about 2 hours of one another), or in parallel at the same time (e.g. concurrently), achieving an effective dosage.

There is also provided a method of treating a disease involving gram-positive bacteria, which method comprises administering a therapeutically effective amount of a compound of Formula I through a combination of administrative routes, either separately, sequentially, or in parallel at the same time, in order to achieve effective amount or dosage, to a patient in need of such a therapy.

Such combinations of administrative routes, may be presented as separate formulations of a compound of Formula I that are optimized for each administrative route.

Such formulations may be prepared in accordance with standard and/or accepted pharmaceutical practice.

Depending upon the patient to be treated and the route of administration, compounds of Formula I may be administered at varying doses. Although doses will vary from patient to patient, suitable daily doses are in the range of about 0.1 to about 5000 mg per patient, administered in single or multiple doses. Example daily doses are in the range of about 0.1 to about 3000 mg per patient. An example daily dose is in the range of from about 50 to about 2000 mg per patient.

Individual doses of compounds of Formula I may be in the range of about 0.1 to about 5000 mg.

In any event, the physician, or the skilled person, will be able to determine the actual dosage, which will be most suitable for an individual patient, which is likely to vary with the condition that is to be treated, as well as the age, weight, sex and response of the particular patient to be treated. The above-mentioned dosages are exemplary of the average case; there can, of course, be individual instances where higher or lower dosage ranges are merited, and such are within the scope of this invention.

The benefits of using compounds of Formula I, preferably via a combination of administrative routes, separately, and/or sequentially, and/or in parallel at the same time is to produce a tailored treatment for the patient in need of the therapy, with the possibility of preventing and/or reducing side effects, and also tune the correct dosage levels of a therapeutically effective amount of a compound of Formula I.

The kits of parts described herein may comprise more than one formulation including an appropriate quantity/dose of a compound of Formula I, and/or more than one formulation including an appropriate quantity/dose of the drug against a disease involving gram-positive bacteria, in order to provide for repeat dosing. If more than one formulation (comprising either active compound) is present, such formulations may be the same, or may be different in terms of the dose of either compound, chemical composition(s) and/or physical form(s).

With respect to the kits of parts as described herein, by "administration in conjunction with", we include that respective formulations comprising a compound of Formula I and a drug as described herein are administered, sequentially, separately and/or simultaneously, over the course of treatment of the relevant condition.

Thus, in respect of the combination product according to the invention, the term "administration in conjunction with" includes that the two components of the combination product (compound of Formula I and drug against a disease involving gram-positive bacteria) are administered (optionally repeatedly), either together, or sufficiently closely in time, to enable a beneficial effect for the patient, that is greater, over the course of the treatment of the relevant condition, than if either a formulation comprising a compound of Formula I, or a formulation comprising the drug, are administered (optionally repeatedly) alone, in the absence of the other component, over the same course of treatment. Determination of whether a combination provides a greater beneficial effect in respect of, and over the course of treatment of, a particular condition will depend upon the condition to be treated or prevented, but may be achieved routinely by the skilled person.

Further, in the context of a kit-of-parts according to the invention, the term "in conjunction with" includes that one or other of the two formulations may be administered (optionally repeatedly) prior to, after, and/or at the same time as, administration of the other component. When used in this context, the terms "administered simultaneously" and "administered at the same time as" include that individual doses of the relevant compound of Formula I and drug against a disease involving gram-positive bacteria are administered within 48 hours (e.g. 24 hours) of each other.

Pharmaceutical compositions/formulations, combination products and kits as described herein may be prepared in accordance with standard and/or accepted pharmaceutical practice.

Thus, in a further aspect of the invention there is provided a process for the preparation of a pharmaceutical composition/formulation, as hereinbefore defined, which process comprises bringing into association certain compounds of Formula I, as described herein, with one or more pharmaceutically-acceptable excipients (e.g. adjuvant, diluent and/or carrier).

In further aspects of the invention, there is provided a process for the preparation of a combination product or kit-of-parts as hereinbefore defined, which process comprises bringing into association certain compounds of Formula I, as hereinbefore defined, with the drug against a disease involving gram-positive bacteria, and at least one pharmaceutically-acceptable excipient.

Subjects suitable to be treated with formulations of the present invention include, but are not limited to, mammalian subjects, in particular human subjects.

When used herein in relation to a specific value (such as an amount), the term "about" (or similar terms, such as "approximately") will be understood as indicating that such values may vary by up to 10% (particularly, up to 5%, such as up to 1%) of the value defined. It is contemplated that, at each instance, such terms may be replaced with the notation "±10%", or the like (or by indicating a variance of a specific amount calculated based on the relevant value). It is also contemplated that, at each instance, such terms may be deleted.

The compounds described herein, such as compounds of Formula I may also have the advantage that they may be more efficacious than, be less toxic than, be longer acting than, be more potent than, produce fewer side effects than, be more easily absorbed than, and/or have a better pharmacokinetic profile (e.g. higher oral bioavailability and/or lower clearance) than, and/or have other useful pharmacological, physical, or chemical properties than compounds known in the prior art, whether for use in the treatment and/or prevention of a disease involving gram-positive bacteria or otherwise.

Thus, it is also to be understood that the compounds described herein, such as compounds of Formula I, in particular compounds of Formula II, may also have the advantage that they may be efficacious in the prevention and/or treatment of diseases involving gram-positive bacteria that may be drug-resistant such as resistant to drugs frequently used to treat diseases involving gram-positive bacteria. Further, it is to be understood that the compounds described herein, such as compounds of Formula I, in particular compounds of Formula II, may delay and/or ameliorate resistance of gram-positive bacteria (i.e. gram-positive bacteria display delayed and/or ameliorated resistance) to drugs frequently used to treat diseases involving gram-positive bacteria. Such effects may be evaluated clinically, objectively and/or subjectively by a health care professional, a treatment subject or an observer.

The drug against a disease involving gram-positive bacteria described herein may be an antibiotic such as selected from the group consisting of glycopeptide antibiotics, lipoglycopeptide antibiotics, lipopeptide antibiotics, penicillins (including aminopenicillin) antibiotics, oxazolidinone antibiotics, aminoglycoside antibiotics, fluoroquinolone antibiotics and any combination thereof. The glycopeptide antibiotics may be a semisynthetic glycopeptide antibiotics. The glycopeptide antibiotics may be vancomycin and/or teicoplanin. The lipoglycopeptide antibiotics may be telavancin. The lipopeptide antibiotics may be daptomycin. The penicillin antibiotics may be oxacillin and/or ampicillin. The oxazolidinone antibiotics may be linezolide and/or teidizolide. The semisynthetic antibiotics may be orbactiv. The aminoglycoside antibiotics may be gentamicin, tobramycin, amikacin, streptomycin, neomycin, and/or paromomycin. The fluoroquinolone antibiotics may be ciprofloxacin.

It will be appreciated that teicoplanin is a mixture of several compounds, namely five major compounds (named teicoplanin $A_2$-1 through $A_2$-5) and four minor (named teicoplanin $R_S$-1 through $R_S$-4). All teicoplanins share a same glycopeptide core, termed teicoplanin $A_3$-1—a fused ring structure to which two carbohydrates (mannose and N-acetylglucosamine) are attached. The major and minor components also contain a third carbohydrate moiety—β-D-glucosamine—and differ only by the length and conformation of a side-chain attached to it. The present disclosure encompasses all teicoplanin mixtures.

For instance, the drug against a disease involving gram-positive bacteria as described herein may be selected from the group consisting of vancomycin, oxacillin, ampicillin, dalbavancin, oritavancin, teicoplanin, daptomycin, linezolid, tedizolid, telavancin, gentamicin, tobramycin, amikacin, streptomycin, neomycin, paromomycin, and ciprofloxacin and any combination thereof. In an example, the drug may be vancomycin, oxacillin and/or gentamicin. For example, ampicillin, ciprofloxacin, vancomycin and gentamicin. For instance, the drug may be gentamicin.

The chemical structures of vancomycin, oxacillin, dalbavancin, oritavancin, teicoplanin, daptomycin, linezolid, tedizolid, telavancin, gentamicin are as described in the figures of this document.

Subjects may thus also (and/or may be already) be receiving one or more of any of the other drugs mentioned above, by which we mean receiving a prescribed dose of one or more of those drugs, prior to, in addition to, and/or following, treatment with compounds of Formula I or pharmaceutically acceptable salts thereof.

Salts

The compounds of the present disclosure may be provided as a pharmaceutically acceptable salt. A suitable pharmaceutically acceptable salt of a compound of the present disclosure may be, for example, a base-addition salt of a compound of the present disclosure. For example, the compounds of the present disclosure may form a metal salt with one or more of the following metals: lithium, sodium, potassium, calcium, magnesium, zinc, aluminum. In a further example, the compounds of the present disclosure may form a salt with an organic base such as methylamine, ethylamine, diethylamine, trimethylamine, tert-butylamine, triethylamine, dibenzylamine, N,N-dibenzylethylamine, cyclohexylethylamine, tris-(2-hydroxyethyl)amine, hydroxyethyl diethylamine, (1R, 2S)-2-hydroxyinden-I-amine, morpholine, N-methylpiperidine, N-ethylpiperidine, imidazole, piperazine, methylpiperazine, adamantylamine, choline hydroxide, tetrabutylammonium hydroxide, tris-(hydroxymethyl)methylamine hydroxide, L-arginine, N-methyl D-glucamine, lysine or arginine.

In an example, there is provided an imidazole salt of the compounds of the present disclosure such as a compound of the present disclosure wherein $R_1$ is C(O)OH, tetrazolyl or C(O)NHSO$_2$R$_8$. It will be appreciated that the imidazole salt is a combination of a compound of the present disclosure and imidazole.

As described herein, proton transfer may occur between the active pharmaceutical ingredient such as the compounds described herein and the base forming the counter ion of the salt. The proton transfer may take place to a varying extent.

For instance, when the $R_1$ group of the compounds described herein is C(O)OH it may combine with imidazole to form a salt which may be depicted as shown below:

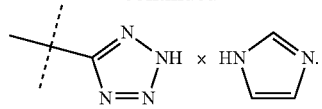

In a further example, when the $R_1$ group of the compounds described herein is tetrazolyl it may combine with imidazole to form a salt which may be depicted as shown below:

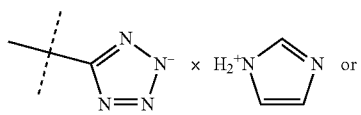

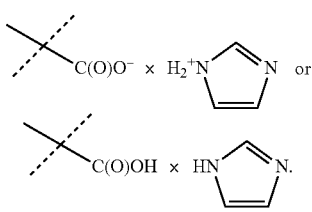

In still a further example, when the $R_1$ group of the compounds described herein is C(O)NHSO$_2$R$_8$ it may combine with imidazole to form a salt which may be depicted as shown below:

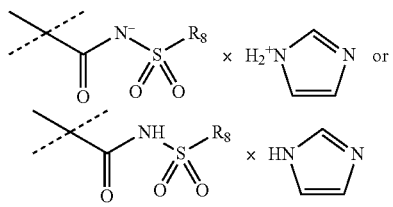

It will be appreciated that the imidazole salts of the compounds described herein wherein $R_1$ is C(O)OH, tetrazolyl or C(O)NHSO$_2$R$_8$ may be depicted as shown above regardless of the extent of proton transfer.

As described herein, particular compounds of Formula I that may be mentioned include the compounds of the examples. Where an example compound is indicated to have been obtained in a particular salt form, the skilled person will understand that particular compounds described include the free base or free acid (as appropriate) of that compound and pharmaceutically acceptable salts thereof.

Stereoisomers

The compounds described herein may be achiral or may exist as stereoisomers such as enantiomers, diastereoisomers and any mixture thereof. It is to be understood that the present disclosure encompasses all such stereoisomers. For example, the compounds described herein may be provided as a (−)-enantiomer, (+)-enantiomer or a mixture thereof such as a racemate. Further, the compounds described herein may be provided as a diastereoisomeric mixture such as a diastereoisomeric mixture comprising:
(i) a compound of Formula II syn comprising a compound of Formula IIa and/or a compound of Formula IIb, and
(ii) a compound of Formula II anti comprising a compound of Formula IIc and/or a compound of Formula IId.

It will be appreciated that the stereoisomers of the compounds described herein may be separated from each other using technique known in the art, such as chromatography.

For instance, the compounds of Formula II syn and Formula II anti are diasteroisomers and may be separated by chromatography or crystallization. Further, enantiomers, such as the enantiomers of Formula IIa/Formula IIb or the enantiomers of Formula IIc/Formula IId, may be separated by chiral HPLC or by resolution involving conversion into diastereoisomers.

The skilled person will understand that where certain stereocentres (such as those indicated herein) have a specified stereochemistry, it is contemplated that in certain embodiments the compound will be present in the substantial absence of the other stereoisomers.

As used herein, references to the substantial absence of other stereoisomers may refer to the desired stereoisomer being present at a purity of at least 80% (e.g. at least 90%, such as at least 95%) relative to the other stereoisomers. Alternatively, the relevant stereochemical configuration may be referred to as being present in an enantiomeric excess (e.e.) or diastereomeric excess (d.e.), as appropriate, of at least 90% (such as at least 95%, at least 98% or, particularly, at least 99%, for example at least 99.9%).

For the avoidance of doubt, compounds referred to as having a specific stereochemistry at a defined position may also have stereochemistry at one or more other positions, and so may exist as mixtures of enantiomers or diastereoisomers in relation to the stereochemistry at those positions.

Solvates or Hydrates

Certain compounds of the present disclosure may exist as solvates or hydrates. It is to be understood that the present disclosure encompasses all such solvates or hydrates.

Isotopic Labelling

Compounds of the present disclosure may also contain unnatural proportions of atomic isotopes at one or more of the atoms that constitute such compounds. For example, the compounds may be radiolabeled with radioactive isotopes, such as for example tritium ($^3H$), iodine-125 ($^{125}I$) or carbon-14 ($^{14}C$). The compounds of the present disclosure may also be labeled with deuterium ($^2H$). All isotopic variations of the compounds of the present disclosure, whether radioactive or not, are intended to be encompassed within the scope of the present disclosure.

Co-Crystals

In a salt, proton transfer may occur between the active pharmaceutical ingredient and the counter ion of the salt. However, in some cases there is no or only partial proton transfer and the solid is therefore not a true salt. It is accepted that the proton transfer is in fact a continuum, and can change with temperature, and therefore the point at which a salt is better described as a "co-crystal" may be subjective. The term "co-crystal" as used herein refers to multicomponent system in which there exists a host molecule or molecules (active pharmaceutical ingredient) and a guest (or co-former) molecule or molecules. The guest or co-former molecule is defined as existing as a solid at room temperature in order to distinguish the co-crystal from solvates. However, a co-crystal may itself form solvates. In a co-crystal there is generally predominance for interaction through non-ionic forces, such as hydrogen bonding. It will be appreciated that all co-crystals are included within the scope of the compounds described herein.

Polymorphs

Compounds of the present disclosure may exist in a continuum of solid states ranging from fully amorphous to fully crystalline. Thus, it is to be understood that all polymorphs, such as mixtures of different polymorphs, are included within the scope of the compounds described herein.

Prodrugs

In addition, compounds of the present disclosure may be administered in the form of a prodrug. A prodrug is a compound which may have little or no pharmacological activity itself, but when such compound is administered into or onto the body of a patient, it is converted into a compound of Formula II. The prodrug may contain a metabolically or chemically labile acyl function, such as a carboxylate ester or carbamate.

Methods of Preparation

The compounds described herein may be prepared as described in this document, following the experimental procedure as described in WO 2018/229141, the contents of which are incorporated herein by reference (in particular, page 37, line 10 to page 61, line 5), or using procedures as known in the art.

Experiments were generally carried out under inert atmosphere (nitrogen or argon), particularly in cases where oxygen- or moisture-sensitive reagents or intermediates were used.

For example, compounds of Formula II, wherein $R_1$ represents C(O)OH, may be provided using a 2+2 cycloaddition as depicted in Scheme 1.

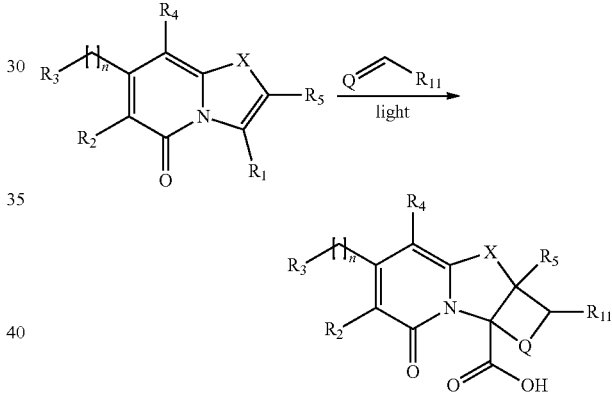

Scheme 1

It will be appreciated that Q, in the substrate Q=CHR$_{11}$ in Scheme 1, may be CH$_2$ so 15 that the substrate is an alkene of formula CH$_2$CHR$_{11}$, which is illustrated in Scheme 2.

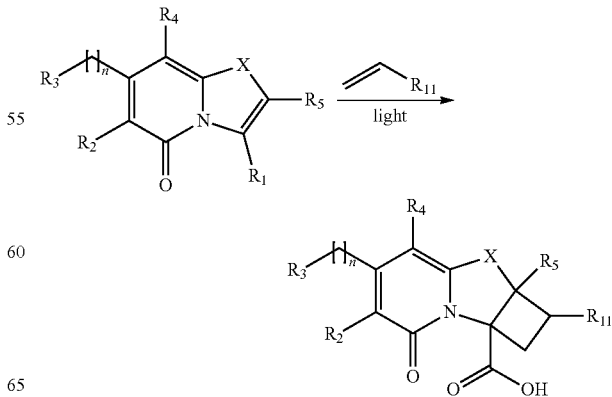

Scheme 2

Further, the compounds of Formula II in Schemes 1 and 2 may be a compound of Formula II syn, a compound of Formula II anti or a combination thereof. Scheme 3 illustrates formation of a mixture of a compound of Formula II syn and Formula II anti.

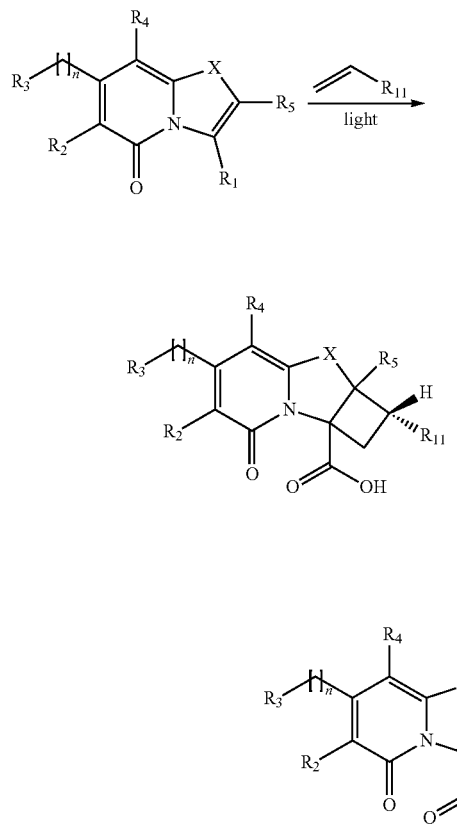

The light used in the cycloaddition reaction in Schemes 1 to 3 may be visible light, LED light, such as LED light at 395 nm, or any other light with a suitable wavelength. The above cycloaddition reaction in Schemes 1 to 3 may be performed under standard 2+2 cycloaddition reaction conditions. This includes the presence of an appropriate solvent (e.g. dichloromethane or acetonitrile) and/or that the reaction may be performed at below (e.g. 5° C.), around or above room temperature (e.g. up to 40° C.).

The compound of Formula II syn and Formula II anti may be separated by e.g. chromatography optionally followed by resolution into the enantiomer described herein. It will be appreciated that the diastereoisomers and enantiomers may be further treated into the desired compound. For instance, ester groups into carboxylic acids, substituents may be introduced or exchanged for other substituents etc. For instance, the exchange of ester groups into carboxylic acids may be performed using techniques known to those skilled in the art, e.g. acidification in the presence of an appropriate solvent (e.g. THF), an appropriate base (e.g. lithium hydroxide) at around or above room temperature (e.g. 60-70° C.).

The compound of Formula III may be prepared using methods described in the art. For example, the compound of Formula III may be prepared as described in WO 2014/185853, WO 2017/175182, WO 2018/229141 or WO 2019/068910.

For example, compounds of Formula III, wherein $R_1$ represents $(CH_2)_2B(OH)_2$, may be provided using a decarboxylative alkylation reaction as depicted in Scheme 4 below, followed by a deprotection step (to form the boronic acid).

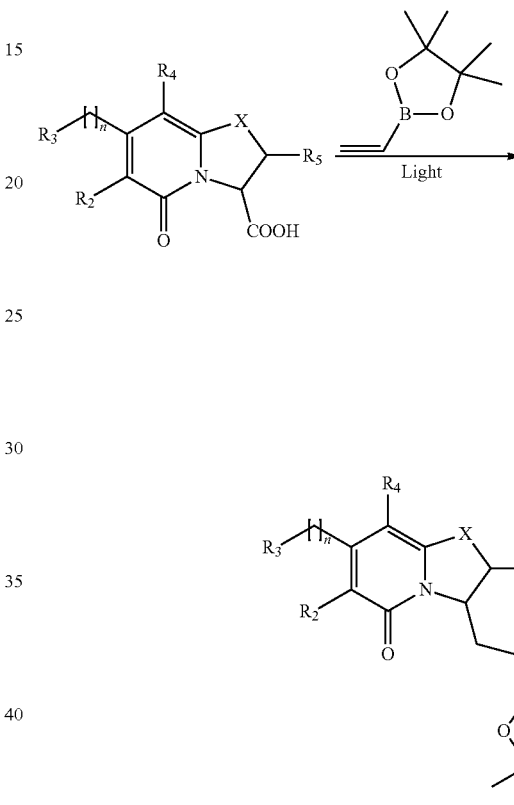

The light used in the decarboxylative alkylation reaction in Schemes 4 above may be visible light, LED light, such as LED light at 455 nm, or any other light with a suitable wavelength. The reaction in Scheme 4 may be performed under standard decarboxylative alkylation reaction conditions. This includes the presence of an appropriate photocatalyst (e.g. $Ir[dF(CF_3)ppy]_2(dtbpy)PF_6$), an appropriate solvent (e.g. DMF), an appropriate base (e.g. dipotassium hydrogen phosphate) and/or that the reaction may be performed at below (e.g. 5° C.), around or above room temperature (e.g. up to 40° C.).

It is to be appreciated that deprotection of pinacolyl boronate esters, as those depicted in Scheme 4 above, may be performed using techniques known to those skilled in the art, e.g. in the presence of a Lewis acid (e.g. $BCl_3$) in the presence of an appropriate solvent (e.g. DCM) at around or below room temperature (e.g. −78° C.).

The disclosure is further illustrated by the following non-limiting Examples.

EXAMPLES

Abbreviations

*C. difficile* Clostridium difficile
CLABSI central line associated bloodstream infection
DCM Dichloromethane
DMF Dimethylformamide
DMSO Dimethylsulphoxide
EtOAc Ethyl Acetate
ESI-TOF Electrospray Ionization Time of Flight Mass Spectroscopy
HCAI HealthCare-Associated Infection
HRMS High Resolution Mass Spectroscopy
IR Infrared
MBC Minimum Bactericidal Concentration
MeOH Methanol
MeCN Acetonitrile
MIC Minimum Inhibitory Concentration
ml milliliter
MRSA Methicillin-resistant *Staphylococcus aureus*
NMR Nuclear Magnetic Resonance
nd no data
nm nanometer
ns not statistically different
OD Optical density
OD600 Optical density at 600 nm
ppm part per million
Van Vancomycin
VISA Vancomycin-Intermediate *Staphylococcus aureus*
VRE Vancomycin-Resistant Enterococci
VRSA Vancomycin-Resistant *Staphylococcus aureus*
THF Tetrahydrofurane
TLC Thin Layer Chromatography
TMS Trimethylsilyl
UTI urinary tract infection
µl microliter In this document, unless otherwise stated, the drawing of the chemical compounds has been made using the program Chem Doodle version 9.0.3. The naming of the compounds has been made using the program Chemdraw, version 19.0.0. 26. If the name and drawing are inconsistent, the chemical structure shall be considered to be correct.

Chemistry

General

Unless otherwise stated, all reagents and solvents were used as received from commercial suppliers. Microwave reactions were performed in sealed vessels using a Biotage® Initiator microwave synthesizer; temperatures were monitored by an internal IR probe. Automated flash column chromatography was performed using a Biotage® Isolera One system and purchased pre-packed silica gel cartridges (Biotage® SNAP Cartridge, KP-Sil). 1H- and 13C- NMR spectra were recorded, depending on instrument availability, on a Bruker Avance III 400 MHz spectrometer with a BBO-F/H Smartprobe™, a Bruker Avance III HD 600 MHz spectrometer with a CP BBO-H/F, 5 mm cryoprobe at 298 K. All spectrometers were operated by Topspin 3.5.7. Resonances are given in ppm relative to TMS, and calibrated to solvent residual signals (CDCl$_3$: OH=7.26 ppm; $\delta_C$=77.16 ppm. (CD$_3$)$_2$SO (DMSO-d$_6$): $\delta_H$=2.50 ppm; $\delta_C$=39.51 ppm. CD$_3$OD (MeOD): $\delta_H$=3.31 ppm; $\delta_C$=49.00 ppm). The following abbreviations are used to indicate splitting patterns: s=singlet; d=doublet; dd=double doublet; t=triplet; m=multiplet; bs=broad singlet. HRMS was performed on a mass spectrometer with ESI-TOF (ES+).

Synthesis of Compounds

The compounds of the compound examples were synthesized in accordance or analogy with what is stated in the method of preparation section in this document. For instance, the compounds of Examples 1-41 were synthesized as follows.

General Procedure for 2+2 Cycloadditions: 2-Pyridone of general structure IV as described on the section "Methods of preparation" was weighed in a vial, added Dry DCM (0.1 M). Vial was sealed and degassed with N$_2$ for 5 minutes. Added styrene (4 eq.) and degassed again for 3-4 minutes. Reaction mixture was stirred under purple light (395 nm, 3.9 W) for 4-6 hours. After completion of reaction as indicated by TLC, solvent was evaporated under reduced pressure. Crude product was purified by column chromatography eluting with 0-100% ethyl acetate in heptane.

General procedure for acidification: Methyl ester was charged into a round bottom flask 30 and added THF. LiOH (4 eq., 1M; aq.) was added to the reaction mixture and stirred at room temperature for 24 hours. The reaction mixture was neutralized with HCl (1 M) and extracted with EtOAc. The organic phase was washed with brine and the solvent was removed under reduced pressure. Crude product was purified with preparative HPLC (H$_2$O/MeCN+0.75% HCOOH, 20-100% in 45 min, 100% in 10 min). The product 35 was freeze dried from a mixture of MeCN:H$_2$O (1:3).

General procedure for decarboxylative alkylation: To an oven dried vial was added carboxylic acid (1 eq.), photocatalyst (0.01 eq.), potassium phosphate dibasic (1.5 eq.) and the vial was sealed with septum. Under N$_2$ flow was added degassed DMF (5 mL). Then the mixture was degassed by bubbling N$_2$ for 10 min. Then alkene (2.0 eq.) was added and the solution was degassed for additional 5 min. The vial was sealed with parafilm and irradiated with 455 nm LED. After completion, reaction mixture was diluted with EtOAc and washed with brine. Solvent was removed under reduced pressure and the crude product was purified by column chromatography (10 g cartridge, heptane/EtOAc 0-100%).

General procedure for deprotection of pinacolyl boronate esters: Compound (1 eq.) was dissolved in dry DCM under N$_2$ and cooled to −78° C., then added BCl$_3$ (3 eq.) dropwise. Reaction mixture was stirred at −78° C. for 20 minutes and then allowed to come to room temperature. As completion indicated by TLC, solvent was evaporated under reduced pressure. Added methanol and stirred for 5 minutes at room temperature and then solvent was removed under reduced pressure. This process was repeated 4-5 times. The crude product was purified by column chromatography (10 g cartridge, DCM/MeOH 0-20%). The pure product was freeze dried from a mixture of MeCN:H$_2$O (1:3).

TABLE 1

| | Compound examples | |
|---|---|---|
| Example Number | Chemical structure Chemical name | NMR |
| 1 | 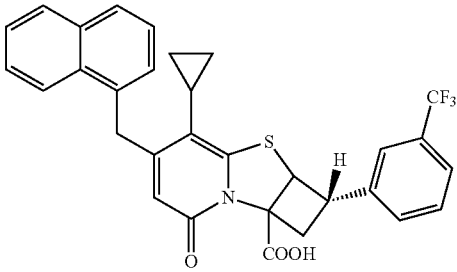 [SMILES: CC12Sc3c(C4CC4)c(Cc4cccc5ccccc45)cc(=O)n3C1(C(=O)O)C[C@H]2c1cccc(C(F)(F)F)c1]<br>(2S)-4-cyclopropyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid | $^1$H NMR (DMSO-d$_6$, 400 MHz) δ 8.00-7.98 (m, 1H), 7.95-7.94 (m, 1H), 7.91-7.90 (m, 1H), 7.71-7.60 (m, 2H), 7.65-7.61 (m, 2H), 7.58-7.52 (m, 3H), 7.44-7.43 (m, 1H), 5.27 (s, 1H), 4.71 (d, J = 6.9 Hz, 1H), 4.51 (s, 2H), 3.85 (dd, J = 17.7, 9.8 Hz, 1H), 3.07 (dd, J = 12.9, 10.3 Hz, 1H), 2.80 (dd, J = 12.3, 9.4 Hz, 1H), 1.82-1.77 (m, 1H), 1.00-0.93 (m, 2H), 0.89-0.85 (m, 1H), 0.77-0.74 (m, 1H). |
| 2 | 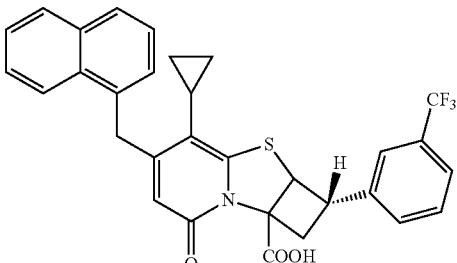<br>(+)-Enantiomer of (2S)-4-cyclopropyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid | $^1$H NMR (DMSO-d$_6$, 400 MHz) δ 8.00-7.98 (m, 1H), 7.95-7.94 (m, 1H), 7.91-7.90 (m, 1H), 7.71-7.60 (m, 2H), 7.65-7.61 (m, 2H), 7.58-7.52 (m, 3H), 7.44-7.43 (m, 1H), 5.27 (s, 1H), 4.71 (d, J = 6.9 Hz, 1H), 4.51 (s, 2H), 3.85 (dd, J = 17.7, 9.8 Hz, 1H), 3.07 (dd, J = 12.9, 10.3 Hz, 1H), 2.80 (dd, J = 12.3, 9.4 Hz, 1H), 1.82-1.77 (m, 1H), 1.00-0.93 (m, 2H), 0.89-0.85 (m, 1H), 0.77-0.74 (m, 1H). |
| 3 | 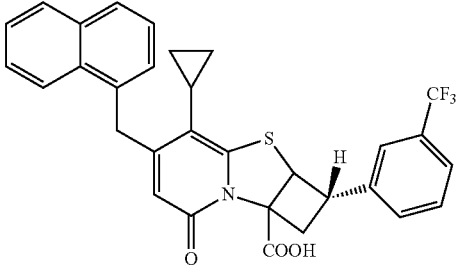<br>(−)-Enantiomer of (2S)-4-cyclopropyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid | $^1$H NMR (DMSO-d$_6$, 400 MHz) δ 8.00-7.98 (m, 1H), 7.95-7.94 (m, 1H), 7.91-7.90 (m, 1H), 7.71-7.60 (m, 2H), 7.65-7.61 (m, 2H), 7.58-7.52 (m, 3H), 7.44-7.43 (m, 1H), 5.27 (s, 1H), 4.71 (d, J = 6.9 Hz, 1H), 4.51 (s, 2H), 3.85 (dd, J = 17.7, 9.8 Hz, 1H), 3.07 (dd, J = 12.9, 10.3 Hz, 1H), 2.80 (dd, J = 12.3, 9.4 Hz, 1H), 1.82-1.77 (m, 1H), 1.00-0.93 (m, 2H), 0.89-0.85 (m, 1H), 0.77-0.74 (m, 1H). |

TABLE 1-continued

Compound examples

| Example Number | Chemical structure Chemical name | NMR |
|---|---|---|
| 4 | 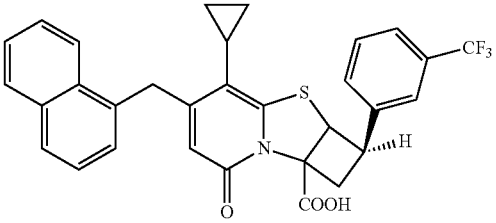<br>(2R)-4-cyclopropyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid | $^{1}$H NMR (DMSO-$d_6$, 600 MHz) δ 7.99-7.97 (m, 1H), 7.90-7.83 (m, 2H), 7.63 (d, J = 7.3 Hz, 1H), 7.57-7.50 (m, 4H), 7.35-7.32 (m, 2H), 7.25 (s, 2H), 5.25 (s, 1H), 4.97 (d, J = 8.7 Hz, 1H), 4.37 (s, 2H), 4.24-4.18 (m, , 1H), 3.46 (dd, J = 14.3, 10.9 Hz, 1H), 2.67 (dd, J = 14.3, 5.6 Hz, 1H), 1.64-1.41 (m, 1H), 0.83-0.77 (m, 1H), 0.66-0.59 (m, 1H), 0.39-0.32 (m, 1H), 0.09-0.03 (m, 1H). |
| 5 | 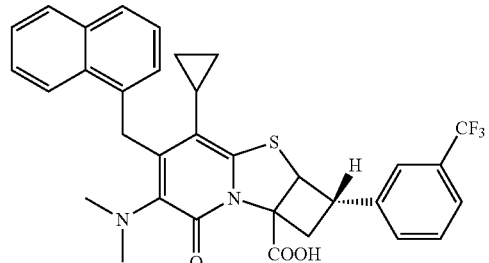<br>(2S)-4-cyclopropyl-6-(dimethylamino)-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid | $^{1}$H NMR (DMSO-$d_6$, 600 MHz) δ 8.32 (d, J = 8.4 Hz, 1H), 7.96 (d, J = 8.0 Hz, 1H), 7.78 (d, J = 8.2 Hz, 1H), 7.74 (d, J = 10.7 Hz, 2H), 7.66-7.62 (m, J = 8.4 Hz, 3H), 7.58 (t, J = 7.4 Hz, 1H), 7.43 (t, J = 7.7 Hz, 1H), 6.91 (d, J = 7.0 Hz, 1H), 4.74-4.68 (m, J = 15.4 Hz, 3H), 3.93 (q, J = 9.5 Hz, 1H), 3.19 (dd, J = 12.8, 10.0 Hz, 1H), 2.97 (dd, J = 12.8, 9.9 Hz, 1H), 2.57 (s, 6H), 1.34-1.22 (m, 1H), 0.63-0.49 (m, 4H).<br>$^{13}$C NMR (DMSO-$d_6$, 151 MHz) δ 169.05, 163.14, 158.16, 151.56, 146.78, 142.89, 136.43, 135.90, 133.30, 131.63, 131.02, 129.69, 129.37, 129.16, 128.58, 126.22, 126.12, 125.76, 125.51, 125.13, 123.75, 123.53, 123.50, 123.46, 50.61, 46.33, 42.61, 35.68, 30.64, 11.84, 7.32, 7.22. |
| 6 | 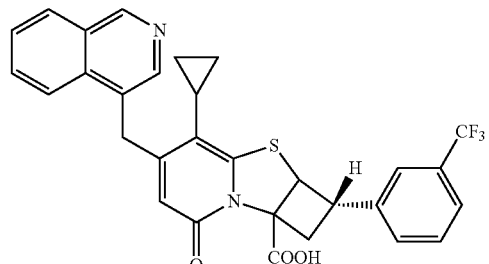<br>(2S)-4-cyclopropyl-5-(isoquinolin-4-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid | $^{1}$H NMR (MeOD, 400 MHz) δ 9.26 (s, 1H), 8.38 (s, 1H), 8.21 (d, J = 8.1 Hz, 1H), 7.99 (d, J = 8.4 Hz, 1H), 7.92-7.86 (m, 1H), 7.77 (t, J = 7.2 Hz, 1H), 7.72-7.65 (m, 2H), 7.61 (dd, J = 4.8, 1.2 Hz, 2H), 5.65 (s, 1H), 4.61 (d, J = 17.6 Hz, 2H), 4.52 (d, J = 7.5 Hz, 1H), 3.90 (dd, J = 17.3, 9.7 Hz, 1H), 3.40 (dd, J = 13.1, 9.9 Hz, 1H), 3.01 (dd, J = 12.7, 9.6 Hz, 1H), 1.89-1.79 (m, 1H), 1.14-1.01 (m, 2H), 0.98-0.85 (m, 2H). |

TABLE 1-continued

Compound examples

| Example Number | Chemical structure Chemical name | NMR |
|---|---|---|
| 7 | 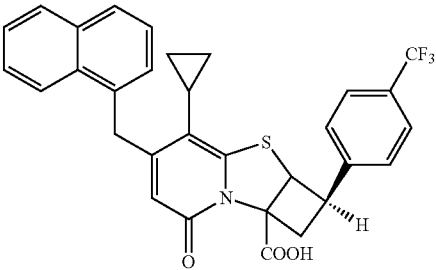<br>(2R)-4-cyclopropyl-5-(naphthalen-1-ylmethyl)-7-oxo-2-(4-(trifluoromethyl)phenyl)-2,2a,7,8a-tetrahydro-1H-cyclobuta[4,5]thiazolo[3,2-a]pyridine-8a-carboxylic acid | $^1$H NMR (DMSO-$d_6$, 600 MHz) δ 13.37 (s, 1H), 7.89-7.86 (m, 1H), 7.88 (dd, J = 12.5, 7.3 Hz, 2H), 7.65 (d, J = 8.2 Hz, 2H), 7.57-7.49 (m, 3H), 7.35 (d, J = 6.9 Hz, 1H), 7.22 (d, J = 8.1 Hz, 2H), 5.36 (s, 1H), 5.01 (d, J = 8.6 Hz, 1H), 4.38 (dd, J = 41.9, 17.2 Hz, 2H), 4.20 (dd, J = 15.1, 9.1 Hz, 1H), 3.45 (dd, J = 13.1, 10.0 Hz, 1H), 2.73 (dd, J = 13.7, 5.7 Hz, 1H), 1.44-1.33 (m, 1H), 0.80-0.70 (m, 1H), 0.65-0.57 (m, 1H), 0.37-0.28 (m, 1H), 0.08 (m, 1H).<br>$^{13}$C NMR (DMSO-$d_6$, 151 MHz) δ 168.95, 159.06, 156.92, 149.80, 143.36, 134.57, 133.49, 131.51, 128.96, 128.70, 127.44, 127.32, 126.26, 125.86, 125.64, 125.25, 124.69, 123.87, 123.44, 114.07, 111.81, 74.02, 49.80, 40.82, 35.17, 31.38, 10.22, 8.25, 6.67. |
| 8 | 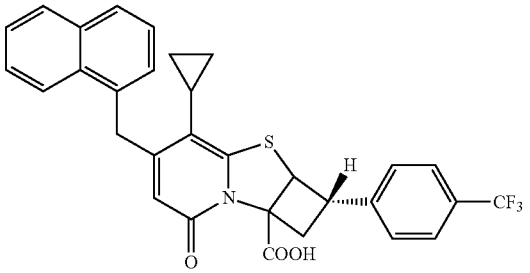<br>(2S)-4-cyclopropyl-5-(naphthalen-1-ylmethyl)-7-oxo-2-(4-(trifluoromethyl)phenyl)-2,2a,7,8a-tetrahydro-1H-cyclobuta[4,5]thiazolo[3,2-a]pyridine-8a-carboxylic acid | $^1$H NMR (DMSO-$d_6$, 600 MHz) δ 13.41 (s, 1H), 8.00-7.97 (m, 3H), 7.96-7.93 (m, 3H), 7.90 (d, J = 8.2 Hz, 3H), 7.74 (d, J = 8.2 Hz, 6H), 7.60-7.51 (m, 16H), 7.43 (d, J = 6.9 Hz, 3H), 5.27 (s, 3H), 4.69 (d, J = 7.6 Hz, 3H), 3.85 (dd, J = 17.6, 9.6 Hz, 3H), 3.09 (dd, J = 12.8, 10.0 Hz, 3H), 2.79 (dd, J = 12.7, 9.8 Hz, 3H), 1.85-1.74 (m, 3H), 1.00-0.93 (m, 6H), 0.89-0.84 (m, 3H), 0.78-0.72 (m, 3H).<br>$^{13}$C NMR (DMSO-$d_6$, 151 MHz) δ 168.83, 159.57, 157.24, 149.81, 145.87, 134.44, 133.48, 131.65, 128.67, 127.77, 127.64, 127.40, 126.43, 125.87, 125.74, 125.46, 125.44, 125.19, 124.10, 123.39, 73.10, 50.68, 46.45, 35.31, 35.01, 10.85, 7.83, 7.52. |
| 9 | 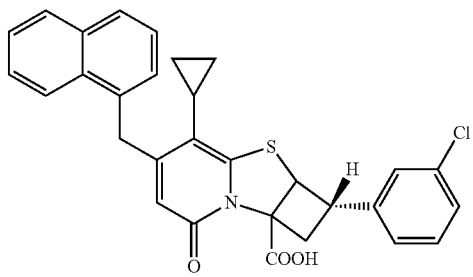<br>(2S)-2-(3-chlorophenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid | $^1$H NMR (DMSO-$d_6$, 600 MHz) δ 8.00-7.97 (m, 1H), 7.93 (d, J = 7.4 Hz, 1H), 7.90 (d, J = 8.2 Hz, 1H), 7.55 (ddd, J = 6.5, 5.2, 3.3 Hz, 2H), 7.52 (t, J = 6.3 Hz, 1H), 7.42 (t, J = 5.3 Hz, 2H), 7.39 (d, J = 7.8 Hz, 1H), 7.33 (t, J = 9.3 Hz, 2H), 5.26 (s, 1H), 4.68 (d, J = 7.6 Hz, 1H), 4.50 (s, 2H), 3.78-3.71 (m, 1H), 3.03 (dd, J = 12.7, 10.0 Hz, 1H), 2.75 (dt, J = 18.5, 9.2 Hz, 1H), 1.83-1.75 (m, 1H), 1.00-0.92 (m, 2H), 0.88-0.83 (m, 1H), 0.78-0.72 (m, 1H).<br>$^{13}$C NMR (DMSO-$d_6$, 151 MHz) δ 168.87 (s), 159.56 (s), 157.26 (s), 149.87 (s), 143.67 (s), 134.44 (s), 133.49 (s), 133.27 (s), 131.65 (s), 130.49 (s), 128.67 (s), 127.78 (s), 127.41 (s), 127.01 (s), 126.70 (s), 126.44 (s), 125.75 (s), 125.88 (s), 125.50 (s), 124.10 (s), 113.88 (s), 112.73 (s), 73.00 (s), 50.59 (s), 46.33 (s), 35.31 (s), 10.85 (s), 7.86 (s), 7.52 (s). |

TABLE 1-continued

Compound examples

| Example Number | Chemical structure Chemical name | NMR |
|---|---|---|
| 10 | (+)-Enantiomer of (2S)-2-(3-chlorophenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid | (+)$^1$H NMR (DMSO-$d_6$, 600 MHz) δ 8.00-7.97 (m, 1H), 7.94 (d, J = 7.4 Hz, 1H), 7.90 (d, J = 8.2 Hz, 1H), 7.58-7.54 (m, 2H), 7.52 (t, J = 6.3 Hz, 1H), 7.42 (dd, J = 10.7, 5.4 Hz, 2H), 7.40 (d, J = 7.8 Hz, 1H), 7.33 (t, J = 9.3 Hz, 2H), 5.26 (s, 1H), 4.68 (d, J = 7.6 Hz, 1H), 4.50 (s, 2H), 3.75 (dd, J = 17.5, 9.7 Hz, 1H), 3.03 (dd, J = 12.7, 10.0 Hz, 1H), 2.76 (dd, J = 12.7, 9.9 Hz, 1H), 1.83-1.76 (m, 1H), 1.00-0.92 (m, 2H), 0.89-0.82 (m, 1H), 0.79-0.72 (m, 1H). $^{13}$C NMR (DMSO-$d_6$, 151 MHz) δ 168.87 (s), 159.56 (s), 157.26 (s), 149.87 (s), 143.67 (s), 134.44 (s), 133.49 (s), 133.27 (s), 131.65 (s), 130.49 (s), 128.67 (s), 127.78 (s), 127.41 (s), 127.01 (s), 126.70 (s), 126.44 (s), 125.88 (s, J = 19.3 Hz), 125.75 (s), 125.50 (s), 124.10 (s), 113.88 (s), 112.73 (s), 73.00 (s), 50.59 (s), 46.33 (s), 35.31 (s, J = 6.4 Hz), 35.27 (s), 10.85 (s), 7.86 (s), 7.52 (s). |
| 11 | (−)-Enantiomer of (2S)-2-(3-chlorophenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid | $^1$H NMR (DMSO-$d_6$, 600 MHz) δ 8.00-7.97 (m, 1H), 7.94 (d, J = 7.4 Hz, 1H), 7.90 (d, J = 8.2 Hz, 1H), 7.58-7.54 (m, 2H), 7.52 (t, J = 6.3 Hz, 1H), 7.43 (t, J = 5.6 Hz, 2H), 7.40 (d, J = 7.8 Hz, 1H), 7.33 (t, J = 9.3 Hz, 2H), 5.26 (s, 1H), 4.68 (d, J = 7.6 Hz, 1H), 4.50 (s, 2H), 3.75 (dd, J = 17.5, 9.6 Hz, 1H), 3.03 (dd, J = 12.7, 10.0 Hz, 1H), 2.75 (dt, J = 18.4, 9.2 Hz, 1H), 1.82-1.77 (m, 1H), 1.00-0.93 (m, 2H), 0.89-0.83 (m, 1H), 0.75 (dd, J = 10.1, 4.4 Hz, 1H). $^{13}$C NMR (DMSO-$d_6$, 151 MHz) δ 168.87 (s), 159.56 (s), 157.26 (s), 149.87 (s), 143.67 (s), 134.44 (s), 133.49 (s), 133.27 (s), 131.65 (s), 130.49 (s), 128.68 (s), 127.78 (s), 127.41 (s), 127.01 (s), 126.70 (s), 126.44 (s), 125.88 (s, J = 19.3 Hz), 125.75 (s), 125.50 (s), 124.10 (s), 113.88 (s), 112.73 (s), 73.00 (s), 50.59 (s), 46.33 (s), 35.31 (s, J = 6.5 Hz), 35.27 (s), 10.85 (s), 7.86 (s), 7.52 (s). |

TABLE 1-continued

Compound examples

| Example Number | Chemical structure Chemical name | NMR |
|---|---|---|
| 12 | 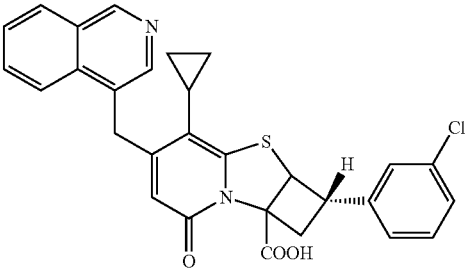<br>(2S)-2-(3-chlorophenyl)-4-cyclopropyl-5-(isoquinolin-4-ylmethyl)-7-oxo-2,2a,7,8a-tetrahydro-1H-cyclobuta[4,5]thiazolo[3,2-a]pyridine-8a-carboxylic acid | $^1$H NMR (MeOD, 400 MHz) δ 9.33 (s, 1H), 8.45 (s, 1H), 8.28 (d, J = 8.1 Hz, 1H), 8.06 (d, J = 8.4 Hz, 1H), 7.99-7.93 (m, 1H), 7.84 (t, J = 7.2 Hz, 1H), 7.79-7.72 (m, 2H), 7.68 (dd, J = 4.8, 1.2 Hz, 2H), 5.72 (s, 1H), 4.68 (d, J = 17.6 Hz, 2H), 4.59 (d, J = 7.5 Hz, 1H), 3.97 (dd, J = 17.3, 9.7 Hz, 1H), 3.47 (dd, J = 13.1, 9.9 Hz, 1H), 3.08 (dd, J = 12.7, 9.6 Hz, 1H), 1.96-1.86 (m, 1H), 1.21-1.08 (m, 2H), 1.05-0.92 (m, 2H). |
| 13 | 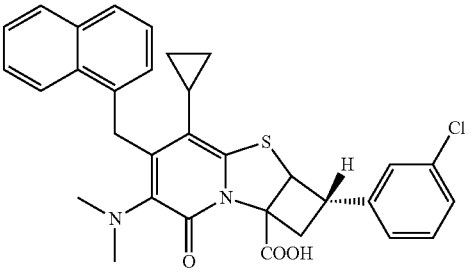<br>(2R)-2-(3-chlorophenyl)-4-cyclopropyl-6-(dimethylamino)-5-(naphthalen-1-ylmethyl)-7-oxo-2,2a,7,8a-tetrahydro-1H-cyclobuta[4,5]thiazolo[3,2-a]pyridine-8a-carboxylic acid | $^1$H NMR (DMSO-d$_6$, 400 MHz) δ 13.36 (s, 1H), 8.31 (d, J = 8.4 Hz, 1H), 7.95 (d, J = 7.5 Hz, 1H), 7.77 (d, J = 8.2 Hz, 1H), 7.67-7.60 (m, 1H), 7.57 (t, J = 7.0 Hz, 1H), 7.47 (s, 1H), 7.44-7.38 (m, 2H), 7.38-7.32 (m, 2H), 6.89 (d, J = 7.0 Hz, 1H), 4.71 (s, 2H), 4.68 (d, J = 7.6 Hz, 1H), 3.83 (dd, J = 17.4, 9.7 Hz, 1H), 3.14 (dd, J = 12.8, 9.9 Hz, 1H), 2.93 (dd, J = 12.8, 9.9 Hz, 1H), 2.55 (s, 6H), 1.32-1.22 (m, 1H), 0.63-0.52 (m, 3H), 0.51-0.45 (m, 1H).<br>$^{13}$C NMR (DMSO-d$_6$, 100 MHz) δ 169.06 (s), 158.17 (s), 151.76 (s), 146.66 (s), 143.84 (s), 135.85 (s), 133.29 (s), 131.62 (s), 130.49 (s), 128.59 (s), 126.99 (s), 126.74 (s), 126.24 (s, J = 10.7 Hz), 126.13 (s), 125.78 (s), 125.54 (s), 123.52 (s, J = 6.3 Hz), 123.46 (s), 112.07 (s), 73.44 (s), 50.48 (s), 46.25 (s), 42.60 (s), 35.41 (s), 30.66 (s), 11.84 (s), 7.38 (s, J = 18.3 Hz), 7.20 (s) |
| 14 | 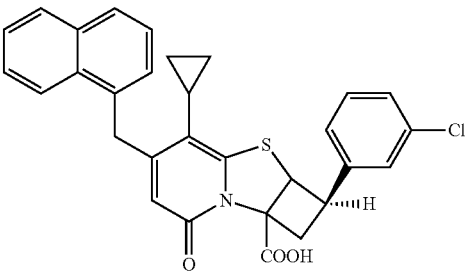<br>(2R)-2-(3-chlorophenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid | $^1$H NMR (DMSO-d$_6$, 400 MHz) δ 8.01-7.95 (m, 1H), 7.89 (dd, J = 9.0, 3.7 Hz, 2H), 7.59-7.48 (m, 3H), 7.34 (dt, J = 10.9, 8.2 Hz, 3H), 6.98 (dd, J = 5.7, 2.5 Hz, 1H), 6.94 (s, 1H), 5.29 (s, 1H), 4.95 (d, J = 8.7 Hz, 1H), 4.41 (q, J = 17.4 Hz, 2H), 4.11 (td, J = 9.3, 6.1 Hz, 1H), 3.43 (dd, J = 13.1, 10.1 Hz, 1H), 2.61 (dd, J = 13.8, 5.7 Hz, 1H), 1.57-1.40 (m, 1H), 0.90-0.76 (m, 1H), 0.70-0.59 (m, 1H), 0.46 (td, J = 9.5, 5.5 Hz, 1H), 0.18 (td, J = 9.7, 5.5 Hz, 1H).<br>$^{13}$C NMR (DMSO-d$_6$, 100 MHz) δ 169.10 (s), 159.05 (s), 157.05 (s), 150.00 (s), 141.27 (s), 134.43 (s), 133.48 (s), 132.91 (s), 131.56 (s), 129.80 (s), 128.69 (s), 127.65 (d, J = 12.5 Hz), 127.32 (d, J = 11.7 Hz), 126.75 (s), 126.35 (s), 125.79 (d, J = 15.6 Hz), 123.97 (s), 113.86 (s), 111.72 (s), 74.07 (s), 49.72 (s), 40.95 (s), 35.27 |

TABLE 1-continued

Compound examples

| Example Number | Chemical structure / Chemical name | NMR |
|---|---|---|
| | | (s), 31.98 (s), 10.38 (s), 8.55 (s), 6.80 (s). |
| 15 | 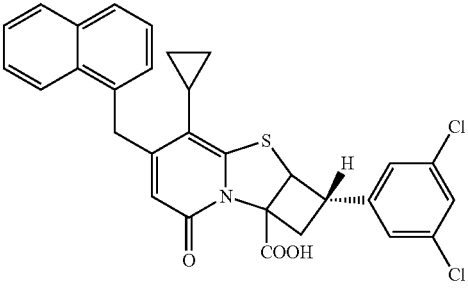<br>(2S)-4-cyclopropyl-2-(3,5-dichlorophenyl)-5-(naphthalen-1-ylmethyl)-7-oxo-2,2a,7,8a-tetrahydro-1H-cyclobuta[4,5]thiazolo[3,2-a]pyridine-8a-carboxylic acid | ¹H NMR (DMSO-d₆, 400 MHz) δ 8.01-7.96 (m, 1H), 7.95-7.87 (m, 2H), 7.56 (dt, J = 5.5, 3.3 Hz, 2H), 7.53-7.49 (m, 2H), 7.45-7.40 (m, 3H), 5.27 (s, 1H), 4.75 (d, J = 7.6 Hz, 1H), 4.50 (s, 2H), 3.78 (dd, J = 17.4, 9.6 Hz, 1H), 3.01 (dd, J = 12.8, 9.9 Hz, 1H), 2.76 (dd, J = 12.7, 9.9 Hz, 1H), 1.84-1.73 (m, 1H), 0.97-0.91 (m, 2H), 0.81-0.79 (m, 1H), 0.76-0.73 (m, 1H). ¹³C NMR (DMSO-d₆, 100 MHz) δ 168.78, 159.54, 157.26, 149.85, 145.38, 134.43, 134.22, 133.48, 131.64, 128.67, 127.77, 127.41, 126.65, 126.43, 125.87, 125.73, 124.08, 113.89, 112.71, 72.96, 50.15, 45.91, 35.30, 10.84, 7.88, 7.50. |
| 16 | 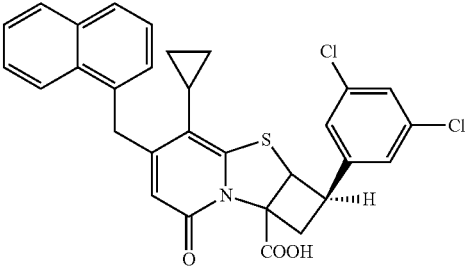<br>(2R)-4-cyclopropyl-2-(3,5-dichlorophenyl)-5-(naphthalen-1-ylmethyl)-7-oxo-2,2a,7,8a-tetrahydro-1H-cyclobuta[4,5]thiazolo[3,2-a]pyridine-8a-carboxylic acid | ¹H NMR (DMSO-d₆, 600 MHz) δ 7.98 (d, J = 8.0 Hz, 1H), 7.89 (t, J = 8.3 Hz, 2H), 7.57-7.48 (m, 4H), 7.37 (d, J = 6.9 Hz, 1H), 7.00 (s, 2H), 5.27 (s, 1H), 4.95 (d, J = 8.7 Hz, 1H), 4.42 (q, J = 17.5 Hz, 2H), 4.13 (dd, J = 14.9, 9.3 Hz, 1H), 3.41 (dd, J = 13.7, 10.1 Hz, 1H), 2.62 (dd, J = 14.0, 5.4 Hz, 1H), 1.64-1.41 (m, 1H), 0.94-0.80 (m, 1H), 0.74-0.62 (m, 1H), 0.50-0.46 (m, 1H), 0.24-0.13 (m, 1H). |
| 17 | 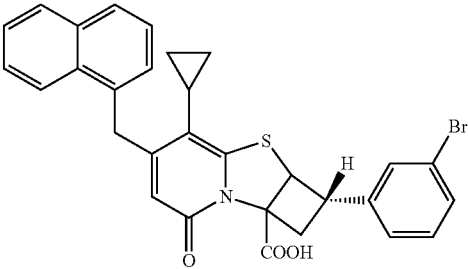<br>(2S)-2-(3-bromophenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid | ¹H NMR (DMSO-d₆, 400 MHz) δ 8.03-7.87 (m, 3H), 7.60-7.40 (m, 5H), 7.40-7.30 (m, 2H), 5.26 (s, 1H), 4.67 (d, J = 7.6 Hz, 1H), 4.50 (s, 2H), 3.74 (dd, J = 17.4, 9.7 Hz, 1H), 3.03 (dd, J = 12.7, 9.9 Hz, 1H), 2.76 (dd, J = 12.6, 9.9 Hz, 1H), 1.86-1.74 (m, 1H), 1.01-0.91 (m, 2H), 0.81-0.79 (m, 1H), 0.76-0.73 (m, 1H). ¹³C NMR (DMSO-d₆, 100 MHz) δ 168.86, 159.56, 157.24, 149.88, 143.95, 134.44, 133.48, 131.65, 130.77, 129.92, 129.56, 128.67, 127.78, 127.40, 126.43, 125.87, 125.74, 124.10, 121.94, 113.88, 112.71, 73.01, 50.63, 46.30, 35.31, 10.85, 7.87, 7.52. |

TABLE 1-continued

Compound examples

| Example Number | Chemical structure Chemical name | NMR |
|---|---|---|
| 18 | 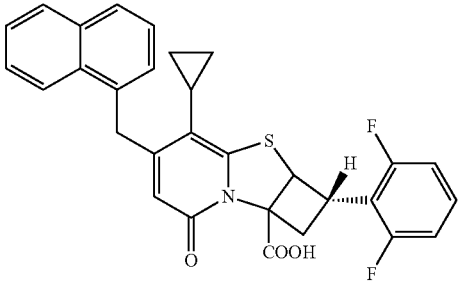<br>(2S)-4-cyclopropyl-2-(2,6-difluorophenyl)-5-(naphthalen-1-ylmethyl)-7-oxo-2,2a,7,8a-tetrahydro-1H-cyclobuta[4,5]thiazolo[3,2-a]pyridine-8a-carboxylic acid | $^1$H NMR (DMSO-d$_6$, 600 MHz) δ 7.98 (dd, J = 6.6, 2.6 Hz, 1H), 7.96-7.94 (m, 1H), 7.90 (d, J = 8.2 Hz, 1H), 7.56-7.51 (m, 1H), 7.43 (d, J = 6.9 Hz, 1H), 7.42-7.36 (m, 1H), 7.11 (t, J = 8.3 Hz, 2H), 5.25 (s, 1H), 4.82 (d, J = 7.5 Hz, 1H), 4.50 (s, 2H), 3.88 (dd, J = 18.2, 9.9 Hz, 1H), 3.41-3.33 (m, 1H), 2.75 (dd, J = 12.2, 10.1 Hz, 1H), 1.92-1.69 (m, 1H), 1.02-0.92 (m, 2H), 0.87-0.72 (m, 2H).<br>$^{13}$C NMR (DMSO-d$_6$, 151 MHz) δ 168.56, 161.67, 160.03, 159.97, 159.62, 157.27, 149.77, 134.44, 133.47, 131.67, 129.61, 128.65, 127.81, 127.39, 126.44, 125.86, 125.74, 124.15, 115.57, 113.87, 112.80, 112.04, 112.01, 111.90, 111.87, 74.03, 49.93, 37.84, 35.31, 33.44, 10.83, 7.78, 7.55. |
| 19A | 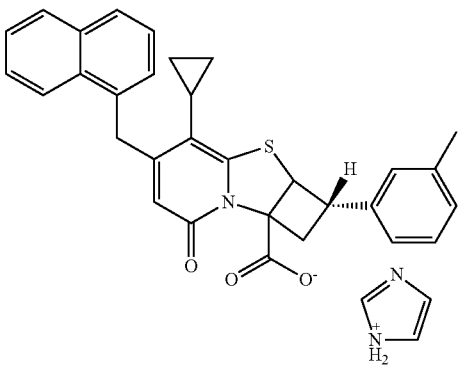<br>1H-imidazol-1-ium (2S)-4-cyclopropyl-5-(naphthalen-1-ylmethyl)-7-oxo-2-(m-tolyl)-2,2a-dihydro-7H-cyclobuta[4,5]thiazolo[3,2-a]pyridine-8a(1H)-carboxylate | $^1$H NMR (DMSO-d6, 400 MHz): δ 8.16 (s, 1H), 8.00-7.96 (m, 1H), 7.91-7.86 (m, 2H), 7.67-7.63 (m, 2H), 7.56-7.52 (m, 2H), 7.51 (d, 1H), 7.36 (d, 1H), 7.18 (t, 1H), 7.07 (dd, 1H), 6.77 (d, 1H), 6.73-6.71 (m, 1H), 5.27 (s, 1H), 4.89 (d, 1H), 4.40 (dd, 2H), 4.06-3.98 (m, 1H), 3.45 (m, 1H), 2.56 (dd, 1H), 2.25 (s, 3H), 2.03-1.94 (m, 1H), 1.51-1.42 (m, 2H), 0.87-0.77 (m, 1H), 0.67-0.60 (m, 1H), 0.47-0.38 (m, 1H), 0.24-0.15 (m, 1H). |
| 19B | 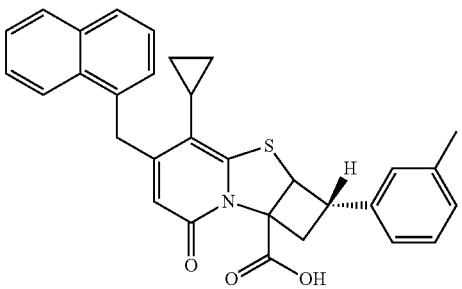<br>(2S)-4-cyclopropyl-5-(naphthalen-1-ylmethyl)-7-oxo-2-(m-tolyl)-2,2a-dihydro-7H-cyclobuta[4,5]thiazolo[3,2-a]pyridine-8a(1H)-carboxylic acid | $^1$H NMR (DMSO-d$_6$, 400 MHz): δ 13.32 (br s, 1H), 8.02-7.92 (m, 2H), 7.90 (d, J = 8.1 Hz, 1H), 7.59-7.70 (m, 3H), 7.44 (d, J = 6.8 Hz, 1H), 7.25 (t, J = 7.5 Hz, 1H), 7.17-7.12 (m, 2H), 7.09 (d, J = 7.6 Hz, 1H), 5.26 (s, 1H), 4.56 (d, J = 7.5 Hz, 1H), 4.51 (S, 2H), 3.65 (ddd, J = 7.8, 9.5 Hz, 1H), 3.06 (dd, J = 10.0, 12.7 Hz, 1H), 2.73 (dd, J = 9.8, 12.7 Hz, 1H), 1.84-1.76 (m, 1H), 1.00-0.92 (m, 2H), 0.89-0.81 (m, 1H), 0.79-0.72 (m, 1H).<br>$^{13}$C NMR (DMSO-d$_6$, 100 MHz): δ 168.9, 159.5, 157.1, 149.9, 141.0, 137.7, 134.4, 133.4, 131.6, 128.6, 128.5, 127.7, 127.6, 127.4, 127.3, 126.4, 125.8, 125.7, 124.1, 123.7, 113.8, 112.6, 73.1, 51.0, 46.9, 35.3, 35.1, 21.0, 10.8, 7.8, 7.5. |

TABLE 1-continued

Compound examples

| Example Number | Chemical structure / Chemical name | NMR |
|---|---|---|
| 20A | 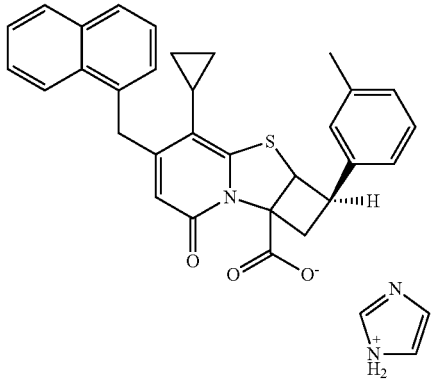<br>1H-imidazol-1-ium (2R)-4-cyclopropyl-5-(naphthalen-1-ylmethyl)-7-oxo-2-(m-tolyl)-2,2a-dihydro-7H-cyclobuta[4,5]thiazolo[3,2-a]pyridine-8a(1H)-carboxylate | $^1$H NMR (DMSO-d$_6$, 400 MHz): δ 12.87 (br s, 1H), 8.01-7.92 (m, 2H), 7.89 (d, 1H), 7.67 (s, 1H), 7.58-7.50 (m, 3H), 7.43 (d, 1H), 7.24 (t, 1H), 7.17-7.11 (m, 2H), 7.08 (d, 1H), 7.04-7.01 (m, 2H), 5.24 (s, 1H), 4.53 (d, 1H), 4.50 (s, 2H), 3.63 (q, 1H), 3.06 (dd, 1H), 2.72 (dd, 1H), 2.30 (s, 3H), 1.83-1.75 (m, 1H), 0.99-0.91 (m, 2H), 0.88-0.81 (m, 1H), 0.79-0.71 (m, 1H). |
| 20B | 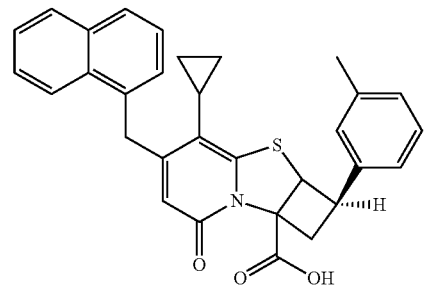<br>(2R)-4-cyclopropyl-5-(naphthalen-1-ylmethyl)-7-oxo-2-(m-tolyl)-2,2a-dihydro-7H-cyclobuta[4,5]thiazolo[3,2-a]pyridine-8a(1H)-carboxylic acid | $^1$H NMR (DMSO-d$_6$, 600 MHz): δ 7.99-7.96 (m, 1H), 7.88 (d, 2H), 7.55-7.53 (m, 2H), 7.51 (t, 1H), 7.36 (d, 1H), 7.16 (t, 1H), 7.05 (d, 1H), 6.76 (d, 1H), 6.72 (s, 1H), 5.23 (s, 1H), 4.79-4.71 (m, 1H), 4.39 (q, 2H), 4.02-3.94 (m, 1H), 3.40 (dd, 2H), 2.24 (s, 3H), 1.48-1.43 (m, 1H), 0.82-0.77 (m, 1H), 0.66-0.62 (m, 1H), 0.46-0.41 (m, 1H), 0.24-0.19 (m, 1H). |
| 21 | 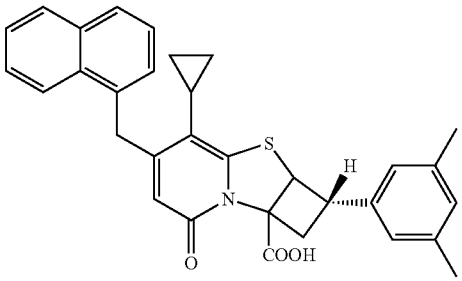<br>(2S)-4-cyclopropyl-2-(3,5-dimethylphenyl)-5-(naphthalen-1-ylmethyl)-7-oxo-2,2a,7,8a-tetrahydro-1H-cyclobuta[4,5]thiazolo[3,2-a]pyridine-8a-carboxylic acid | $^1$H NMR (DMSO-d$_6$, 600 MHz) δ 8.00-7.96 (m, 1H), 7.94 (d, J = 8.0 Hz, 1H), 7.90 (d, J = 8.2 Hz, 1H), 7.58-7.54 (m, 2H), 7.52 (d, J = 7.9 Hz, 1H), 7.43 (d, J = 6.9 Hz, 1H), 6.94 (s, 2H), 6.90 (s, 1H), 5.26 (s, 1H), 4.52 (d, J = 7.7 Hz, 1H), 4.50 (s, 2H), 3.63-3.54 (m, 1H), 3.05 (dd, J = 12.4, 10.3 Hz, 1H), 2.69 (dt, J = 24.2, 12.1 Hz, 1H), 2.26 (S, 6H), 1.83-1.76 (m, 1H), 0.96 (h, J = 8.8 Hz, 2H), 0.88-0.81 (m, 1H), 0.79-0.72 (m, 1H). $^{13}$C NMR (DMSO-d$_6$, 151 MHz) δ 137.56 (s), 128.66 (s), 127.78 (s), 127.39 (s), 126.43 (s), 125.80 (d, J = 18.3 Hz), 124.38 (s), 73.23 (s), 51.02 (s), 46.90 (s), 35.30 (s), 34.95 (s), 20.94 (s), 10.86 (s), 7.83 (s), 7.53 (s). |

TABLE 1-continued

Compound examples

| Example Number | Chemical structure Chemical name | NMR |
|---|---|---|
| 22 | 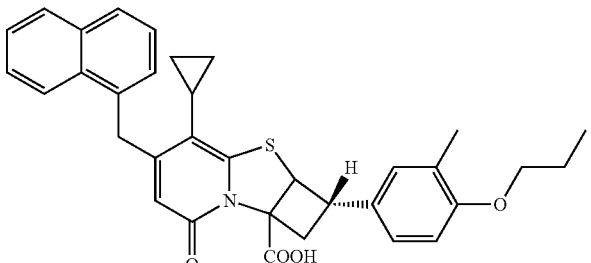<br>(2S)-4-cyclopropyl-2-(3-methyl-4-propoxyphenyl)-5-(naphthalen-1-ylmethyl)-7-oxo-2,2a,7,8a-tetrahydro-1H-cyclobuta[4,5]thiazolo[3,2-a]pyridine-8a-carboxylic acid | $^{1}$H NMR (DMSO-$d_6$, 600 MHz) δ 8.00-7.97 (m, 1H), 7.94 (d, J = 8.0 Hz, 1H), 7.90 (d, J = 8.2 Hz, 1H), 7.59-7.49 (m, 3H), 7.43 (d, J = 6.9 Hz, 1H), 7.10 (d, J = 5.2 Hz, 2H), 6.90 (d, J = 9.0 Hz, 1H), 5.25 (s, 1H), 4.50 (s, 2H), 4.47 (d, J = 7.5 Hz, 1H), 3.95 (t, J = 6.3 Hz, 2H), 3.55 (q, J = 9.5 Hz, 1H), 3.07-2.97 (m, 1H), 2.69 (dd, J = 12.4, 9.9 Hz, 1H), 2.14 (s, 3H), 1.79 (p, J = 7.8 Hz, 1H), 1.74-1.66 (m, 2H), 1.51-1.40 (m, 2H), 0.95-0.92 (m, 5H), 0.87-0.82 (m, 1H), 0.80-0.71 (m, 1H). |
| 23 | 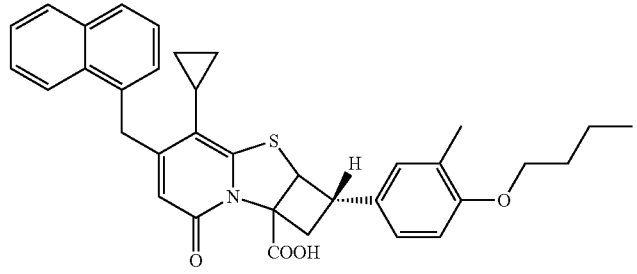<br>(2S)-2-(4-butoxy-3-methylphenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid | $^{1}$H NMR (DMSO-$d_6$, 600 MHz) δ 8.00-7.97 (m, 1H), 7.94 (d, J = 8.3 Hz, 1H), 7.90 (d, J = 8.2 Hz, 1H), 7.60-7.49 (m, 3H), 7.43 (d, J = 6.9 Hz, 1H), 7.10 (d, J = 6.3 Hz, 2H), 6.89 (d, J = 9.0 Hz, 1H), 5.24 (s, 1H), 4.50 (s, 2H), 4.47 (d, J = 7.3 Hz, 1H), 3.91 (t, J = 6.3 Hz, 2H), 3.55 (q, J = 9.5 Hz, 1H), 3.13-2.94 (m, 1H), 2.69 (dd, J = 12.5, 9.9 Hz, 1H), 1.82-1.70 (m, 3H), 1.00-0.95 (m, 5H), 0.87-0.81 (m, 1H), 0.78-0.72 (m, 1H). |
| 24 | 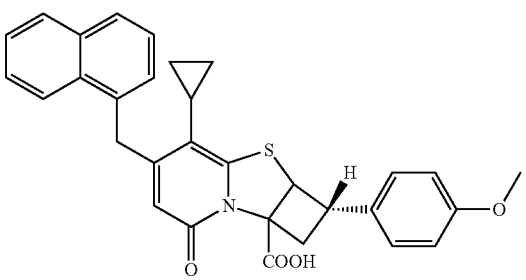<br>(2S)-4-cyclopropyl-2-(4-methoxyphenyl)-5-(naphthalen-1-ylmethyl)-7-oxo-2,2a,7,8a-tetrahydro-1H-cyclobuta[4,5]thiazolo[3,2-a]pyridine-8a-carboxylic acid | $^{1}$H NMR (DMSO-$d_6$, 400 MHz) δ 8.00-7.96 (m, 1H), 7.96-7.92 (m, 1H), 7.90 (d, J = 8.3 Hz, 1H), 7.60-7.50 (m, 3H), 7.43 (d, J = 6.2 Hz, 1H), 7.27 (d, J = 8.7 Hz, 2H), 6.93 (d, J = 8.7 Hz, 2H), 5.24 (s, 1H), 4.53-4.45 (m, 3H), 3.74 (s, 3H), 3.61 (dd, J = 17.4, 9.6 Hz, 1H), 3.03 (dd, J = 12.7, 10.0 Hz, 1H), 2.71 (dd, J = 12.9, 9.9 Hz, 1H), 1.84-1.75 (m, 1H), 1.00-0.91 (m, 2H), 0.88-0.80 (m, 1H), 0.78-0.71 (m, 1H). |

TABLE 1-continued

Compound examples

| Example Number | Chemical structure / Chemical name | NMR |
|---|---|---|
| 25A | 1H-imidazol-1-ium (2S)-2-(3-aminophenyl)-4-cyclopropyl-5-(naphthalen-1-ylmethyl)-7-oxo-2,2a-dihydro-7H-cyclobuta[4,5]thiazolo[3,2-a]pyridine-8a(1H)-carboxylate | ¹H NMR (DMSO-d$_6$, 600 MHz): δ 8.15 (s, 1H), 8.00-7.92 (m, 1H), 7.91 (dd, 1H), 7.65 (s, 2H), 7.58-7.49 (m, 3H), 7.42 (d, 1H), 7.04-7.00 (m, 3H), 6.98 (t, 1H), 6.51-6.49 (m, 1H), 6.48-6.43 (m, 2H), 5.22 (s, 1H), 4.49 (s, 2H), 4.34 (d, 1H), 3.47 (q, 2H), 3.08 (dd, 1H), 2.65 (dd, 1H), 1.83-1.75 (m, 1H), 0.99-0.91 (m, 2H), 0.87-0.80 (m, 1H), 0.78-0.72 (m, 1H). |
| 25B | (2S)-2-(3-aminophenyl)-4-cyclopropyl-5-(naphthalen-1-ylmethyl)-7-oxo-2,2a-dihydro-7H-cyclobuta[4,5]thiazolo[3,2-a]pyridine-8a(1H)-carboxylic acid | ¹H NMR (DMSO-d$_6$, 400 MHz): δ 13.22 (br s, 1H), 7.98 (d, 1H), 7.94 (d, 1H), 7.89 (d, 1H), 7.58-7.50 (m, 3H), 7.42 (d, 1H), 6.98 (t, 1H), 6.50 (s, 1H), 6.48-6.42 (m, 2H), 5.23 (s, 1H), 4.49 (s, 2H), 4.39-4.31 (m, 1H), 3.51-3.43 (m, 2H), 3.06 (t, 1H), 2.63 (dd, 2H), 1.83-1.75 (m, 1H), 1.00-0.90 (m, 2H), 0.86-0.80 (m, 1H), 0.78-0.72 (m, 1H). |
| 26 | (2R)-4-cyclopropyl-5-(naphthalen-1-ylmethyl)-7-oxo-2-(thiophen-3-yl)-2,2a-dihydro-7H-cyclobuta[4,5]thiazolo[3,2-a]pyridine-8a(1H)-carboxylic acid | ¹H NMR (DMSO-d$_6$, 400 MHz): δ 13.27 (br s, 1H), 7.98 (d, J = 7.8 Hz, 1H), 7.87 (t, J = 8.2 Hz, 2H), 7.58-7.50 (m, 4H), 7.35 (d, J = 7.7 Hz, 1H), 6.95 (s, 1H), 6.77 (d, J = 4.9 Hz, 1H), 5.32 (s, 1H), 4.87 (d, J = 6.9 Hz, 1H), 4.44 (d, J = 17.2 Hz, 1H), 4.36 (d, J = 17.2 Hz, 1H), 4.06 (ddd, J = 5.4, 9.3 Hz, 1H), 3.45 (dd, J = 10.2, 13.1 Hz, 1H), 2.55 (d, J = 5.4 Hz, 1H), 2.54-2.53 (m, 1H), 1.49-1.43 (m, 1H), 0.83-0.77 (m, 1H), 0.71-0.65 (m, 1H), 0.49-0.42 (m, 1H), 0.34-0.28 (m, 1H). |

TABLE 1-continued

Compound examples

| Example Number | Chemical structure / Chemical name | NMR |
|---|---|---|
| 27 | (2R)-4-cyclopropyl-5-(naphthalen-1-ylmethyl)-7-oxo-2-(phenylthio)-2,2a,7,8a-tetrahydro-1H-cyclobuta[4,5]thiazolo[3,2-a]pyridine-8a-carboxylic acid | $^1$H NMR (DMSO-$d_6$, 400 MHz) δ 7.98-7.96 m, 1H), 7.92-7.87 (m, 2H), 7.55-7.49 (m, 3H), 7.43-7.33 (m, 5H), 7.30-7.25 (m, 1H), 5.23 (s, 1H), 4.53-4.43 (m, 3H), 4.10 (td, J = 9.1, 6.9 Hz, 1H), 2.92 (dd, J = 13.0, 9.1 Hz, 1H), 2.80 (dd, J = 12.9, 9.4 Hz, 1H), 1.81-1.70 (m, 1H), 0.99-0.90 (m, 2H), 0.82-0.79 (m, 1H), 0.71-0.69 (m, 1H).<br>$^{13}$C NMR (DMSO-$d_6$, 100 MHz) δ 168.29, 159.42, 157.20, 149.30, 134.38, 133.95, 133.46, 131.63, 129.93, 129.25, 128.66, 127.75, 127.39, 126.89, 126.42, 125.86, 125.73, 124.08, 113.92, 112.58, 73.39, 51.98, 46.04, 35.29, 10.81, 7.79, 7.50. |
| 28 | (2S)-4-cyclopropyl-5-(naphthalen-1-ylmethyl)-7-oxo-2-(phenylthio)-2,2a,7,8a-tetrahydro-1H-cyclobuta[4,5]thiazolo[3,2-a]pyridine-8a-carboxylic acid | $^1$H NMR (DMSO-$d_6$, 400 MHz): δ 13.45 (br s, 1H), 7.99-7.94 (m, 1H), 7.93-7.86 (m, 2H), 7.57-7.48 (m, 3H), 7.40 (d, 1H), 7.34-7.28 (m, 2H), 7.22-7.16 (m, 3H), 5.21 (s, 1H), 5.19 (d, 1H), 4.53-4.40 (m , 3H), 3.64 (dd, 1H), 2.04 (dd, 1H), 1.76-1.68 (m, 1H), 0.96-0.88 (m, 1H), 0.86-0.80 (m, 1H), 0.77-0.70 (m, 2H). |
| 29 | (2S)-6-(dimethylamino)-4-methoxy-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid | $^1$H NMR (DMSO-$d_6$, 400 MHz): δ 13.49 (br s, 1H), 8.32 (d, J = 8.4 Hz, 1H), 7.96 (dd, J = 0.9, 8.0 Hz, 1H), 7.79 (d, J = 8.2 Hz, 1H), 7.76-7.71 (m, 2H), 7.66-7.54 (m, 4H), 7.44 (dd, J = 7.4, 8.0 Hz, 1H), 7.08 (d, J = 7.3 Hz, 1H), 4.89-4.77 (m, 1H), 4.46 (dd, J = 15.3, 17.6 Hz, 2H), 3.98 (q, J = 9.4 Hz, 1H), 3.44 (s, 3H), 3.15 (dd, J = 10.0, 12.7 Hz, 1H), 2.96 (dd, J = 9.9, 12.7 Hz, 1H), 2.58 (s, 6H). |

TABLE 1-continued

Compound examples

| Example Number | Chemical structure Chemical name | NMR |
|---|---|---|
| 30 | 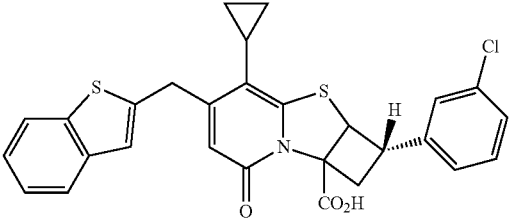<br>(2S)-5-(benzo[b]thiophen-2-ylmethyl)-2-(3-chlorophenyl)-4-cyclopropyl-7-oxo-2,2a,7,8a-tetrahydro-1H-cyclobuta[4,5]thiazolo[3,2-a]pyridine-8a-carboxylic acid | $^1$H NMR (DMSO-$d_6$, 400 MHz) δ 0.62-0.66 (m, 1H), 0.73-0.75 (m, 1H), 0.90-1.01 (m, 2H), 1.56-1.63 (m, 1H), 2.80-2.86 (dd, J = 9.88, 12.68, 1H), 3.07-3.12 (dd, J = 10.04-12.52, 1H), 3.71-3.78 (dd, J = 9.52, 17.36, 1H), 4.34 (s, 2H). 4.64 (s, 1H), 6.02 (s, 1H), 7.30-7.36 (m, 5H), 7.38-7.43 (m, 2H), 7.79-7.81 (d, J = 7.3 Hz, 1H), 7.91-7.92 (d, J = 7.8 Hz, 1H).<br>$^{13}$C NMR (DMSO-$d_6$, 100 MHz) δ 7.7, 7.9, 10.8, 33.2, 35.4, 46.3, 50.7, 73.4, 112.3, 114.4, 122.3, 122.9, 123.2, 124.0, 124.4, 125.5, 126.7, 126.8, 130.5, 133.2, 139.0, 139.7, 142.1, 143.7, 150.7, 155.6, 159.7, 168.9. |
| 31 | 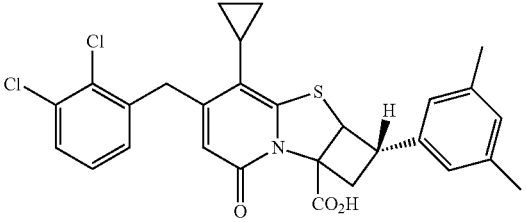<br>(2S)-4-cyclopropyl-5-(2,3-dichlorobenzyl)-2-(3,5-dimethylphenyl)-7-oxo-2,2a,7,8a-tetrahydro-1H-cyclobuta[4,5]thiazolo[3,2-a]pyridine-8a-carboxylic acid | $^1$H NMR (DMSO-$d_6$, 600 MHz) δ 7.63 (dd, J = 1.5, 7.9 Hz, 1H), 7.41 (t, J = 8.7 Hz, 1H), 7.37 (dd, J = 1.5, 7.7 Hz, 1H), 6.94 (s, 2H), 6.90 (s, 1H) 5.38 (s, 1H), 4.52 (d, J = 7.6 Hz, 1H), 4.22 (s, 2H), 3.62-3.57 (m, 1H), 3.08 (dd, J = 10.2, 12.5 Hz, 1H), 2.75 (dd, J = 9.6, 12.6 Hz, 1H), 2.26 (s, 6H), 1.66-1.61 (m, 1H), 0.97-0.90 (m, 2H), 0.75-0.72 (m, 1H), 0.67-0.63 (m, 1H).<br>$^{13}$C NMR (DMSO-$d_6$, 150 MHz) δ 168.9, 159.5, 155.1, 150.4, 140.9, 138.8, 137.5, 132.0, 131.5, 130.3, 129.2, 128.4, 128.3, 124.3, 113.3, 112.2,<br><br>73.3, 51.0, 46.8, 36.7, 34.9, 20.9, 10.6, 7.7, 7.4. |
| 32 | 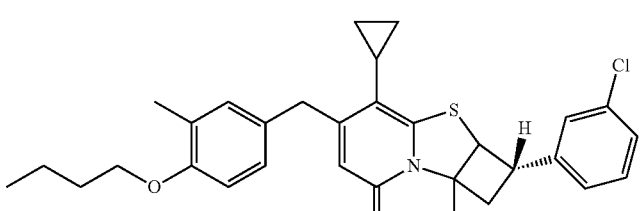<br>(2S)-5-(4-butoxy-3-methylbenzyl)-2-(3-chlorophenyl)-4-cyclopropyl-7-oxo-2,2a,7,8a-tetrahydro-1H-cyclobuta[4,5]thiazolo[3,2-a]pyridine-8a-carboxylic acid | $^1$H NMR (DMSO-$d_6$, 600 MHz) δ 8.42-7.38 (m, 2H), 7.33 (t, J = 8.7 Hz, 2H), 7.04-7.02 (m, 2H), 6.88 (d, J = 8.1 Hz, 1H), 5.70 (s, 1H), 4.61 (d, J = 7.3 Hz, 1H), 3.96 (t, J = 6.3 Hz, 2H), 3.90 (s, 2H), 3.73-3.68 (m, 1H), 3.07 (dd, J = 9.8, 12.3 Hz, 1H), 2.7 (dd, J = 9.8, 12.6 Hz, 1H) 2.14 (s, 3H), 1.74-1.69 (m, 1H), 1.56-1.44 (m, 3H), 0.97-0.91 (m, 5H), 0.74-0.71 (m, 1H), 0.65-0.61 (m, 1H).<br>$^{13}$C NMR (DMSO-$d_6$, 150 MHz) δ 169.3, 160.1, 158.4, 150.4, 144.2, 133.7, 131.8, 130.9, 130.0, 128.1, 127.4, 127.1, 126.2, 125.9, 114.7, 113.0, 111.7, 73.7, 67.6, 51.1, 46.8, 37.8, 35.8, 31.4, 19.3, 16.4, 14.2, 11.3, 8.49, 8.25. |

TABLE 1-continued

Compound examples

| Example Number | Chemical structure<br>Chemical name | NMR |
|---|---|---|
| 33 | 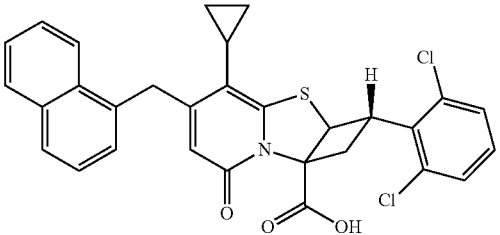<br>(2S)-4-cyclopropyl-2-(2,6-dichlorophenyl)-5-(naphthalen-2-ylmethyl)-7-oxo-2,2a,7,8a-tetrahydro-1H-cyclobuta[4,5]thiazolo[3,2-a]pyridine-8a-carboxylic acid | $^1$H NMR (DMSO-$d_6$, 400 MHz) δ 13.35 (br s, 1H), 8.01-7.92 (m, 2H), 7.89 (d, J = 8.2 Hz, 1H), 7.58-7.47 (m, 5H), 7.44 (d, J = 7.1 Hz, 1H), 7.33 (t, J = 7.6 Hz, 1H), 5.24 (s, 1H), 5.15 (d, J = 8.2 Hz, 1H), 4.50 (dd, J = 17.4, 23.5 Hz, 2H), 4.33 (q, J = 8.4 Hz, 1H), 3.68 (dd, J = 10.8, 12.6 Hz, 1H), 2.73 (dd, J = 9.8, 12.6 Hz, 1H), 1.85-1.74 (m, 1H), 1.01-0.94 (m, 2H), 0.85-0.76 (m, 2H). |
| 34 | 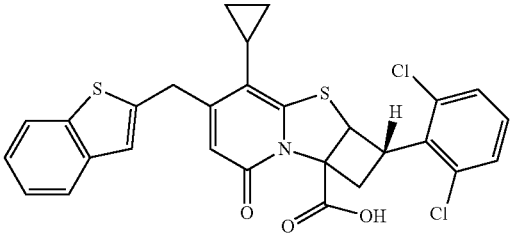<br>(2S)-5-(benzo[b]thiophen-2-ylmethyl)-4-cyclopropyl-2-(2,6-dichlorophenyl)-7-oxo-2,2a,7,8a-tetrahydro-1H-cyclobuta[4,5]thiazolo[3,2-a]pyridine-8a-carboxylic acid | $^1$H NMR (DMSO-$d_6$, 400 MHz) δ 0.67-0.70 (m, 2H), 0.95-0.97 (m, 2H), 1.56-1.63 (m, 1H), 2.77 (dd, J = 2.0, 12.4 Hz, 1H), 3.70 (dd, J = 10.8, 12.4 Hz, 1H), 4.31-4.38 (m, 3H), 5.16-5.18 (d, J = 8.3 Hz, 1H), 6.01 (s, 1H), 7.29-7.38 (m, 4H), 7.48-7.50 (d, J = 8.0 Hz, 2H), 7.78-7.80 (d, J = 8.2 Hz, 1H), 7.90-7.92 (d, J = 7.8 Hz, 1H).<br>$^{13}$C NMR (DMSO-$d_6$, 100 MHz) δ 7.7, 8.1, 10.7, 33.2, 33.5, 44.3, 49.3, 73.1, 112.5, 114.3, 122.3, 123.0, 123.1, 123.9, 124.4, 129.6, 129.8, 133.7, 134.8, 139.0, 139.6, 142.0, 150.5, 155.7, 159.7, 168.5. |
| 35 | 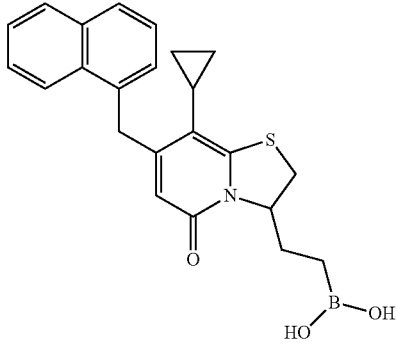<br>(2-(8-cyclopropyl-7-(naphthalen-2-ylmethyl)-5-oxo-3,5-dihydro-2H-thiazolo[3,2-a]pyridin-3-yl)ethyl)boronic acid | $^1$H NMR (DMSO-$d_6$, 600 MHz) δ 7.97 (dd, J = 6.1, 3.4 Hz, 1H), 7.87 (dd, J = 10.4, 5.8 Hz, 2H), 7.57 (s, 2H), 7.55-7.48 (m, 3H), 7.36 (d, J = 6.9 Hz, 1H), 5.25 (s, 1H), 4.80-4.74 (m, 1H), 4.42-4.36 (m, 2H), 3.54 (dd, J = 11.5, 7.6 Hz, 1H), 3.24 (d, J = 11.5 Hz, 1H), 1.72-1.66 (m, 2H), 1.62-1.57 (m, 1H), 0.96-0.85 (m, 3H), 0.73-0.56 (m, 4H).<br>$^{13}$C NMR (DMSO-$d_6$, 150 MHz) δ 160.1, 156.1, 148.0, 135.0, 133.9, 132.0, 129.0, 128.0, 127.7, 126.8, 126.2, 126.1, 124.5, 113.9, 112.5, 64.3, 35.6, 31.9, 25.4, 11.2, 7.9, 7.5. |

TABLE 1-continued

Compound examples

| Example Number | Chemical structure Chemical name | NMR |
|---|---|---|
| 36 | 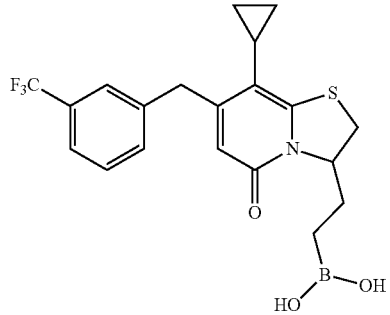<br>(2-(8-cyclopropyl-5-oxo-7-(3-(trifluoromethyl)benzyl)-3,5-dihydro-2H-thiazolo[3,2-a]pyridin-3-yl)ethyl)boronic acid | $^1$H NMR (MeOD, 600 MHz) δ 7.54-7.45 (m, 4H), 5.91 (S, 1H), 5.09-5.04 (m, 1H), 4.19-4.07 (m, 2H), 3.57 (dd, J = 11.6, 7.6 Hz, 1H), 3.26 (d, J = 11.5 Hz, 1H), 1.91-1.80 (m, 2H), 1.41-1.36 (m, 1H), 0.99-0.82 (m, 4H), 0.66-0.62 (m, 2H). |
| 37 | 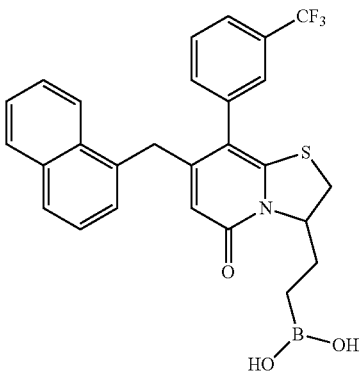<br>(2-(7-(naphthalen-2-ylmethyl)-5-oxo-8-(3-(trifluoromethyl)phenyl)-3,5-dihydro-2H-thiazolo[3,2-a]pyridin-3-yl)ethyl)boronic acid | $^1$H NMR (MeOD, 400 MHz) δ 7.85-7.83 (m, 1H), 7.75 (d, J = 8.2 Hz, 1H), 7.66-7.55 (m, 5H), 7.46-7.36 (m, 3H), 7.20 (d, J = 6.9 Hz, 1H), 5.90 (s, 1H), 5.15-5.14 (m, 1H), 4.10-3.99 (m, 2H), 3.67-3.61 (m, 1H), 3.25 (d, J = 11.2 Hz, 1H), 2.04-1.91 (m, 2H), 0.89 (t, J = 7.5 Hz, 2H). |
| 38 | 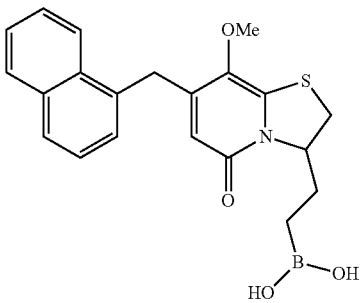<br>(2-(8-methoxy-7-(naphthalen-2-ylmethyl)-5-oxo-3,5-dihydro-2H-thiazolo[3,2-a]pyridin-3-yl)ethyl)boronic acid | $^1$H NMR (MeOD, 600 MHz) δ 7.89-7.85 (m, 2H), 7.82 (d, J = 8.1 Hz, 1H), 7.48-7.44 (m, 3H), 7.40 (d, J = 6.8 Hz, 1H), 5.58 (s, 1H), 5.03-5.00 (m, 1H), 4.35 (s, 2H), 3.77 (s, 3H) 3.68 (dd, J = 11.6, 7.5 Hz, 1H), 3.36 (d, J = 11.6 Hz, 1H), 1.93-1.81 (m, 2H), 0.84 (t, J = 8.1 Hz, 2H).<br>$^{13}$C NMR (MeOD, 150 MHz) δ 160.7, 151.8, 140.6, 137.4, 134.1, 133.7, 131.7, 128.4, 127.5, 127.4, 125.9, 125.4, 125.1, 123.5, 113.3, 65.3, 59.6, 32.3, 31.9, 24.5. |

TABLE 1-continued

Compound examples

| Example Number | Chemical structure Chemical name | NMR |
|---|---|---|
| 39 | 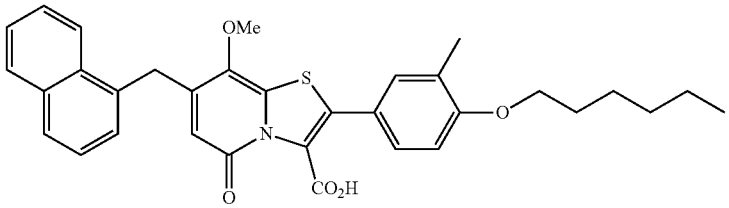 2-(4-(hexyloxy)-3-methylphenyl)-7-(naphthalen-2-ylmethyl)-5-oxo-5H-thiazolo[3,2-a]pyridine-3-carboxylic acid | $^1$H NMR (DMSO-$d_6$, 400 MHz) δ 7.96-7.86 (m, 3H), 7.60 (d, J = 7.6 Hz, 1H), 7.51-7.42 (m, 5H), 6.94 (d, J = 8.7 Hz, 1H), 5.47 (s, 1H), 4.40 (s, 2H), 3.99 (t, J = 6.1 Hz, 2H), 3.83 (s, 3H), 2.15 (s, 3H), 1.80-1.67 (m, 2H), 1.48-1.40 (m, 2H), 1.32-1.31 (m, 4H), 0.89 (d, J = 6.4 Hz, 3H).<br>$^{13}$C NMR (DMSO-$d_6$, 151 MHz) δ 161.3, 158.1, 156.5, 147.2, 138.0, 134.7, 134.1, 133.5, 131.3, 130.0, 128.6, 127.6, 127.4, 127.1, 126.9, 126.4, 125.8, 125.6, 123.8, 119.6, 111.7, 109.1, 67.7, 60.3, 31.9, 30.9, 28.5, 25.1, 22.0, 15.9, 13.8. |
| 40 | 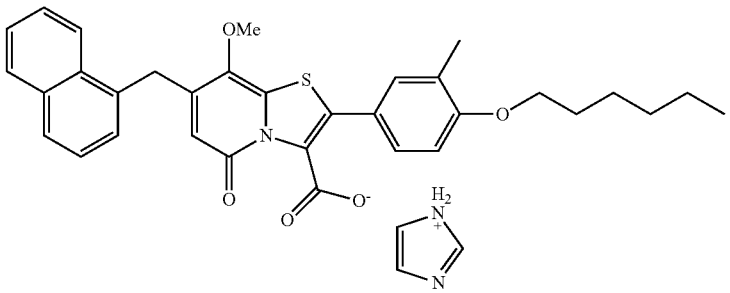 1H-imidazol-1-ium 2-(4-(hexyloxy)-3-methylphenyl)-7-(naphthalen-2-ylmethyl)-5-oxo-5H-thiazolo[3,2-a]pyridine-3-carboxylate | $^1$H NMR (MeOD, 600 MHz) δ 8.67 (s, 1H), 7.93-7.87 (m, 2H), 7.82 (d, J = 7.9 Hz, 1H), 7.56 (d, J = 6.0 Hz, 2H), 7.47-7.42 (m, 6H), 6.93 (d, J = 9.2 Hz, 1H), 5.74 (s, 1H), 4.47 (s, 2H), 4.02 (s, 2H), 3.90 (s, 3H), 2.22 (s, 3H), 1.83-1.78 (m, 2H), 1.55-1.49 (m, 2H), 1.40-1.36 (m, 4H), 0.93 (t, J = 6.8 Hz, 3H).<br>$^{13}$C NMR (MeOD, 151 MHz) δ 167.2, 159.8, 159.6, 148.3, 141.3, 137.2, 135.55, 135.4, 133.2, 133.0, 131.4, 129.8, 128.9, 128.8, 128.4, 128.4, 127.3, 126.8, 126.5, 125.6, 125.0, 122.5, 120.6, 112.2, 110.3, 69.1, 60.9, 33.4, 32.7, 30.3, 26.9, 23.6, 16.3, 14.3. |
| 41 | 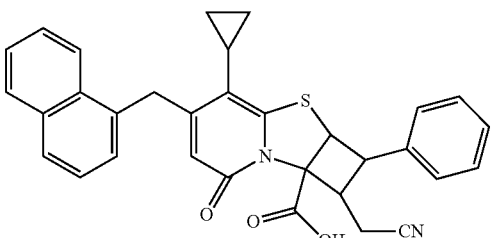 1-(cyanomethyl)-4-cyclopropyl-5-(naphthalen-1-ylmethyl)-7-oxo-2-phenyl-2,2a,7,8a-tetrahydro-1H-cyclobuta[4,5]thiazolo[3,2-a]pyridine-8a-carboxylic acid | $^1$H NMR (DMSO-$d_6$, 600 MHz) δ 7.94 (d, 1H, J = 4.0 Hz, Ar), 7.85 (dd, 2H, J = 8.0, 4.0 Hz, Ar), 7.56 (ddd, 2H, J = 16.0, 8.0, 4.0 Hz, Ar), 7.49 (dd, 1H, J = 12.0, 4.0 Hz, Ar), 7.25-7.20 (m, 1H, Ar), 7.07-7.03 (m, 4H, Ar), 7.00-6.96 (m, 2H, Ar), 4.95 (br s, 2H, CH), 4.48 (br d, J = 12.0 Hz, 1H, CH), 4.42-4.34 (m, 1H, CH), 4.24 (br d, J = 12.0 Hz, 1H, CH), 2.88-2.85 (m, 1H, CH), 1.73-1.65 (m, 1H, CH), 0.95-0.86 (m, 1H, CH), 0.83-0.75 (m, 2H, $CH_2$), 0.71-0.66 (m, 2H, $CH_2$). |

The following example compounds may be prepared in accordance with the present invention.

TABLE 2

Prophetic Examples

| Example Number | Chemical structure Chemical name | NMR |
| --- | --- | --- |
| 42 | (2S)-4-cyclopropyl-2a-methyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid | |
| 43 | (2R)-4-cyclopropyl-2a-methyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid | |
| 44 | (2S)-4-cyclopropyl-5-(naphthalen-1-ylmethyl)-7-oxo-2-(3-(trifluoromethyl)phenyl)-2a-vinyl-2,2a,7,8a-tetrahydro-1H-cyclobuta[4,5]thiazolo[3,2-a]pyridine-8a-carboxylic acid | |

TABLE 2-continued

Prophetic Examples

| Example Number | Chemical structure<br>Chemical name | NMR |
|---|---|---|
| 45 | (2R)-4-cyclopropyl-5-(naphthalen-1-ylmethyl)-7-oxo-2-(3-(trifluoromethyl)phenyl)-2a-vinyl-2,2a,7,8a-tetrahydro-1H-cyclobuta[4,5]thiazolo[3,2-a]pyridine-8a-carboxylic acid | |
| 46 | (2S)-6-(azetidin-1-yl)-4-cyclopropyl-2-(3,5-dichlorophenyl)-5-(naphthalen-1-ylmethyl)-7-oxo-2,2a,7,8a-tetrahydro-1H-cyclobuta[4,5]thiazolo[3,2-a]pyridine-8a-carboxylic acid | |
| 47 | (2S)-4-cyclopropyl-2-(3,5-dichlorophenyl)-5-(naphthalen-1-ylmethyl)-7-oxo-2,2a,7,8a-tetrahydro-1H-azeto[2',3':4,5]thiazolo[3,2-a]pyridine-8a-carboxylic acid | |

TABLE 2-continued

Prophetic Examples

| Example Number | Chemical structure Chemical name | NMR |
|---|---|---|
| 48 | 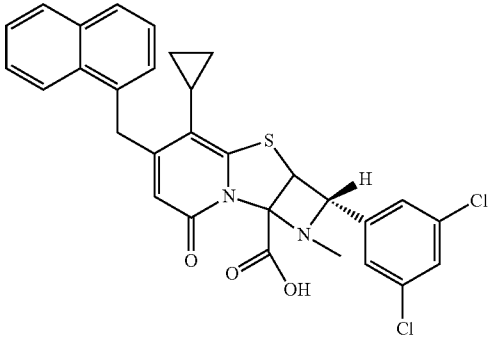 [SMILES: CN1[C@@H](c2cc(Cl)cc(Cl)c2)C2Sc3c(C4CC4)c(Cc4cccc5ccccc45)cc(=O)n3C21C(=O)O]<br>(2S)-4-cyclopropyl-2-(3,5-dichlorophenyl)-1-methyl-5-(naphthalen-1-ylmethyl)-7-oxo-2,2a,7,8a-tetrahydro-1H-azeto[2',3':4,5]thiazolo[3,2-a]pyridine-8a-carboxylic acid | |
| 49 | (2-((2S)-4-cyclopropyl-2-(3,5-dichlorophenyl)-5-(naphthalen-1-ylmethyl)-7-oxo-2,2a,7,8a-tetrahydro-1H-cyclobuta[4,5]thiazolo[3,2-a]pyridin-8a-yl)ethyl)boronic acid | |

Biology

Minimum Inhibitory Concentration (MIC) assay and Minimum Bactericidal Concentration (MBC) Assay To define the MIC, bacterial cultures (190 µl) at a starting OD=0.001 at OD600 were incubated in presence of different increasing concentrations of each compound (10 µl). The cultures (200 µl) were incubated at 37° C. for 24 h. MIC was defined by the lowest concentration of the test compound that after 24 h inhibits visible growth of the pathogen of interest. The MIC was measured in micromolar concentration, i.e. µM. Objectively, this was determined by measuring the optical density (i.e. OD) of the test cultures at 600 nm using a spectrophotometer. As used herein, OD600 stands for optical density at a wavelength of 600 nm (i.e. 600 nanometers).

To define the MBC, 5 µl from each MIC test culture was plated on solid BHI plates. The BHI plates were incubated in 37° C. overnight and next day analyzed for viability of treated bacteria in the MIC test cultures. Bacterial growth on the solid BHI plate indicated that at a given compound concentration, the bacteria were not killed by the treatment. No growth on the BHI plate, indicated that the bacteria were killed by the treatment at a given concentration.

MIC and MBC data for compounds described herein are provided in Table 3 for the Gram-positive bacteria *E. faecalis* (i.e. *Enterococcus faecalis*) and MRSA (i.e. Methicillin-resistant *Stpphylococcus aureus*), respectively. Table 3 also includes data for the compound 8-[4-(Hexyloxy)-3-methyl-phenyl]-5-methoxy-4-[(1-naphthyl)methyl]-2-oxo-7-thia-1-azabicyclo[4.3.0]nona-3,5,8-triene-9-carboxylic acid imidazole salt, which is the compound of Example 14 in WO 2018/229141 having the chemical structure:

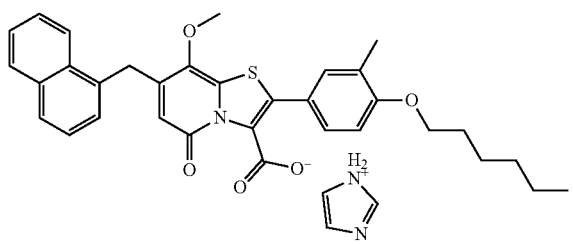

The values provided in Table 3 result from the use of the compounds alone, and the MIC/MBA values are reported in micromolar concentration (i.e. µM). Thus, no antibiotic was used in Table 3.

n.d. indicates that the relevant activity was not observed at the concentrations tested.

TABLE 3 assay data

| Compound of Example No. | MIC/MBC for E. faecalis (µM) | MIC/MBC for MRSA (µM) |
|---|---|---|
| Example 14 in WO 2018/229141 | 4 | 5 |
| 1 | 10/25 | 5/10 |
| 2 | 10/n.d. | 5/10 |
| 3 | 10/25 | 5/5 |
| 5 | 5/25 | 3/4 |
| 8 | 5/n.d. | 5/10 |
| 9 | 5/25 | 5/1 |
| 10 | 10/n.d. | 5/10 |
| 11 | 4/25 | 4/10 |
| 13 | 3/25 | 2/4 |
| 15 | 3/n.d. | 2/4 |
| 16 | 10/n.d. | 10/n.d. |
| 17 | 4/25 | 3/7.5 |
| 19A | 7.5/25 | 5/10 |
| 21 | 5/n.d. | 3/7.5 |
| 22 | 4/n.d. | 4/4 |
| 23 | 3/n.d. | 3/5 |
| 27 | n.d. | 10/n.d. |
| 28 | n.d. | 25/n.d. |
| 29 | 25/n.d. | 7.5/7.5 |
| 30 | 5/n.d. | 5/n.d. |
| 31 | n.d. | 5/n.d. |
| 32 | n.d. | n.d. |
| 33 | 5/n.d. | 5/n.d. |
| 34 | n.d. | 5/n.d. |
| 35 | n.d. | 50/n.d. |
| 36 | n.d. | n.d. |
| 37 | n.d. | 50 |
| 38 | n.d. | n.d. |

It was concluded that the compounds of Examples 5, 8, 9, 11, 13, 15, 17, 19A, 21, 22, 23 and 33 inhibited growth of the pathogen of interest to a substantially similar extent or to a higher extent compared to the compound of Example 14 in WO 2018/229141. In particular, an improved growth inhibition was observed for the pathogen MRSA.

Combined Activity with Gentamicin, Vancomycin or Ampicillin

Experiments were performed in which compounds described herein were tested in a subinhibitory concentration (between 1 and 4 µM depending on the MIC of the compound) together with a fixed concentration of either gentamicin, vancomycin or ampicillin. The concentrations used in the experiments with E. faecalis OG1RF were 16 µg/ml gentamicin, 1 µg/ml vancomycin or 1 µg/ml ampicillin. In experiments where combinations were tested against MRSA 1369, 0.05 µg/ml gentamicin, 1 µg/ml vancomycin or 16 µg/ml ampicillin was used.

Bacterial cultures (190 µl) at a starting OD=0.001 at $OD_{600}$ were incubated together with either subinhibitory concentrations of gentamicin/vancomycin/ampicillin or compound alone, or a combination of the two. The cultures (200 µl) were incubated at 37° C. for 24 h. A control sample without compound and gentamicin/vancomycin/ampicillin but containing compound vehicle (DMSO) and gentamicin/vancomycin/ampicillin vehicle (MQ water) was performed the same way. After 24 h, the effect on bacterial growth compared to untreated control samples was determined by measuring optical density at 600 nm with a spectrophotometer.

Figure 7:
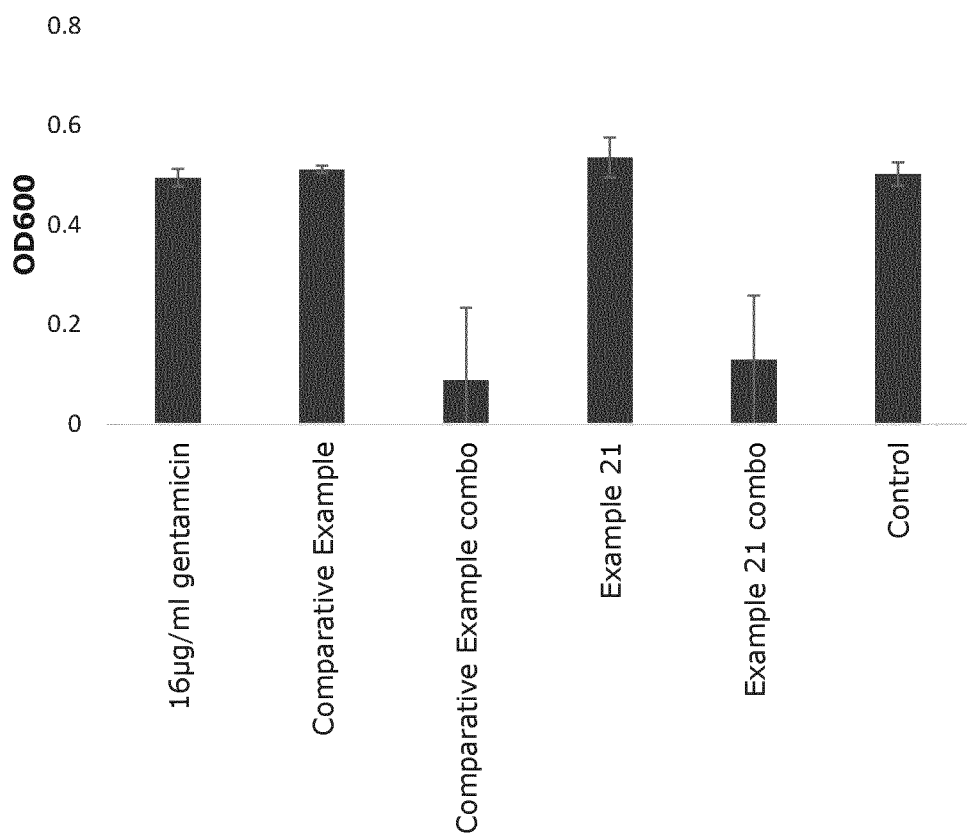
FIG. 7 shows the effect of a combination of gentamicin and the compound of Example 21 described herein on E. faecalis OG1RF.

FIG. 7 shows the results for the compound of Example 21 as described herein, administered alone and in combination with gentamicin. A comparison is made with gentamicin administered alone, the compound of Example 14 of in WO 2018/229141 ("comparative example") administered alone and administered in combination with gentamicin. As used herein, "combo" stands for administered in combination. The control sample is bacteria without compound or gentamicin but contain vehicles DMSO and MQ.

Figure 8:
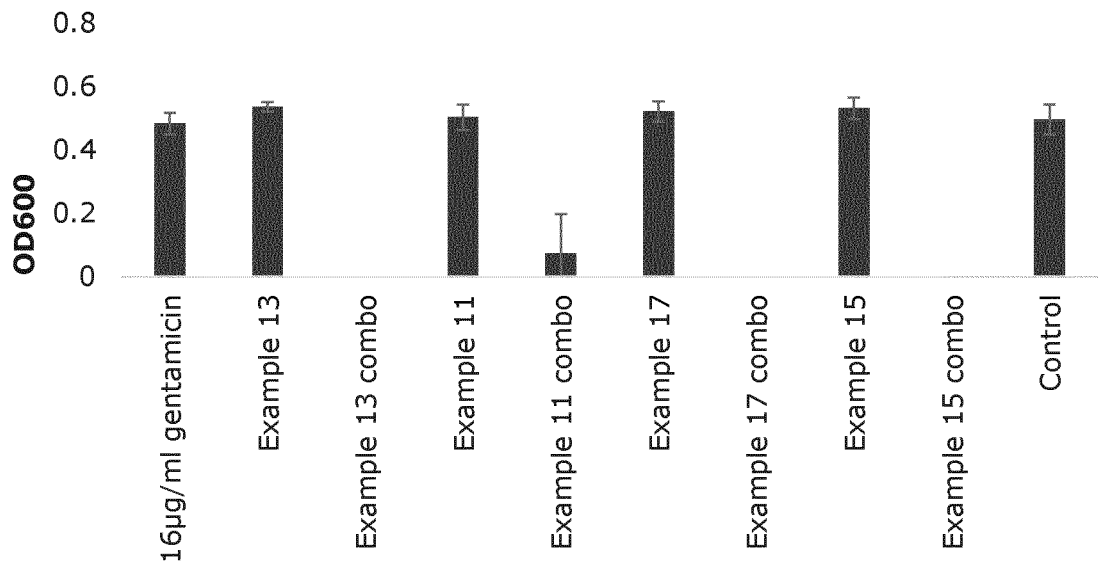
FIG. 8 shows the effect of a combination of gentamicin and the compound of Example 13, 11, 17 and 15 described herein on E. faecalis OG1RF.

FIG. 8 shows the results for the compounds of Examples 13, 11, 17 and 15 as described herein, administered alone and in combination with gentamicin. A comparison is made with gentamicin administered alone. The control sample is bacteria without compound or gentamicin but contain vehicles DMSO and MQ.

Figure 9:
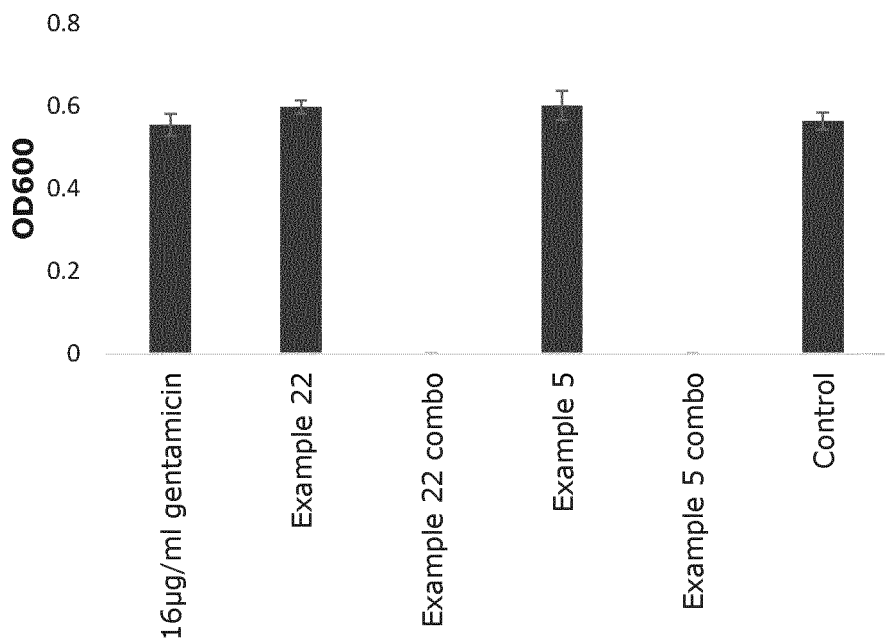
FIG. 9 shows the effect of a combination of gentamicin and the compound of Examples 22, 5 and 9 described herein on E. faecalis OG1RF.
Figure 10:
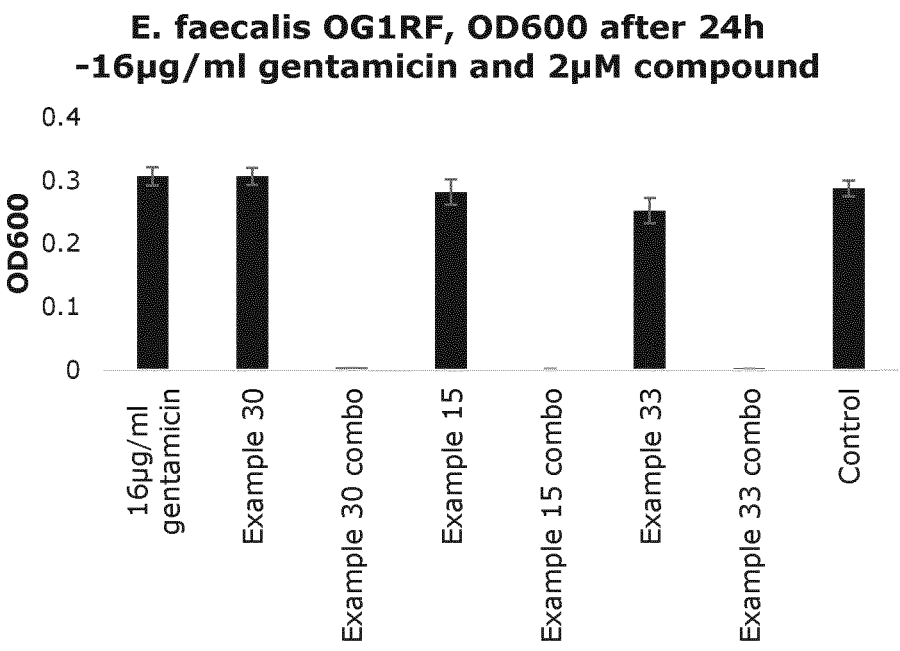
FIG. 10 shows the effect of a combination of gentamicin and the compound of Examples 30, 15 and 33 described herein on E. faecalis OG1RF.
Figure 11:
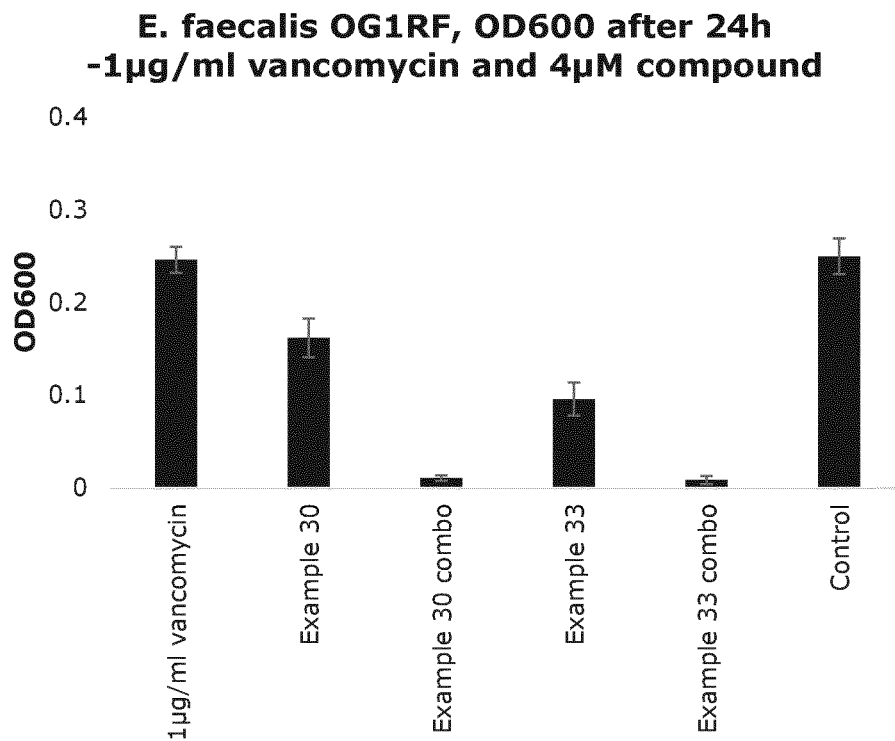
FIG. 11 shows the effect of a combination of vancomycin and the compound of Examples 30 and 33 described herein on E. faecalis OG1RF.
Figure 12:
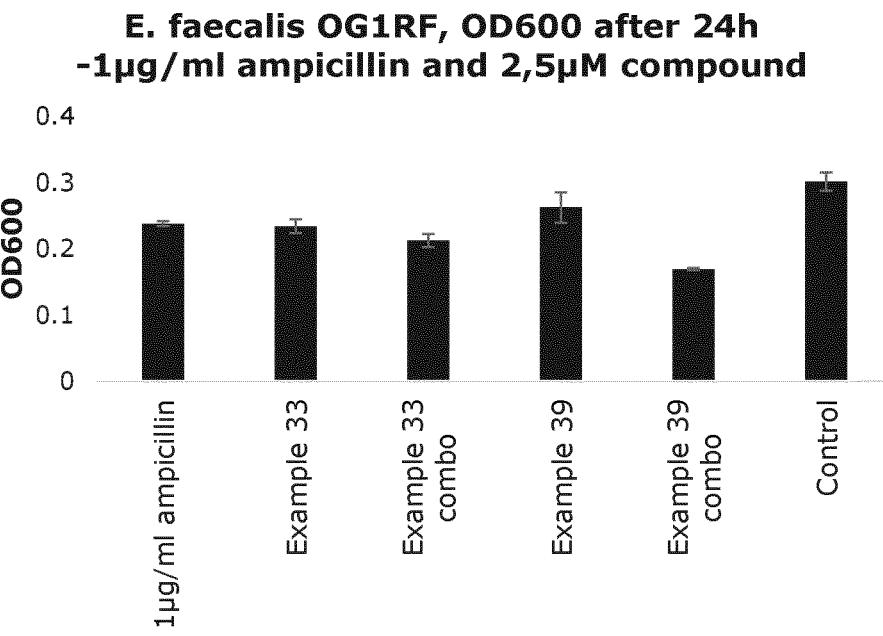
FIG. 12 shows the effect of a combination of ampicillin and the compound of Examples 33 and 39 described herein on E. faecalis OG1RF.
Figure 13:
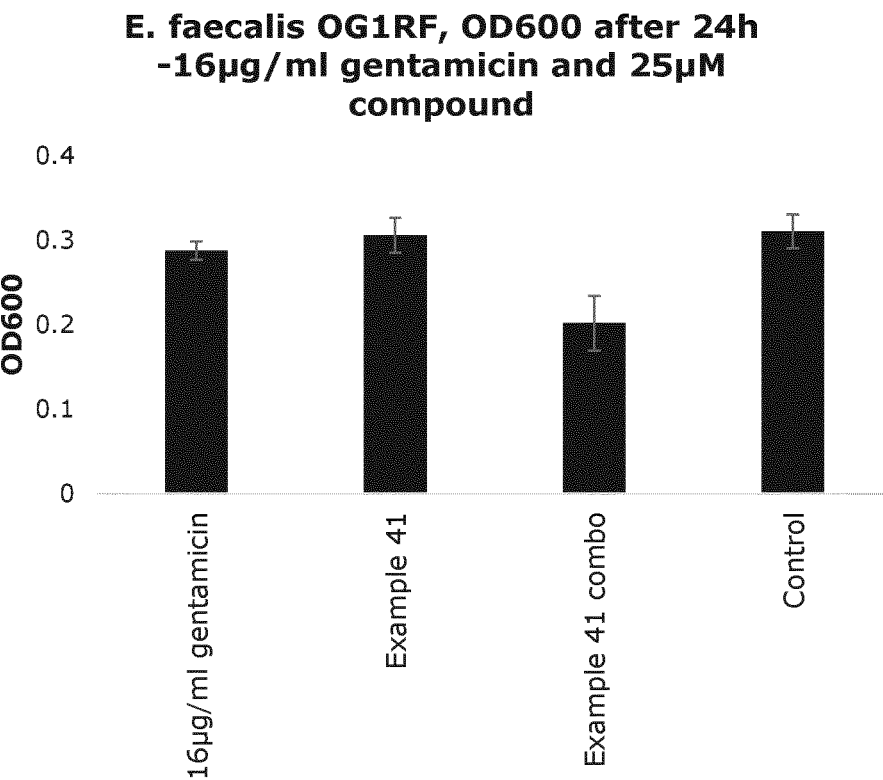
FIG. 13 shows the effect of a combination of gentamicin and the compound of Example 41 described herein on E. faecalis OG1RF.
Figure 14:
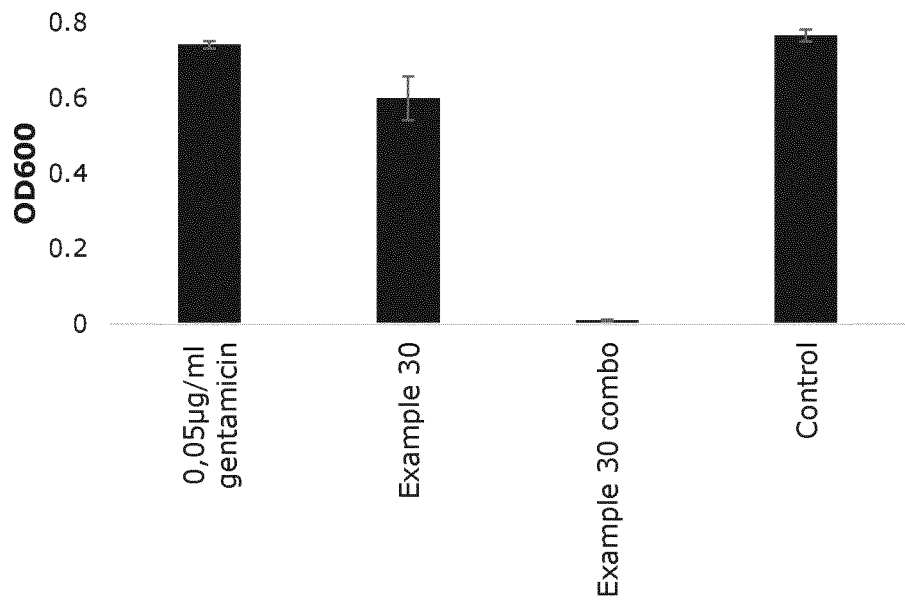
FIG. 14 shows the effect of a combination of gentamicin and the compound of Example 30 described herein on MRSA 1369.
Figure 15:
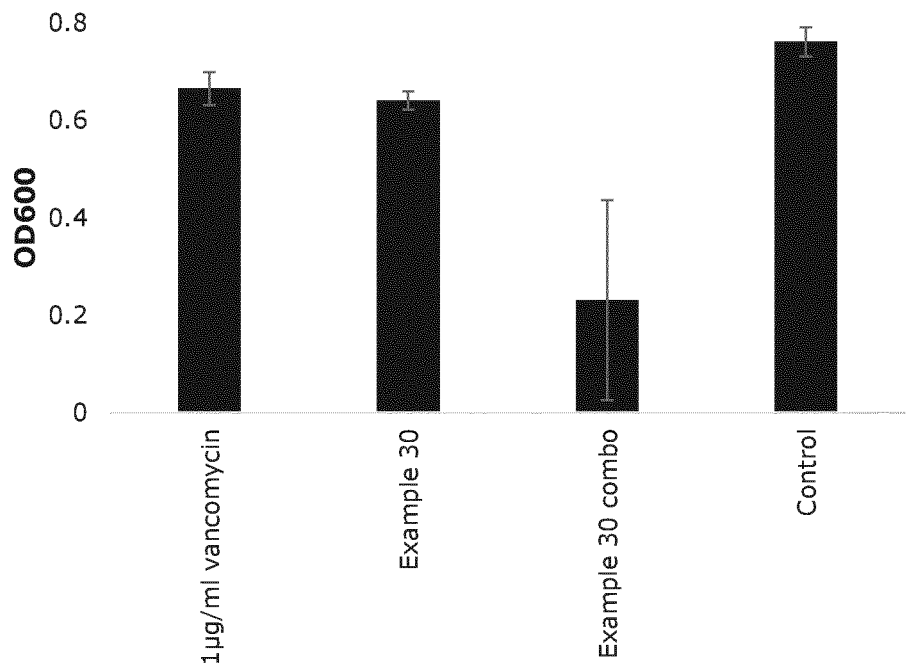
FIG. 15 shows the effect of a combination of vancomycin and the compound of Example 30 described herein on MRSA 1369.
Figure 16:
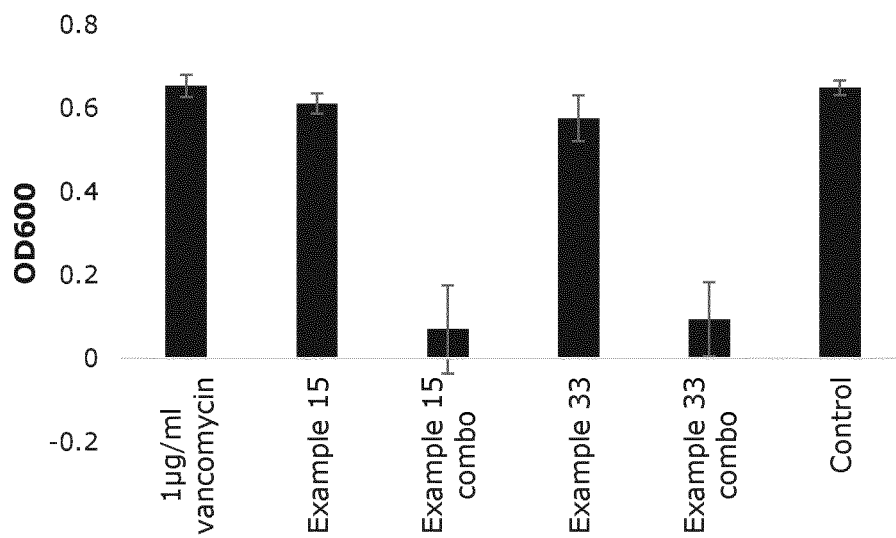
FIG. 16 shows the effect of a combination of vancomycin and the compound of Examples 17 and 33 described herein on MRSA 1369.
Figure 17:
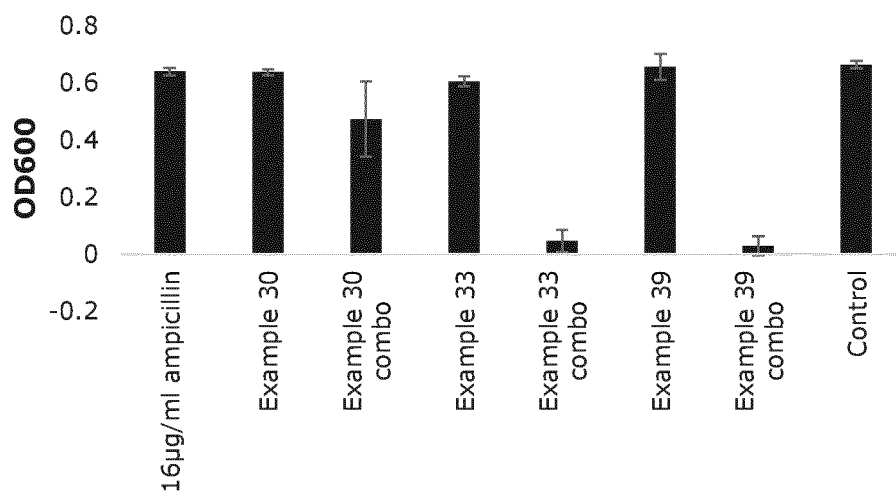
FIG. 17 shows the effect of a combination of ampicillin and the compound of Examples 30, 33 and 39 described herein on MRSA 1369.
Figure 18:
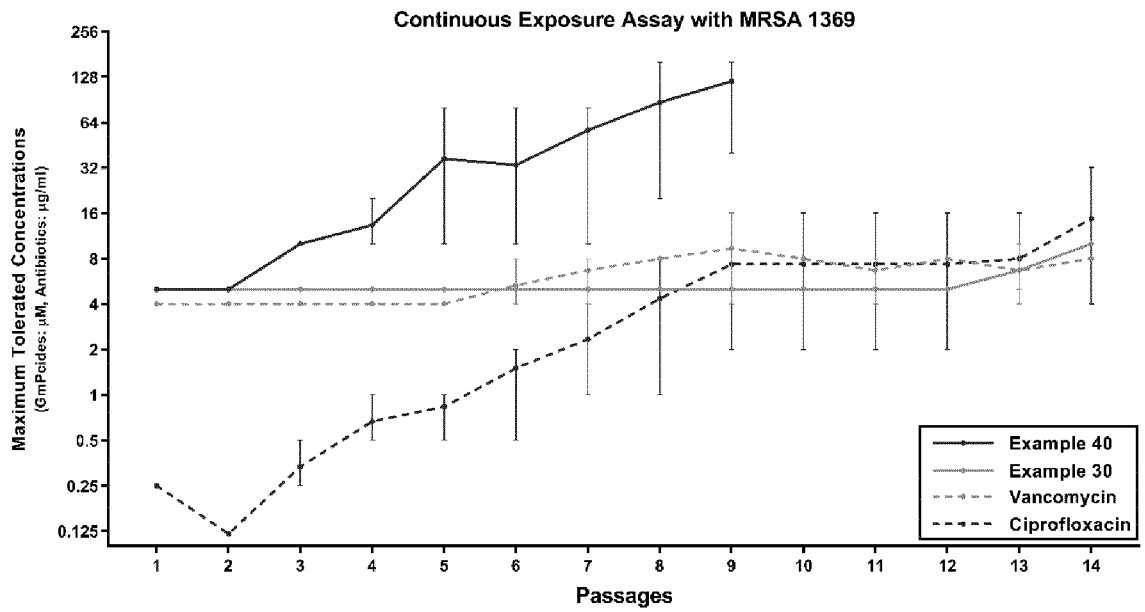
FIGS. 19 and 18 show continuous exposure assay of MRSA 1369 and E. faecalis OG1RF against Examples 30 and 40 to investigate the level of resistance development.
Figure 19:
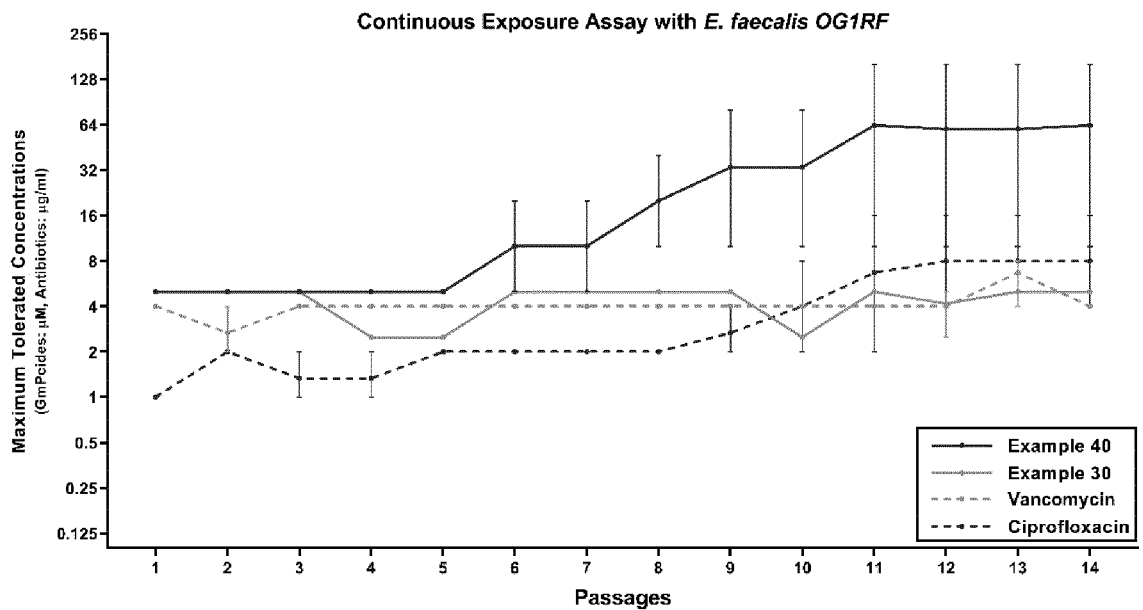
Figure 20:
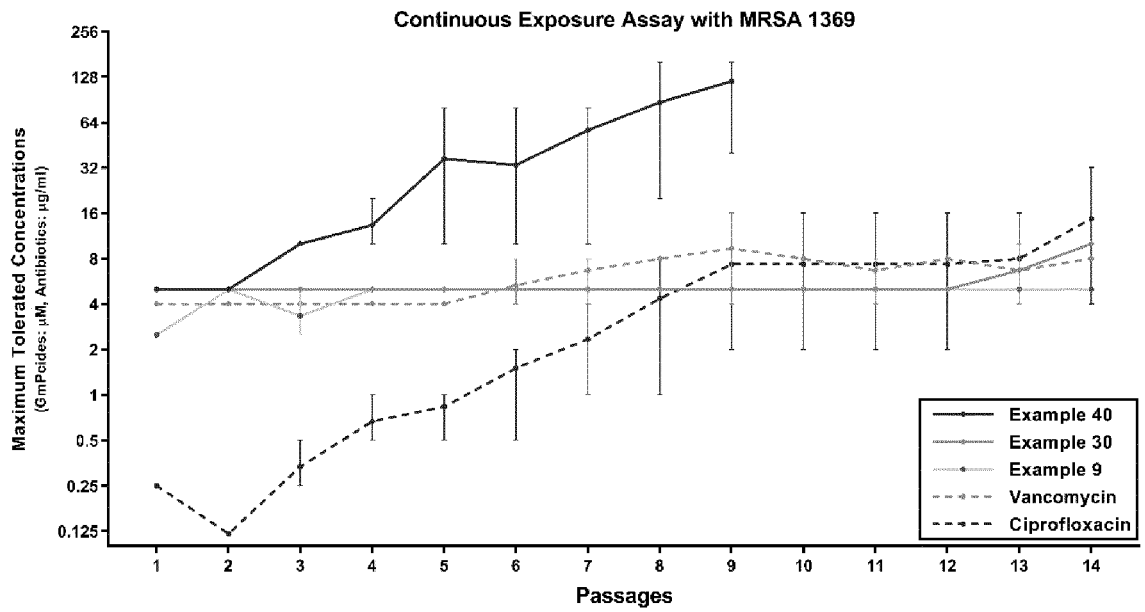
FIGS. 20 and 21 show continuous exposure assay of MRSA 1369 and E. faecalis OG1RF against Examples 9, 30 and 40 to investigate the level of resistance development.
Figure 21:
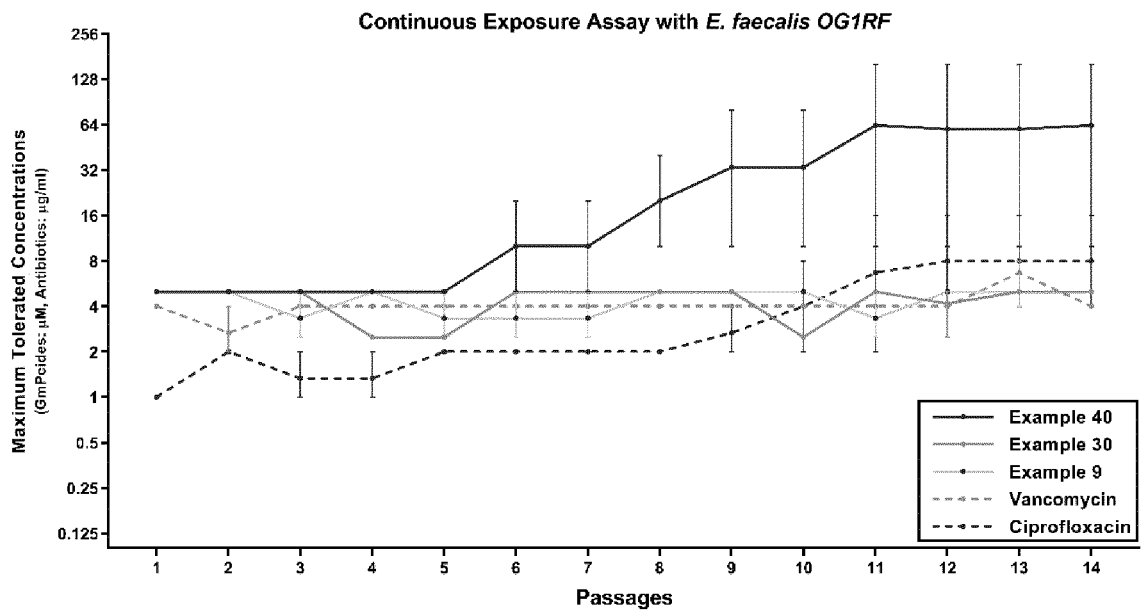
Figure 22:
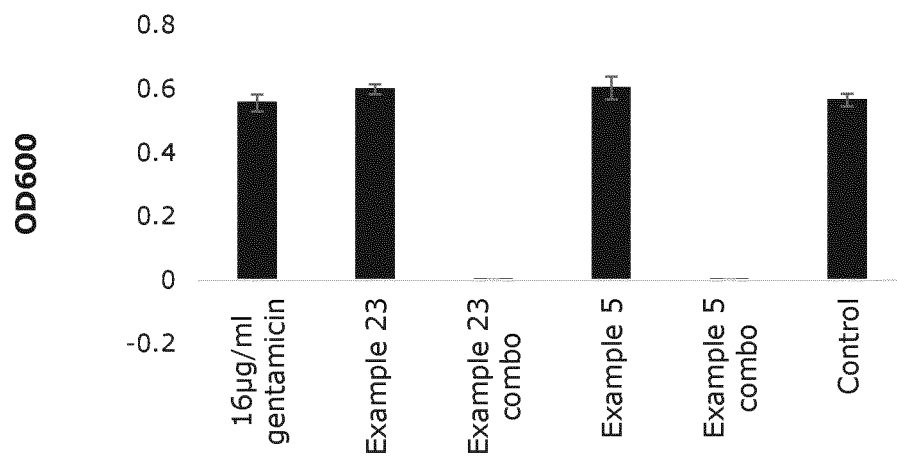
FIG. 22 shows the effect of a combination of gentamicin and the compound of Examples 23 and 5 described herein on E. faecalis OG1RF.
Figure 23:
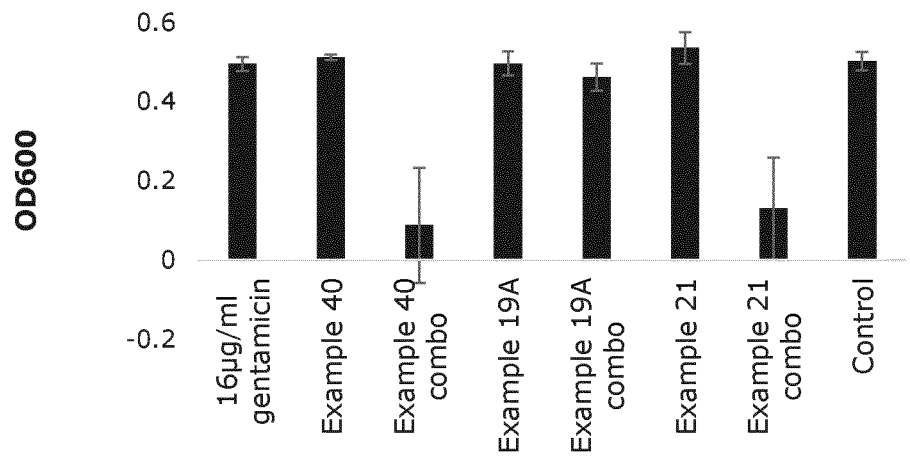
FIG. 23 shows the effect of a combination of gentamicin and the compound of Examples 40, 19A and 21 described herein on E. faecalis OG1RF.
Figure 24:
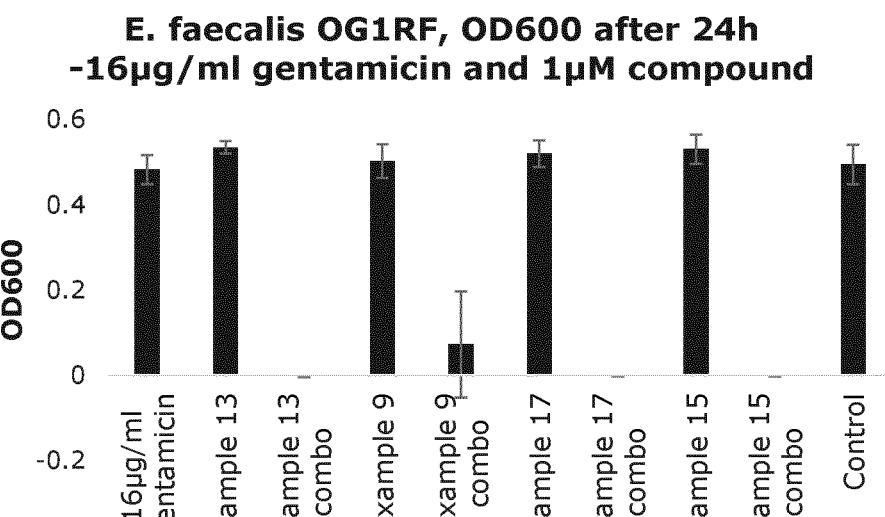
FIG. 24 shows the effect of a combination of gentamicin and the compound of Examples 13, 9, 17 and 15 described herein on E. faecalis OG1RF.
Figure 25:
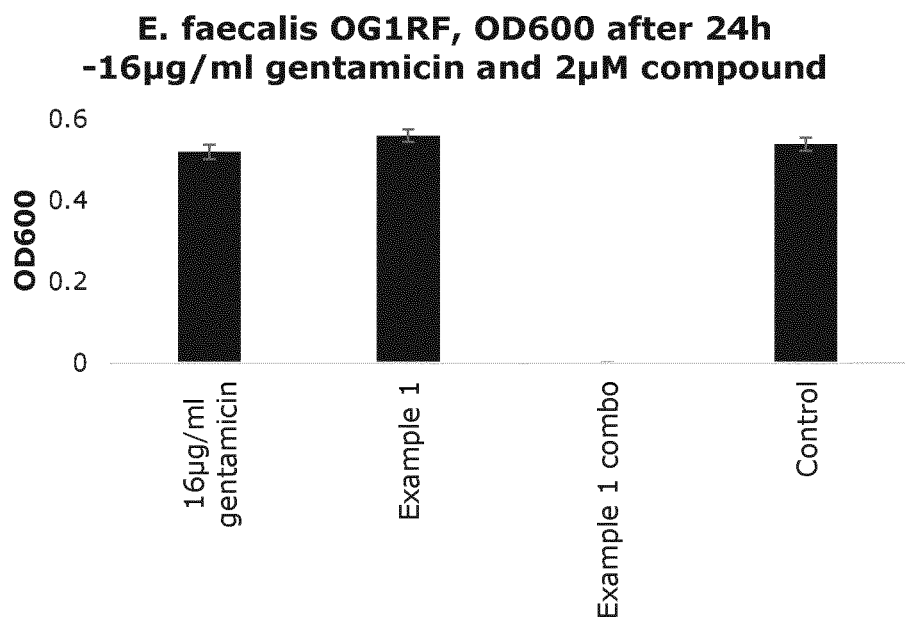
FIG. 25 shows the effect of a combination of gentamicin and the compound of Example 1 described herein on E. faecalis OG1RF.
Figure 26:
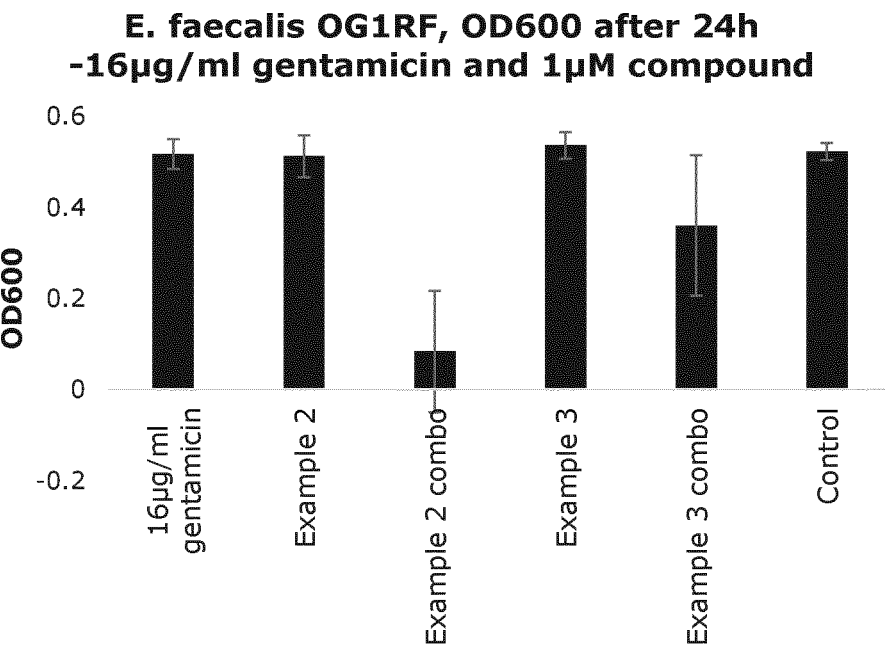
FIG. 26 shows the effect of a combination of gentamicin and the compound of Examples 2 and 3 described herein on E. faecalis OG1RF.
Figure 27:
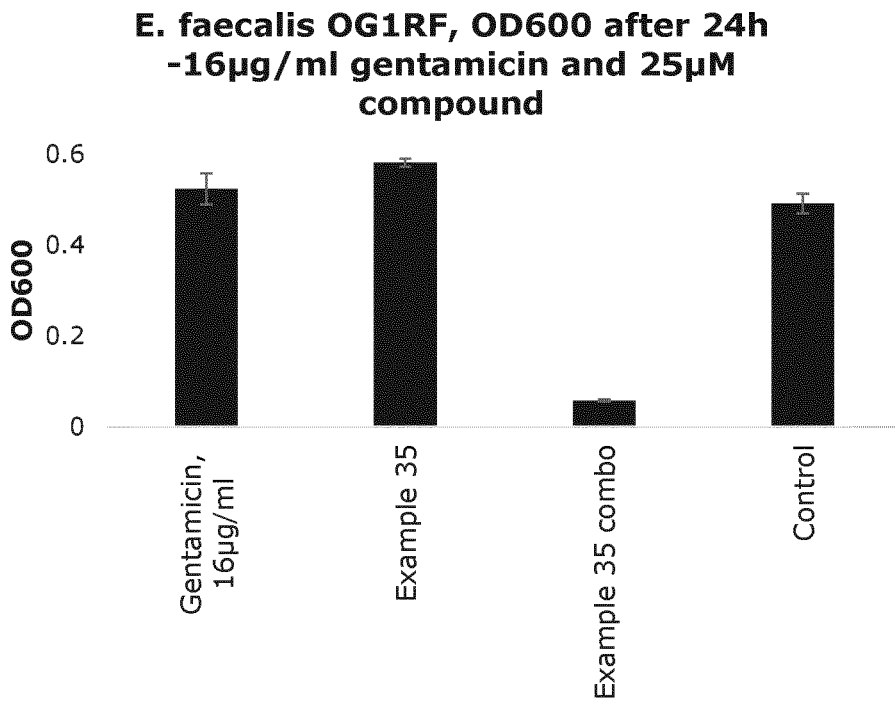
FIG. 27 shows the effect of a combination of gentamicin and the compound of Example 35 described herein on E. faecalis OG1RF.
Figure 28:
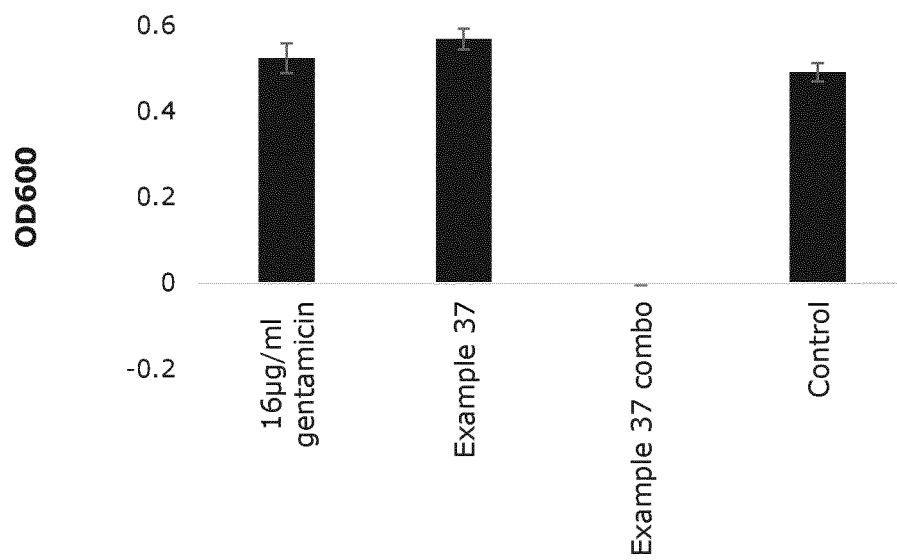
FIG. 28 shows the effect of a combination of gentamicin and the compound of Example 37 described herein on E. faecalis OG1RF.
Figure 29:
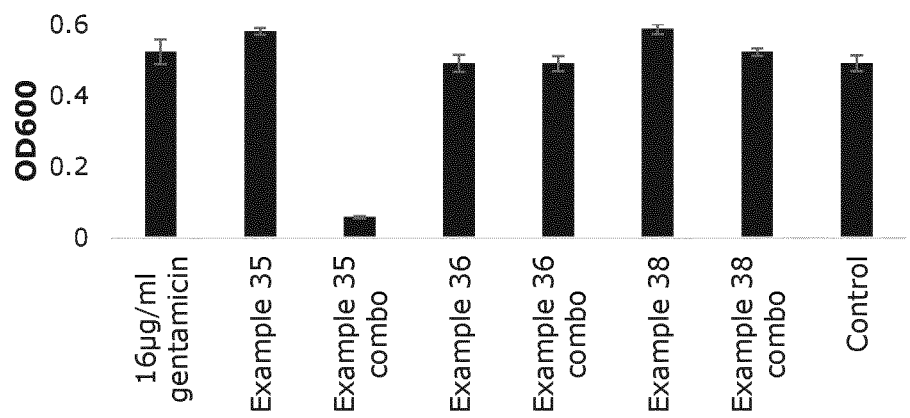
FIG. 29 shows the effect of a combination of gentamicin and the compound of Examples 35, 36 and 38 described herein on E. faecalis OG1RF.
Figure 30:
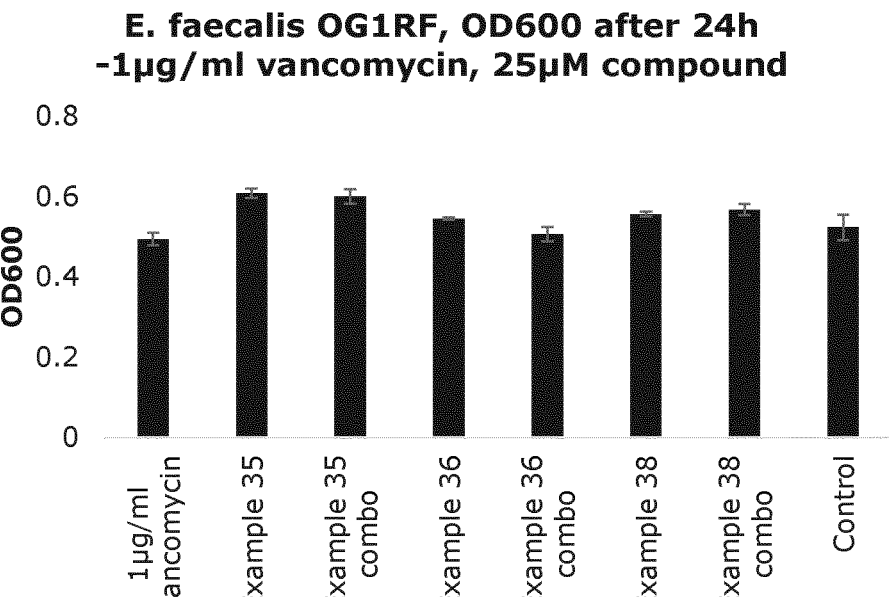
FIG. 30 shows the effect of a combination of vancomycin and the compound of Examples 35, 36 and 38 described herein on E. faecalis OG1RF.
Figure 31:
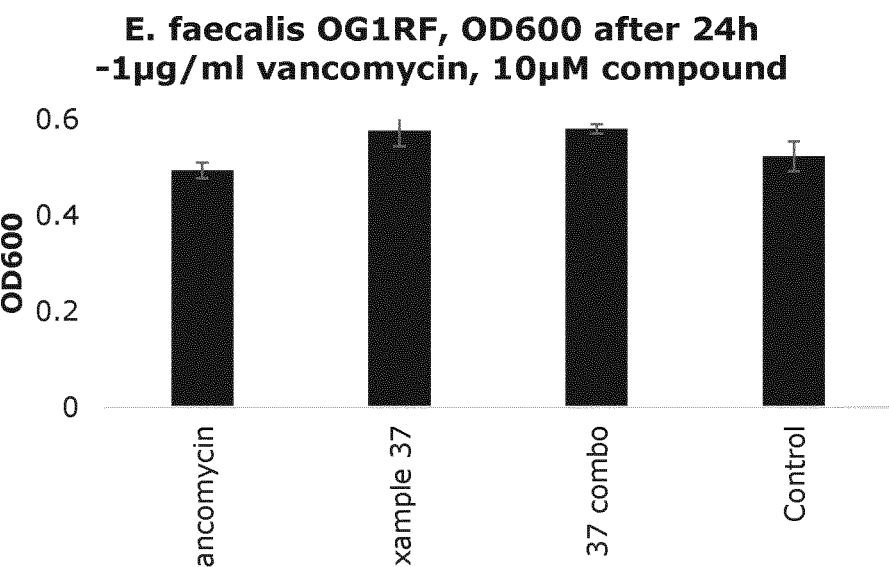
FIG. 31 shows the effect of a combination of vancomycin and the compound of Example 37 described herein on E. faecalis OG1RF.
Figure 32:
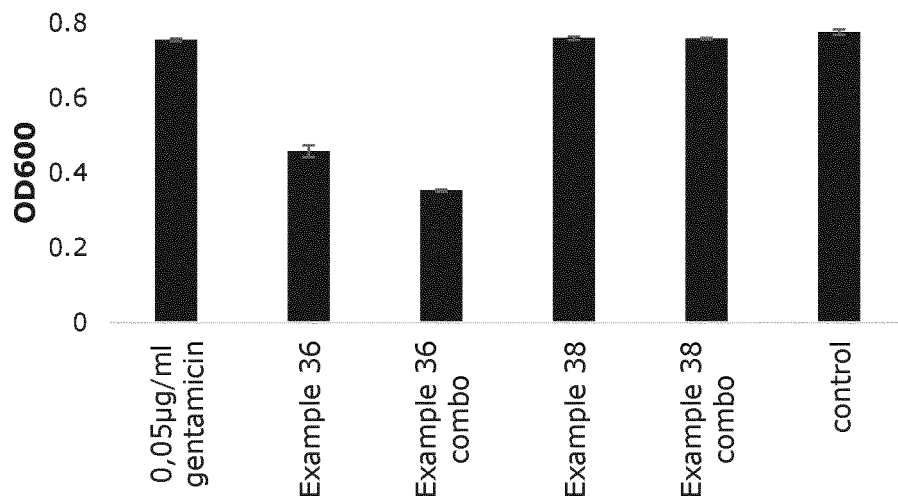
FIG. 32 shows the effect of a combination of gentamicin and the compound of Examples 36 and 38 described herein on MRSA 1369.
Figure 33:
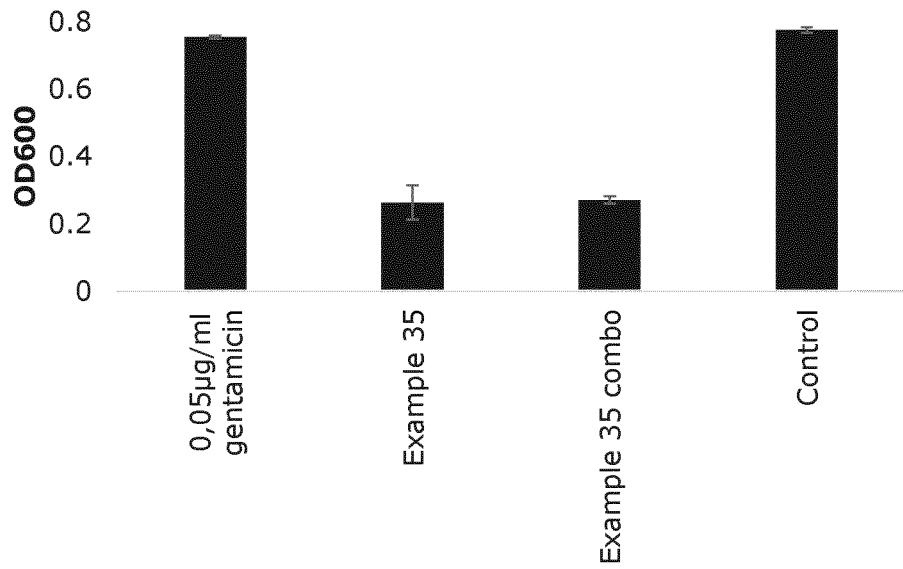
FIG. 33 shows the effect of a combination of gentamicin and the compound of Example 35 described herein on MRSA 1369.
Figure 34:
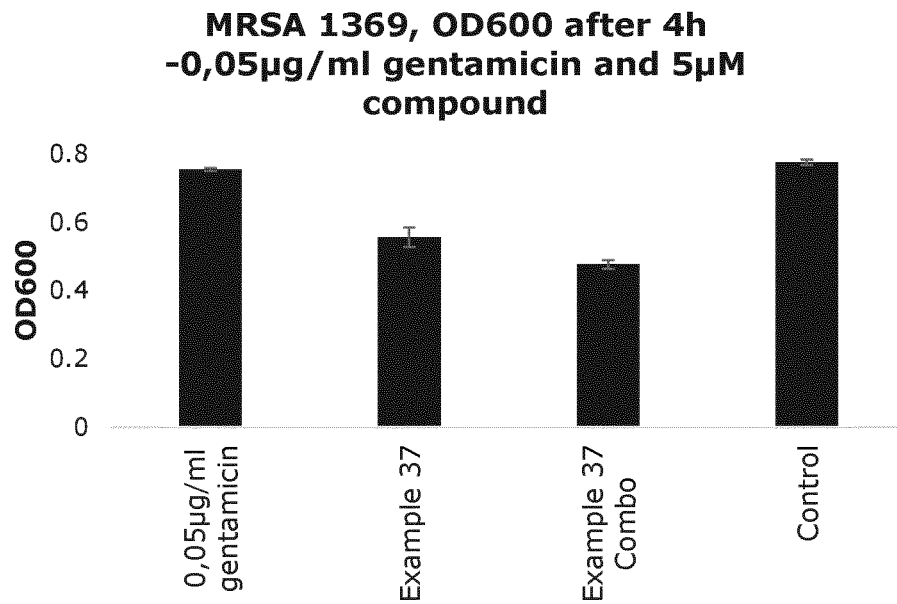
FIG. 34 shows the effect of a combination of gentamicin and the compound of Example 37 described herein on MRSA 1369.
Figure 35:
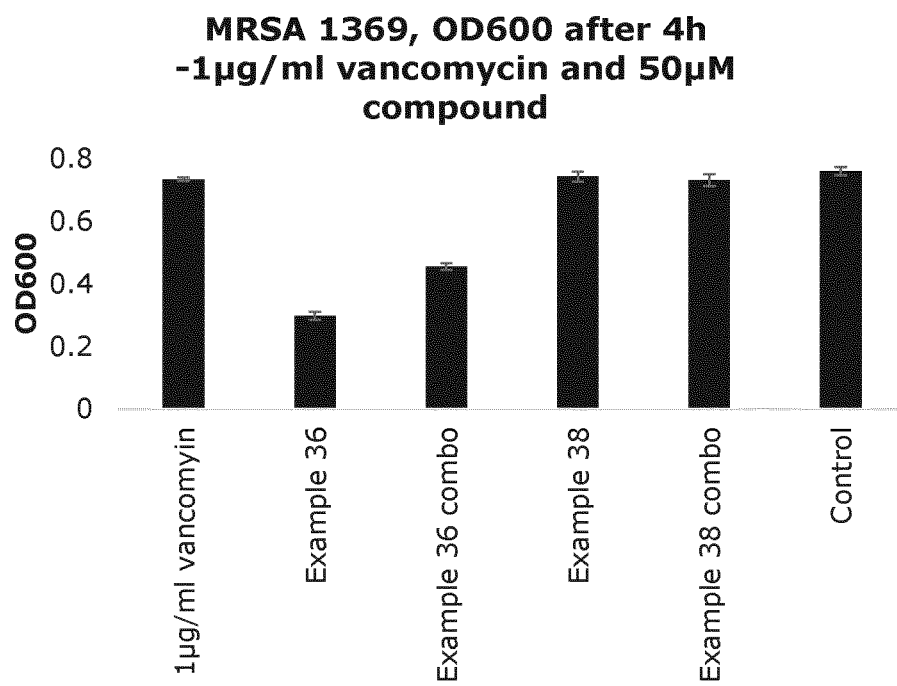
FIG. 35 shows the effect of a combination of vancomycin and the compound of Examples 36 and 38 described herein on MRSA 1369.
Figure 36:
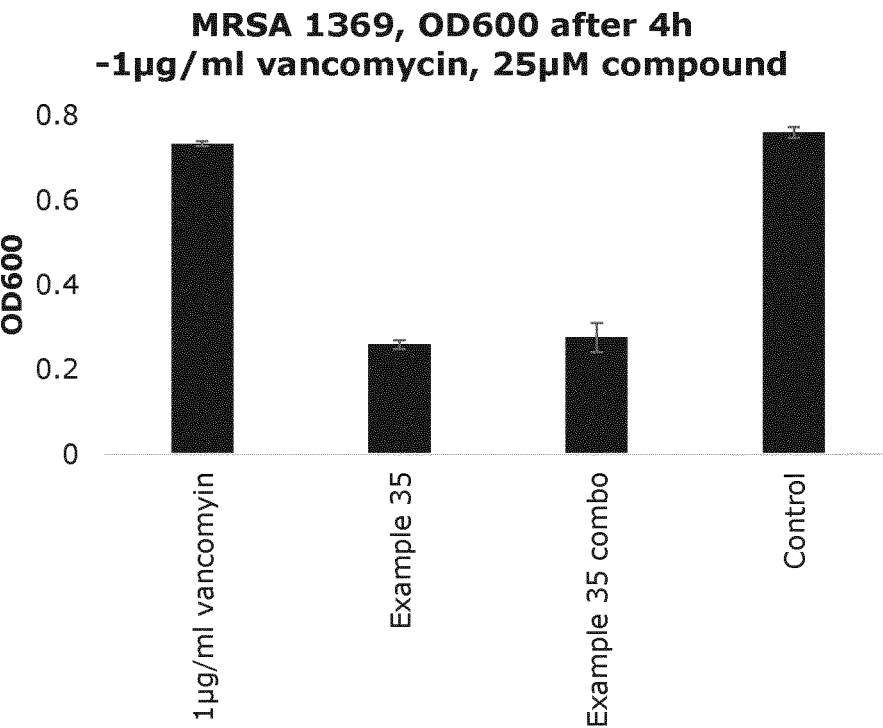
FIG. 36 shows the effect of a combination of vancomycin and the compound of Example 35 described herein on MRSA 1369.
Figure 37:
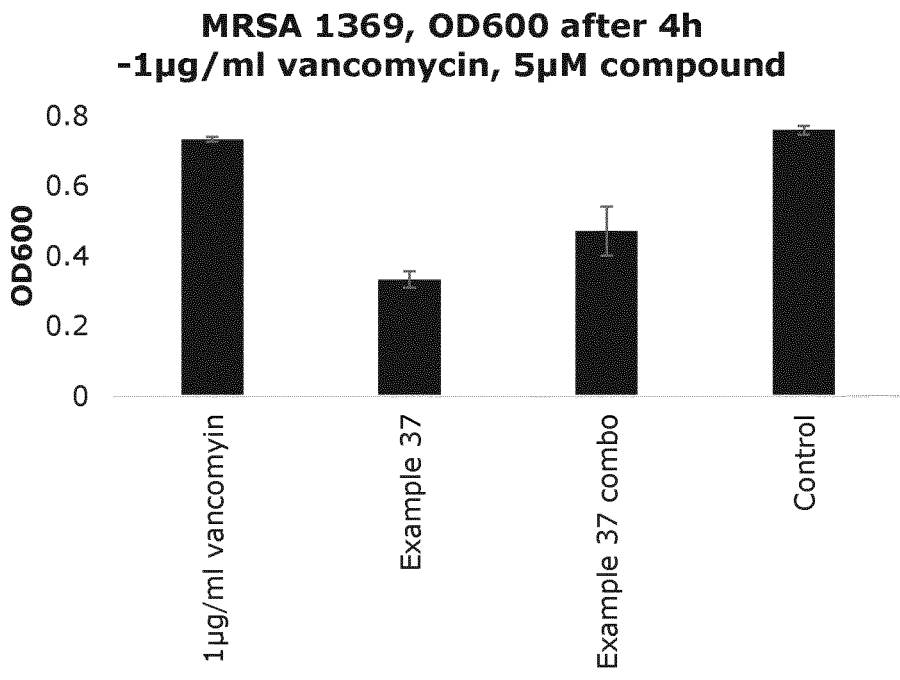
FIG. 37 shows the effect of a combination of vancomycin and the compound of Example 37 described herein on MRSA 1369.
Figure 38:
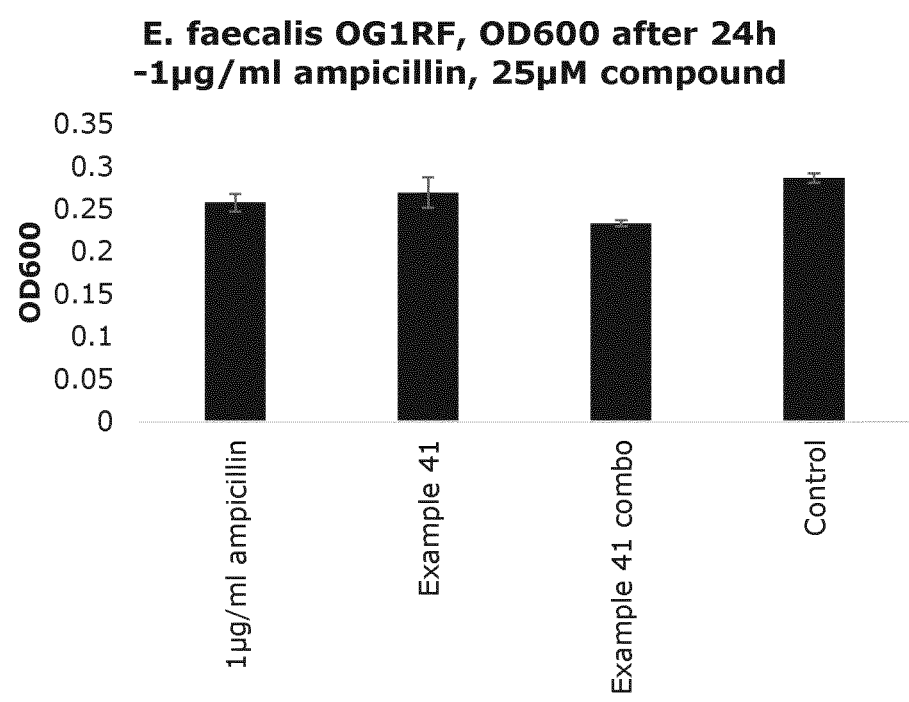
FIG. 38 shows the effect of a combination of ampicillin and the compound of Example 41 described herein on MRSA 1369.

FIG. 9 shows the results for the compounds of Examples 22 and 5 as described herein, administered alone and in combination with gentamicin. A comparison is made with gentamicin administered alone. The control sample is bacteria without compound or gentamicin but contain vehicles DMSO and MQ.

FIGS. 10 to 13 show the results of the compound of Examples 15, 30, 33, 39 and 41 as described herein, administered alone and in combination with gentamicin (FIGS. 10 and 13), vancomycin (FIG. 11), or ampicillin (FIG. 12) in the presence of E. faecalis. The control sample is bacteria without compound or gentamicin/vancomycin but contain vehicles DMSO and MQ.

FIGS. 14 to 17 show the results of the compound of Examples 15, 30, 33 and 39 as described herein, administered alone and in combination with gentamicin (FIGS. 14), vancomycin (FIGS. 15 and 16), or ampicillin (FIG. 17) in the presence of MRSA 1369. The control sample is bacteria without compound or gentamicin/vancomycin but contain vehicles DMSO and MQ.

It was concluded that the compounds of the Examples 13, 17, 15, 22, 5, 30 and 33 administered in combination with gentamicin lowered the E. faecalis activity to a much larger extent compared to gentamicin administered alone, the compounds of the Examples administered alone, the comparative example administered alone and also the combination of the comparative example and gentamicin. Examples 21 and 11 administered in combination with gentamicin lowered the E. faecalis activity to a much larger extent compared to gentamicin administered alone, the compounds of the Examples administered alone, the comparative example administered alone and to a similar extent as the combination of the comparative example and gentamicin. Examples 30 and 33 administered in combination with vancomycin lowered the E. faecalis activity to a much larger extent compared to vancomycin administered alone, or the compounds of the Examples administered alone.

It was further concluded that the compounds of the Example 30 administered in combination with gentamicin or vancomycin lowered the MRSA activity to a much larger extent compared to gentamicin or vancomycin administered alone or the compounds of the Example administered alone. Examples 15 and 33 administered in combination with vancomycin or ampicillin lowered the MRSA activity to a much larger extent compared to vancomycin or ampicillin administered alone or the compounds of the Examples administered alone.

The synergistic effect with respect to E. faecalis is also shown in Table 4, some further compounds when combined with gentamicin is shown in Table 4 below. MIC/MBC values for the compounds administered alone are also shown for comparison. Unless otherwise stated, the compound was provided in a concentration of 1 µM.

TABLE 4 combination assays

| Compound of Example No. | MIC/MBC for E. faecalis µM | Synergistic effect when combined with gentamicin (OD$_{600}$ at 24 h) |
|---|---|---|
| Example 14 in WO 2018/229141 | 4 | |
| 1 | 10/n.d. | Yes (Compound of Example 1 provided in a concentration of 2 µM) |
| 2 | 10/n.d. | Yes OD$_{600}$ = 0.1 |
| 3 | 10/25 | Yes OD$_{600}$ = 0.35 at 24 h |
| 5 | 5/n.d. | Yes OD$_{600}$ = 0 |
| 9 | 5/25 | Yes OD$_{600}$ = 0.1 |
| 13 | 3/n.d. | Yes OD$_{600}$ = 0 |
| 15 | 3/n.d. | Yes OD$_{600}$ = 0 |
| 17 | 4/n.d. | Yes OD$_{600}$ = 0 |
| 19A | 7.5/n.d. | Yes |
| 21 | 5/25 | Yes OD$_{600}$ = 0.1 |
| 23 | 3/n.d. | Yes OD$_{600}$ = 0 |
| 35 | n.d. | Yes (Compound of Example 35 provided in a concentration of 25 µM) OD$_{600}$ = 0 |
| 36 | n.d. | n.d. |
| 37 | n.d. | Yes (Compound of Example 37 provided in a concentration of 10 µM) OD$_{600}$ = 0 |
| 38 | n.d. | n.d. |

It was concluded that when compounds of Formula I are administered in combination with gentamicin, vancomycin or ampicillin, the E. faecalis and/or MRSA activity was lowered to a much larger extent compared to when (i) gentamicin, vancomycin or ampicillin are administered alone, (ii) the compounds of the Examples are administered alone, (iii) the comparative example is administered alone and also (iv) the combination of the comparative example (Example 14 in WO 2018/229141) and gentamicin.

Continuous Exposure Assay

The purpose of this assay was to investigate resistance development of E. faecalis and MRSA towards various compounds described herein, such as compounds of Formula I. Overnight MRSA 1369 and E. faecalis OG1RF cultures were exposed to various concentrations of compounds of Examples 9, 30 and 40 or antibiotics (vancomycin or ciprofloxacin) in 96-well plates either by shaking at 37° C. (for MRSA 1369) or standing at 37° C. with 5% CO$_2$ (for E. faecalis OG1RF). From start the concentrations of examples used were in a range from subinhibitory concentration 1.25 µM, up to 10 µM with three, 2-fold dilution steps. Ciprofloxacin was used in a range from 0.06 µg/ml to 0.5 µg/ml and Vancomycin from 1 µg/ml to 8 µg/ml with three, 2-fold dilution steps. After 24-hours of incubation, the wells (of compounds of Examples 9, 30 and 40 or antibiotic) where there is at least 70% growth compared to untreated controls were used to set up next passage. The concentrations used for the next passage was hence reevaluated and if necessary changed every day for each treatment option. When and if the bacteria gain resistance and were able to grow in a higher concentration of compound than the previous day, the concentrations used were step-wise increased. The plots represent average of highest compounds of the Examples or antibiotics concentrations where is at least 70% growth (Maximum Tolerated Concentrations) and error bars represent range of the independent triplicates.

In was concluded (see FIGS. 18 to 21) that resistance development of MRSA 1369 and E. faecalis OG1RF towards compounds of Formula I is delayed or ameliorated.

The invention claimed is:
1. A compound of Formula II:

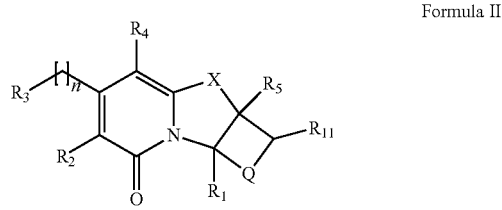

Formula II or a pharmaceutically acceptable salt thereof, wherein
$R_1$ is selected from the group consisting of:
a) C(O)OH,
b) tetrazolyl,
c) (CH$_2$)mB(OH)$_2$,
d) C(O)NHSO$_2$R$_8$,
e) NH$_2$, and
f) H,
$R_2$ is selected from the group consisting of:
a) H,
b) Cl, F, Br or I,
c) CH$_2$OH,
d) C$_1$-C$_4$alkyl,
e) NZ$_1$Z$_2$, and
f) NO$_2$,
$R_3$ is selected from the group consisting of:
a) 1-naphtyl, 2-naphtyl, isoquinolin-4-yl, 1-naphtyloxy, 9-anthryl and 9-anthryloxy each independently substituted with 0, 1, 2 or 3 substituents selected from the group consisting of methyl, fluoro, chloro, bromo, cyano and methoxy, b) $C_1$-$C_4$alkyl substituted with 0, 1, 2, 3 or 4 fluoro,
c) phenyl substituted with 0, 1, 2 or 3 substituents independently selected from the group consisting of methyl, fluoro, chloro, cyano, trifluoromethyl and $C_1$-$C_6$alkoxy,
d) aminophenyl substituted with 0, 1, 2 or 3 substituents independently selected from the group consisting of methyl, fluoro, chloro and trifluoromethyl
e) 2-(3-methyl)phenylmethylene,
f) benzothiophen-2-yl,
g) H,
h) 2-methyl-1-aza-2-bora-1H-naphth-5-yloxy, and
i) 2-methyl-1-aza-2-bora-1H-naphth-5-yl, $R_4$ is selected from the group consisting of:
a) $C_1$-$C_4$alkyl substituted with 0, 1, 2, 3 or 4 fluoro,
b) $C_3$-$C_6$cycloalkyl,
c) $C_1$-$C_4$alkoxy substituted with 0, 1, 2, 3 or 4 fluoro,
d) $C_3$-$C_6$cycloalkoxy,
e) a 3-, 4-, 5-, or 6-membered heterocycle,
f) $NZ_1Z_2$,
g) $CH_2NZ_1Z_2$,
h) C(O)OH,
i) C(O)H, and
j) phenyl substituted with 0, 1, 2 or 3 substituents independently selected from the group consisting of methyl, fluoro, chloro, cyano and trifluoromethyl, $R_5$ is selected from the group consisting of
a) H,
b) $C_1$-$C_6$alkyl,
c) $C_1$-$C_6$alkenyl, and
d) aryl, and in the above definitions:
$R_8$ is $C_1$-$C_4$alkyl or phenyl,
$R_{10}$ is selected from the group consisting of OH, $C_1$-$C_{10}$alkoxy, $C_1$-$C_{10}$alkenoxy, $C_1$-$C_{10}$alkynoxy and $O(CH_2)_2OCH_3$,
$R_{11}$ is (Y)Sphenyl wherein the phenyl moiety is substituted with 0, 1, 2, 3 or 4 substituents independently selected from the group consisting of
a) $C_1$-$C_4$alkyl substituted with 0, 1, 2, 3 or 4 substituents independently selected from the group consisting of Cl, Br, F, I, and $C_1$-$C_{10}$alkoxy,
b) Cl, F, Br or I,
c) a five-membered saturated or unsaturated heterocycle,
d) $NH_2$ or $NHC_1$-$C_6$alkyl, and
e) $C_1$-$C_6$alkoxy substituted with 0, 1, 2, 3 or 4 F, and $R_{11}$ is a five-membered saturated or unsaturated heterocycle, optionally substituted with 0, 1, 2 or 3 substituents independently selected from the group consisting of methyl, fluoro, chloro, cyano and trifluoromethyl, Q is selected from the group consisting of:
$CH_2$,
$CHC_1$-$C_6$alkyl, optionally substituted with cyano or 1, 2 or 3 F,
$CHNO_2$,
$CHNH_2$,
NH,
$NC_1$-$C_6$alkyl,
NOH,
$NOC_1$-$C_6$alkyl,
$NC(O)C_1$-$C_6$alkyl,
$NSO_2C_1$-$C_6$alkyl,
S, and
O,
X is S, SO or $SO_2$,
Y is S or $CH_2$, $Z_1$ and $Z_2$ each independently represents hydrogen, methyl, $CH_3S(O)_2$, $C(O)OR_{10A}$, $C(O)NR_{10A}R_{10B}$ or $C(O)R_{10B}$, or $Z_1$ and $Z_2$ together form $-(CH_2)_3$, $-(CH_2)_4$, or $-(CH_2)_5$, $R_{10A}$ and $R_{10B}$ each independently represent H or $C_1$-6alkyl, and n, m, and s each independently represents 0, 1 or 2.

2. The compound according to claim 1, or a pharmaceutically acceptable salt thereof, wherein
$R_1$ and $R_5$ are oriented syn with respect to each other, and $R_{11}$ is oriented
(i) syn with respect to $R_1$ and $R_5$, or
(ii) anti with respect to $R_1$ and $R_5$.

3. The compound according to claim 1, or a pharmaceutically acceptable salt thereof, which is a compound of Formula IIa and/or Formula IIb:

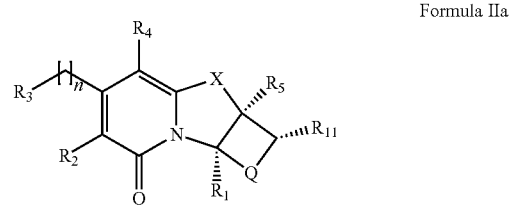

Formula IIa

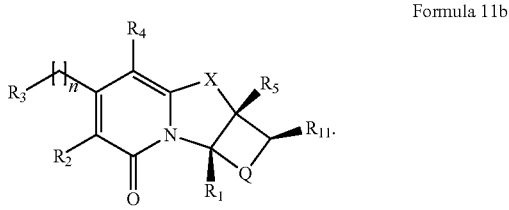

Formula IIb

4. The compound according to claim 1, or a pharmaceutically acceptable salt thereof, which is a compound of Formula IIc and/or Formula IId:

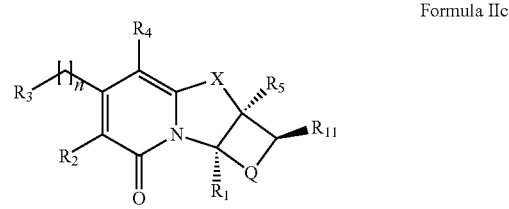

Formula IIc

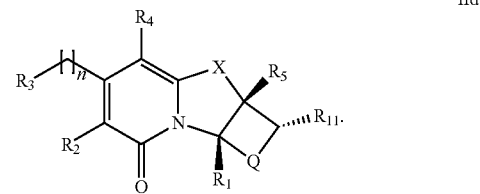

IId

5. The compound according to claim 1, or a pharmaceutically acceptable salt thereof, wherein
Q is $CH_2$, $CH(CH_2)CN$, NH or $NC_1$-$C_6$alkyl, and
$R_1$ is C(O)OH, tetrazolyl or $(CH_2)mB(OH)_2$.

6. The compound according to claim 1, or a pharmaceutically acceptable salt thereof, wherein $R_2$ is H or $NZ_1Z_2$.

7. The compound according to claim 1, or a pharmaceutically acceptable salt thereof, wherein n is 1.

8. The compound according to claim 1, or a pharmaceutically acceptable salt thereof, wherein $R_3$ is 1-naphtyl, 2-naphtyl, 1-naphtyloxy, isoquinolin-4-yl, 9-anthryl and 9-anthryloxy each independently substituted with 0, 1, 2 or 3 substituents selected from the group consisting of methyl, fluoro, chloro, bromo, cyano and methoxy.

9. The compound according to claim 1, or a pharmaceutically acceptable salt thereof, wherein $R_4$ is selected from the group consisting of:
 a) $C_1$-$C_4$alkyl substituted with 0, 1, 2, 3 or 4 fluoro;
 b) $C_3$-$C_6$cycloalkyl,
 c) $C_1$-$C_4$alkoxy substituted with 0, 1, 2, 3 or 4 fluoro, and
 d) $C_3$-$C_6$cycloalkoxy.

10. The compound according to claim 1 which is one or more of the following:
 (2 S)-4-cyclopropyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid,
 (2R)-4-cyclopropyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid,
 (2S)-4-cyclopropyl-6-(dimethylamino)-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid,
 (2S)-4-cyclopropyl-5-(isoquinolin-4-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid,
 (2R)-4-cyclopropyl-5-(naphthalen-1-ylmethyl)-7-oxo-2-(4-(trifluoromethyl)phenyl)-2,2a,7,8a-tetrahydro-1H-cyclobuta[4,5]thiazolo[3,2-a]pyridine-8a-carboxylic acid,
 (2S)-4-cyclopropyl-5-(naphthalen-1-ylmethyl)-7-oxo-2-(4-(trifluoromethyl)phenyl)-2,2a,7,8a-tetrahydro-1H-cyclobuta[4,5]thiazolo[3,2-a]pyridine-8a-carboxylic acid,
 (2S)-2-(3-chlorophenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid,
 (2S)-2-(3-chlorophenyl)-4-cyclopropyl-5-(isoquinolin-4-ylmethyl)-7-oxo-2,2a,7,8a-tetrahydro-1H-cyclobuta[4,5]thiazolo[3,2-a]pyridine-8a-carboxylic acid,
 (2R)-2-(3-chlorophenyl)-4-cyclopropyl-6-(dimethylamino)-5-(naphthalen-1-ylmethyl)-7-oxo-2,2a,7,8a-tetrahydro-1H-cyclobuta[4,5]thiazolo[3,2-a]pyridine-8a-carboxylic acid,
 (2R)-2-(3-chlorophenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid,
 (2S)-4-cyclopropyl-2-(3,5-dichlorophenyl)-5-(naphthalen-1-ylmethyl)-7-oxo-2,2a,7,8a-tetrahydro-1H-cyclobuta[4,5]thiazolo[3,2-a]pyridine-8a-carboxylic acid,
 (2R)-4-cyclopropyl-2-(3,5-dichlorophenyl)-5-(naphthalen-1-ylmethyl)-7-oxo-2,2a,7,8a-tetrahydro-1H-cyclobuta[4,5]thiazolo[3,2-a]pyridine-8a-carboxylic acid,
 (2S)-2-(3-bromophenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid,
 (2S)-4-cyclopropyl-2-(2,6-difluorophenyl)-5-(naphthalen-1-ylmethyl)-7-oxo-2,2a,7,8a-tetrahydro-1H-cyclobuta[4,5]thiazolo[3,2-a]pyridine-8a-carboxylic acid,
 (2S)-4-cyclopropyl-5-(naphthalen-1-ylmethyl)-7-oxo-2-(m-tolyl)-2,2a-dihydro-7H-cyclobuta[4,5]thiazolo[3,2-a]pyridine-8a(1H)-carboxylic acid,
 (2R)-4-cyclopropyl-5-(naphthalen-1-ylmethyl)-7-oxo-2-(m-tolyl)-2,2a-dihydro-7H-cyclobuta[4,5]thiazolo[3,2-a]pyridine-8a(1H)-carboxylic acid,
 (2S)-4-cyclopropyl-2-(3,5-dimethylphenyl)-5-(naphthalen-1-ylmethyl)-7-oxo-2,2a,7,8a-tetrahydro-1H-cyclobuta[4,5]thiazolo[3,2-a]pyridine-8a-carboxylic acid,
 (2S)-4-cyclopropyl-2-(3-methyl-4-propoxyphenyl)-5-(naphthalen-1-ylmethyl)-7-oxo-2,2a,7,8a-tetrahydro-1H-cyclobuta[4,5]thiazolo[3,2-a]pyridine-8a-carboxylic acid,
 (2S)-2-(4-butoxy-3-methylphenyl)-4-cyclopropyl-5-(naphthalen-1-ylmethyl)-7-oxo-2,2a,7,8a-tetrahydro-1H-cyclobuta[4,5]thiazolo[3,2-a]pyridine-8a-carboxylic acid,
 (2S)-4-cyclopropyl-2-(4-methoxyphenyl)-5-(naphthalen-1-ylmethyl)-7-oxo-2,2a,7,8a-tetrahydro-1H-cyclobuta[4,5]thiazolo[3,2-a]pyridine-8a-carboxylic acid,
 (2S)-2-(3-aminophenyl)-4-cyclopropyl-5-(naphthalen-1-ylmethyl)-7-oxo-2,2a-dihydro-7H-cyclobuta[4,5]thiazolo[3,2-a]pyridine-8a(1H)-carboxylic acid,
 (2R)-4-cyclopropyl-5-(naphthalen-1-ylmethyl)-7-oxo-2-(thiophen-3-yl)-2,2a,7,8a-tetrahydro-1H-cyclobuta[4,5]thiazolo[3,2-a]pyridine-8a-carboxylic acid,
 (2R)-4-cyclopropyl-5-(naphthalen-1-ylmethyl)-7-oxo-2-(phenylthio)-2,2a,7,8a-tetrahydro-1H-cyclobuta[4,5]thiazolo[3,2-a]pyridine-8a-carboxylic acid,
 (2S)-4-cyclopropyl-5-(naphthalen-1-ylmethyl)-7-oxo-2-(phenylthio)-2,2a,7,8a-tetrahydro-1H-cyclobuta[4,5]thiazolo[3,2-a]pyridine-8a-carboxylic acid,
 (2S)-6-(dimethylamino)-4-methoxy-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid,
 (2S)-5-(benzo[b]thiophen-2-ylmethyl)-2-(3-chlorophenyl)-4-cyclopropyl-7-oxo-2,2a,7,8a-tetrahydro-1H-cyclobuta[4,5]thiazolo[3,2-a]pyridine-8a-carboxylic acid,
 (2S)-4-cyclopropyl-5-(2,3-dichlorobenzyl)-2-(3,5-dimethylphenyl)-7-oxo-2,2a,7,8a-tetrahydro-1H-cyclobuta[4,5]thiazolo[3,2-a]pyridine-8a-carboxylic acid,
 (2S)-5-(4-butoxy-3-methylbenzyl)-2-(3-chlorophenyl)-4-cyclopropyl-7-oxo-2,2a,7,8a-tetrahydro-1H-cyclobuta[4,5]thiazolo[3,2-a]pyridine-8a-carboxylic acid,
 (2S)-4-cyclopropyl-2-(2,6-dichlorophenyl)-5-(naphthalen-2-ylmethyl)-7-oxo-2,2a,7,8a-tetrahydro-1H-cyclobuta[4,5]thiazolo[3,2-a]pyridine-8a-carboxylic acid,
 (2S)-5-(benzo[b]thiophen-2-ylmethyl)-4-cyclopropyl-2-(2,6-dichlorophenyl)-7-oxo-2,2a,7,8a-tetrahydro-1H-cyclobuta[4,5]thiazolo[3,2-a]pyridine-8a-carboxylic acid,
 (2S)-4-cyclopropyl-2a-methyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid,
 (2R)-4-cyclopropyl-2a-methyl-5-(naphthalen-1-ylmethyl)-7-oxo-2-(3-(trifluoromethyl)phenyl)-2,2a,7,8a-tetrahydro-1H-cyclobuta[4,5]thiazolo[3,2-a]pyridine-8a-carboxylic acid,
 (2S)-4-cyclopropyl-5-(naphthalen-1-ylmethyl)-7-oxo-2-(3-(trifluoromethyl)phenyl)-2a-vinyl-2,2a,7,8a-tetrahydro-1H-cyclobuta[4,5]thiazolo[3,2-a]pyridine-8a-carboxylic acid, (2R)-4-cyclopropyl-5-(naphthalen-1-ylmethyl)-7-oxo-2-(3-(trifluoromethyl)phenyl)-2a-vinyl-2,2a,7,8a-tetrahydro-1H-cyclobuta[4,5]thiazolo[3,2-a]pyridine-8a-carboxylic acid, (2S)-6-(azetidin-1-yl)-4-cyclopropyl-2-(3,5-dichlorophenyl)-5-(naphthalen-1-ylmethyl)-7-oxo-2,2a,7,8a-tetrahydro-1H-cyclobuta[4,5]thiazolo[3,2-a]pyridine-8a-carboxylic acid, (2S)-4-cyclopropyl-2-(3,5-dichlorophenyl)-5-(naphthalen-1-ylmethyl)-7-oxo-2,2a,7,8a-tetrahydro-1H-azeto[2',3':4,5]thiazolo[3,2-a]pyridine-8a-carboxylic acid, (2S)-4-cyclopropyl-2-(3,5-dichlorophenyl)-1-methyl-5-(naphthalen-1-ylmethyl)-7-oxo-2,2a,7,8a-tetrahydro-1H-azeto[2',3':4,5]thiazolo[3,2-a]pyridine-8a-carboxylic acid, (2-((2S)-4-cyclopropyl-2-(3,5-dichlorophenyl)-5-(naphthalen-1-ylmethyl)-7-oxo-2,2a,7,8a-tetrahydro-1H-cyclobuta[4,5]thiazolo[3,2-a]pyridin-8a-ypethyl)boronic acid, 1-(cyanomethyl)-4-cyclopropyl-5-(naphthalen-1-ylmethyl)-7-oxo-2-phenyl-2,2a,7,8a-tetrahydro-1H-cyclobuta[4,5]thiazolo[3,2-a]pyridine-8a-carboxylic acid, or a pharmaceutically acceptable salt of any one of the foregoing compounds.

11. A pharmaceutical composition comprising:
   (i) a compound according to claim 1, or a pharmaceutically acceptable salt thereof, and
   (ii) a drug against a disease involving gram-positive bacteria, or a pharmaceutically acceptable salt of said drug wherein (i) and optionally (ii) is/are in admixture with a pharmaceutically acceptable adjuvant, carrier, or excipient.

12. A method for treatment and/or prevention of a disease involving gram-positive bacteria comprising administering an effective amount of a compound according to claim 1 to a subject in need thereof.

* * * * *